US007423781B2

(12) United States Patent
Morimoto et al.

(10) Patent No.: US 7,423,781 B2
(45) Date of Patent: Sep. 9, 2008

(54) IMAGE PROCESSOR AND IMAGE PROCESSING METHOD FOR IMAGE ENHANCEMENT USING EDGE DETECTION

(75) Inventors: Etsuo Morimoto, Tokyo (JP); Hiroyuki Shibaki, Tokyo (JP); Tooru Suino, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1101 days.

(21) Appl. No.: 10/391,211

(22) Filed: Mar. 19, 2003

(65) Prior Publication Data
US 2003/0218776 A1 Nov. 27, 2003

(30) Foreign Application Priority Data
Mar. 20, 2002 (JP) ............................. 2002-078494
Mar. 20, 2002 (JP) ............................. 2002-078495

(51) Int. Cl.
G06K 15/00 (2006.01)
G06K 9/00 (2006.01)
(52) U.S. Cl. ...................................... 358/2.1; 358/3.27
(58) Field of Classification Search ................... 358/1.1, 358/1.9, 3.02, 3.03, 3.06, 3.09, 3.26, 3.27; 382/240, 254, 261, 263, 275
See application file for complete search history.

(56) References Cited
U.S. PATENT DOCUMENTS

| 5,162,923 | A | * | 11/1992 | Yoshida et al. ............... 382/248 |
| 5,464,200 | A | | 11/1995 | Nakazato et al. ......... 270/52.02 |
| 5,482,265 | A | | 1/1996 | Nakazato et al. ............ 271/242 |
| 5,526,446 | A | | 6/1996 | Adelson et al. .............. 382/275 |
| 5,708,949 | A | | 1/1998 | Kasahara et al. ............ 399/330 |
| 5,717,791 | A | | 2/1998 | Labaere et al. |
| 5,797,074 | A | | 8/1998 | Kasahara et al. ............ 399/262 |
| 5,831,751 | A | | 11/1998 | Ohneda et al. .............. 358/521 |
| 5,838,817 | A | * | 11/1998 | Funada ....................... 382/166 |
| 5,960,246 | A | | 9/1999 | Kasahara et al. ............ 399/359 |

(Continued)

FOREIGN PATENT DOCUMENTS

EP   1 001 370 A1   5/2000

(Continued)

OTHER PUBLICATIONS

U.S. Appl. No. 10/391,211, filed Mar. 19, 2003, Morimoto et al.

(Continued)

Primary Examiner—Gabriel Garcia
(74) Attorney, Agent, or Firm—Oblon, Spivak, McClelland, Maier & Neustadt, P.C.

(57) ABSTRACT

A filtering processing unit of an image processor includes a component extraction unit, a character edge quantity calculation unit, and a correction unit corresponding to each of a plurality of frequency bands and direction components, and an adder. The component extraction unit extracts signals from a corresponding one of the frequency bands and direction components. The character edge quantity calculation unit calculates a character edge quantity from an output of a corresponding one of the component extraction units. The correction unit performs correction control to the output of a corresponding one of the component extraction units based on a character edge quantity calculated by a corresponding one of the character edge quantity calculation units. The adder adds outputs of all the correction units.

17 Claims, 54 Drawing Sheets

U.S. PATENT DOCUMENTS

| | | | |
|---|---|---|---|
| 6,005,970 | A | 12/1999 | Ohneda et al. ............... 382/162 |
| 6,009,447 | A | 12/1999 | Kubota et al. ................ 708/313 |
| 6,072,913 | A | 6/2000 | Yamada ...................... 382/275 |
| 6,339,479 | B1* | 1/2002 | Kishimoto .................. 358/1.2 |
| 6,556,707 | B1 | 4/2003 | Yagishita et al. ............ 382/162 |
| 6,754,398 | B1* | 6/2004 | Yamada ...................... 382/260 |
| 6,771,793 | B1 | 8/2004 | Yamada ...................... 382/264 |
| 7,190,848 | B2* | 3/2007 | Yamada ...................... 382/299 |
| 2002/0030762 | A1 | 3/2002 | Kishimoto .................. 348/625 |
| 2003/0142865 | A1* | 7/2003 | Hirota et al. ................ 382/167 |
| 2004/0119858 | A1* | 6/2004 | Shimazaki .................. 348/252 |

FOREIGN PATENT DOCUMENTS

| | | |
|---|---|---|
| EP | 1 150 248 A2 | 10/2001 |
| JP | 6-223172 | 8/1994 |
| JP | 6-274614 | 9/1994 |
| JP | 06-274615 | 9/1994 |
| JP | 7-095409 | 4/1995 |
| JP | 8-181864 | 7/1996 |
| JP | 10-257329 | 9/1998 |
| JP | 10-336658 | 12/1998 |
| JP | 2000-134625 | 5/2000 |
| JP | 2000-306089 | 11/2000 |

OTHER PUBLICATIONS

U.S. Appl. No. 10/666,246, filed Sep. 22, 2003, Tonami et al.
U.S. Appl. No. 10/391,211, filed Mar. 19, 2003, Morimoto et al.
U.S. Appl. No. 10/665,463, filed Sep. 22, 2003, Shibaki et al.
U.S. Appl. No. 10/391,211, filed Mar. 19, 2003, Morimoto et al.
U.S. Appl. No. 10/732,442, filed Dec. 11, 2003, Takenaka et al.
U.S. Appl. No. 10/391,211, filed Mar. 19, 2003, Morimoto et al.
U.S. Appl. No. 10/785,034, filed Feb. 25, 2004, Shibaki et al.
U.S. Appl. No. 10/391,211, filed Mar. 19, 2003, Morimoto et al.
U.S. Appl. No. 10/760,460, filed Jan. 21, 2004, Miyagi et al.
P. G. Powell, et al., "A Method for the Digital Enhancement of Unsharp, Grainy Photographic Images", International Conference on Electronic Image Processing, XP-001051936, Jul. 26, 1982, pp. 179-183.
Rafael C. Gonzalez, et al., "Digital Image Processing", Addison-Wesley Publishing Company, XP-002334121, 1992, pp. 194-201.
W. D. Toczyski, et al., "An Alternative Differential Gradient Edge Contrast Operator Suitable for Use Within High Speed Pyramid-Based Imaging Systems", Intelligence and Systems, IEEE, XP-010205812, Nov. 4, 1996, pp. 296-303.
Chun-Ming Chang, et al., "Coherence of Multiscale Features for Enhancement of Digital Mammograms", IEEE Transactions on Information Technology in Biomedicine, vol. 3, No. 1, XP-002909713, Mar. 1999, pp. 32-46.
Farook Sattar, et al., "On the Multiresolution Enhancement of Document Images Using Fuzzy Logic Approach", Pattern Recognition, IEEE, vol. 1, XP-010297600, Aug. 16, 1998, pp. 939-941.
Datong Chen, et al., "Text Enhancement with Asymmetric Filter for Video OCR", Image Analysis and Processing, IEEE, XP-010561246, Sep. 26, 2001, pp. 192-197.

* cited by examiner

FIG.3A  FIG.3B  FIG.3C  FIG.3D
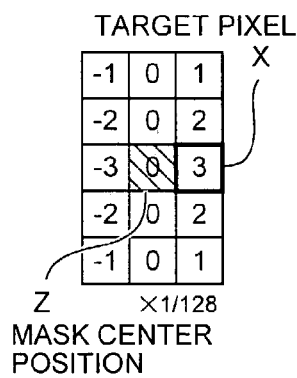
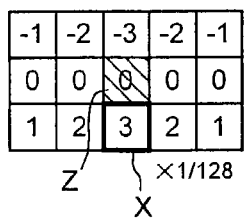
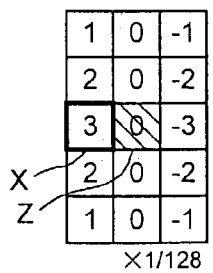
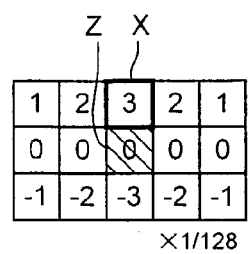
FIG.3E  FIG.3F  FIG.3G  FIG.3H
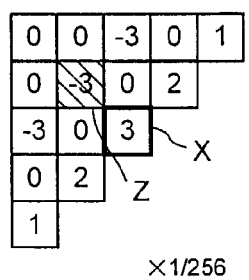
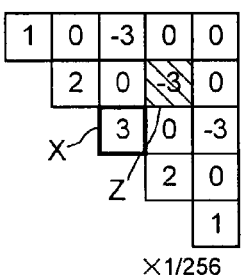
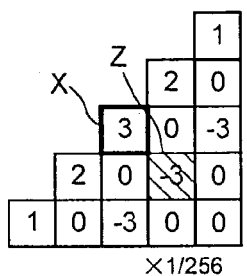
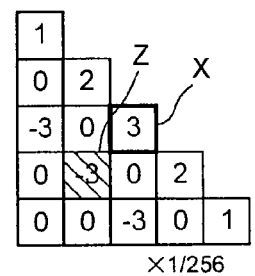
FIG.3I  FIG.3J  FIG.3K  FIG.3L
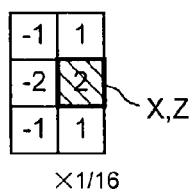
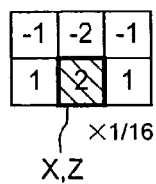
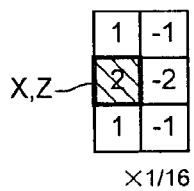
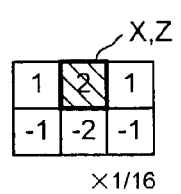
FIG.3M  FIG.3N  FIG.3O  FIG.3P
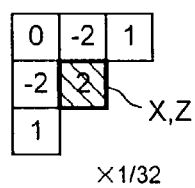
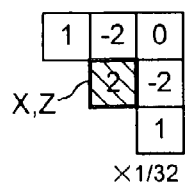
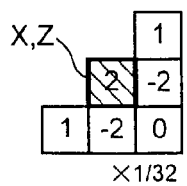
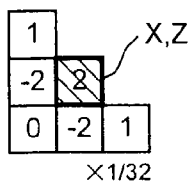

$\alpha t$ : EMPHASIS COEFFICIENT FOR CHARACTERS
$\alpha h$ : EMPHASIS COEFFICIENT FOR NON-CHARACTERS Tt : FOR CHARACTERS)
Th : FOR NON-CHARACTERS)

| -1 | -1 | -1 |
|----|----|----|
| 2  | 2  | 2  |
| -1 | -1 | -1 |

FIG. 29

| -1 | 2 | -1 |
|----|---|----|
| -1 | 2 | -1 |
| -1 | 2 | -1 |

FIG. 30

| -1 | -1 | 2  |
|----|----|----|
| -1 | 2  | -1 |
| 2  | -1 | -1 |

FIG. 31

| 2  | -1 | -1 |
|----|----|----|
| -1 | 2  | -1 |
| -1 | -1 | 2  |

FIG. 32

| -1 | -1 | -1 | -1 | -1 |
|----|----|----|----|----|
| 0  | 0  | 0  | 0  | 0  |
| 2  | 2  | 2  | 2  | 2  |
| 0  | 0  | 0  | 0  | 0  |
| -1 | -1 | -1 | -1 | -1 |

FIG. 33

| -1 | 0 | 2 | 0 | -1 |
|----|---|---|---|----|
| -1 | 0 | 2 | 0 | -1 |
| -1 | 0 | 2 | 0 | -1 |
| -1 | 0 | 2 | 0 | -1 |
| -1 | 0 | 2 | 0 | -1 |

FIG. 34

| 0  | -1 | -1 | 0  | 2  |
|----|----|----|----|----|
| -1 | -1 | 0  | 2  | 0  |
| -1 | 0  | 2  | 0  | -1 |
| 0  | 2  | 0  | -1 | -1 |
| 2  | 0  | -1 | -1 | 0  |

FIG. 35

| 2  | 0  | -1 | -1 | 0  |
|----|----|----|----|----|
| 0  | 2  | 0  | -1 | -1 |
| -1 | 0  | 2  | 0  | -1 |
| -1 | -1 | 0  | 2  | 0  |
| 0  | -1 | -1 | 0  | 2  |

FIG. 37

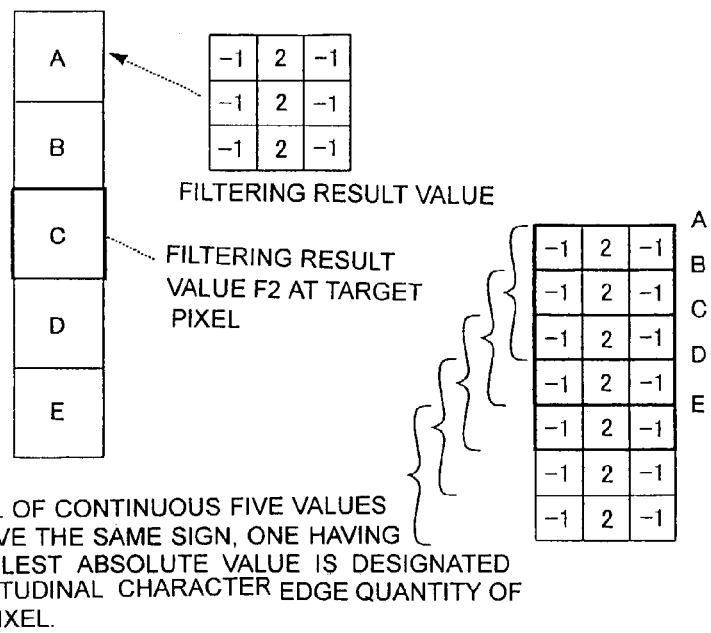

FILTERING RESULT VALUE

FILTERING RESULT VALUE F2 AT TARGET PIXEL

WHEN ALL OF CONTINUOUS FIVE VALUES A TO E HAVE THE SAME SIGN, ONE HAVING THE SMALLEST ABSOLUTE VALUE IS DESIGNATED AS LONGITUDINAL CHARACTER EDGE QUANTITY OF TARGET PIXEL.

FIG. 38

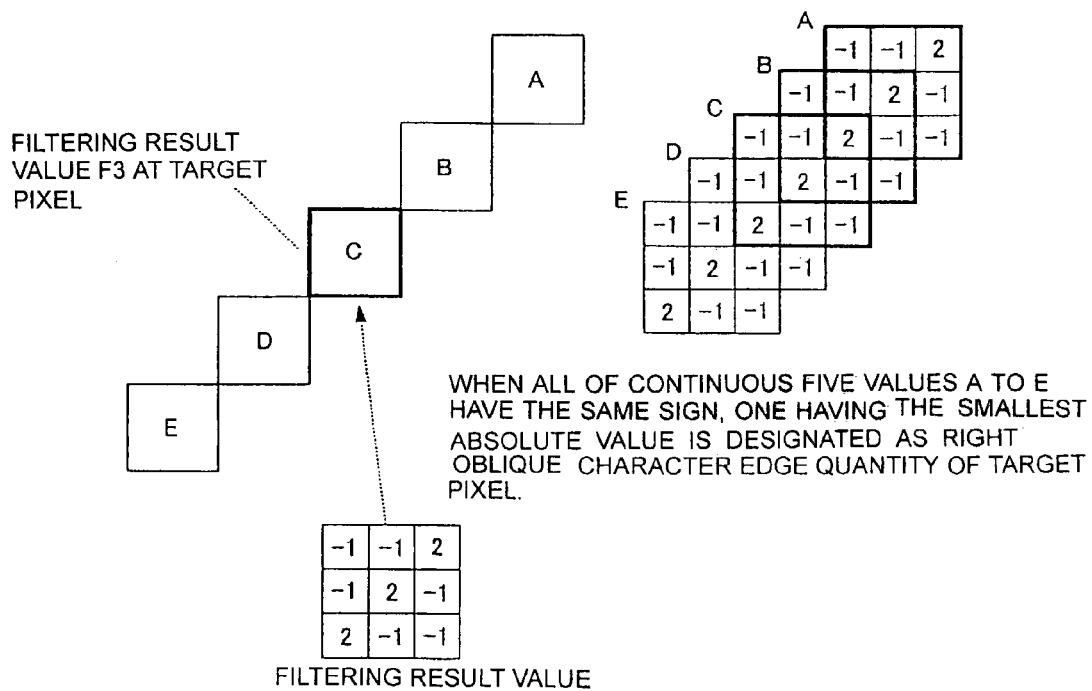

FILTERING RESULT VALUE F3 AT TARGET PIXEL

WHEN ALL OF CONTINUOUS FIVE VALUES A TO E HAVE THE SAME SIGN, ONE HAVING THE SMALLEST ABSOLUTE VALUE IS DESIGNATED AS RIGHT OBLIQUE CHARACTER EDGE QUANTITY OF TARGET PIXEL.

FILTERING RESULT VALUE

WHEN ALL OF CONTINUOUS FIVE VALUES A TO E HAVE THE SAME SIGN, ONE HAVING THE SMALLEST ABSOLUTE VALUE IS DESIGNATED AS LEFT OBLIQUE CHARACTER EDGE QUANTITY OF TARGET PIXEL.

WHEN ALL OF CONTINUOUS FIVE VALUES A TO E HAVE THE SAME SIGN, ONE HAVING THE SMALLEST ABSOLUTE VALUE IS DESIGNATED AS HORIZONTAL CHARACTER EDGE QUANTITY OF TARGET PIXEL (A) G (B) H

WHEN ALL OF CONTINUOUS FIVE 1LH COEFFICIENTS HAVE THE SAME SIGN, ONE HAVING THE SMALLEST ABSOLUTE VALUE IS DESIGNATED AS HORIZONTAL CHARACTER EDGE QUANTITY OF TARGET PIXEL.

WHEN ALL OF CONTINUOUS FIVE 1HL COEFFICIENTS HAVE THE SAME SIGN, ONE HAVING THE SMALLEST ABSOLUTE VALUE IS DESIGNATED AS LONGITUDINAL CHARACTER EDGE QUANTITY OF TARGET PIXEL.

WHEN ALL OF CONTINUOUS FIVE 2LH COEFFICIENTS HAVE THE SAME SIGN, ONE HAVING THE SMALLEST ABSOLUTE VALUE IS DESIGNATED AS HORIZONTAL CHARACTER EDGE QUANTITY OF TARGET PIXEL.

WHEN ALL OF CONTINUOUS FIVE 2HL COEFFICIENTS HAVE
THE SAME SIGN, ONE HAVING THE SMALLEST ABSOLUTE
VALUE IS DESIGNATED AS LONGITUDINAL CHARACTER
EDGE QUANTITY OF TARGET PIXEL.

WHEN ALL OF CONTINUOUS FIVE 2HH COEFFICIENTS HAVE THE SAME SIGN, ONE HAVING THE SMALLEST ABSOLUTE VALUE IS DESIGNATED AS LEFT OBLIQUE CHARACTER EDGE QUANTITY OF TARGET PIXEL.

thn : NOISE REJECTION THRESHOLD
α : EMPHASIS COEFFICIENT

|  |  | CHARACTER AREA | | PATTERN AREA | |
|---|---|---|---|---|---|
|  |  | Thn | α | Thn | α |
| FIRST HIERARCHY | HL | 6 | 1.5 | 100 | 1.5 |
|  | LH | 6 | 1.5 | 100 | 1.5 |
|  | HH | 4 | 1.5 | 50 | 1.5 |
| SECOND HIERARCHY | HL | 30 | 5 | 60 | 1.5 |
|  | LH | 30 | 5 | 60 | 1.5 |
|  | HH | 16 | 3 | 30 | 0.5 |

FIG. 70
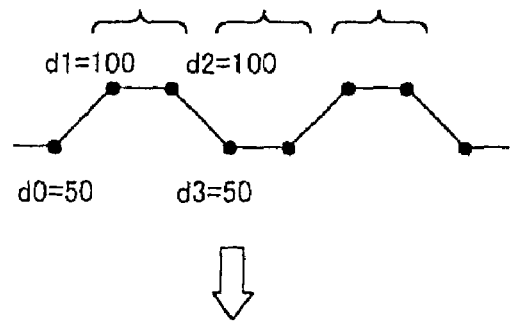
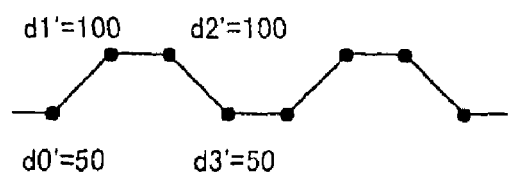
FIG. 71
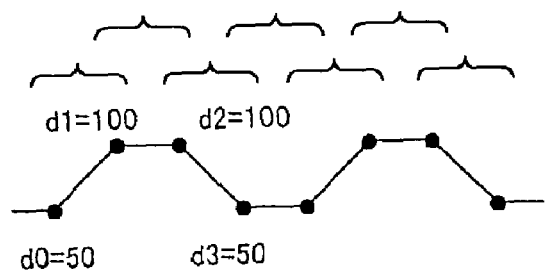
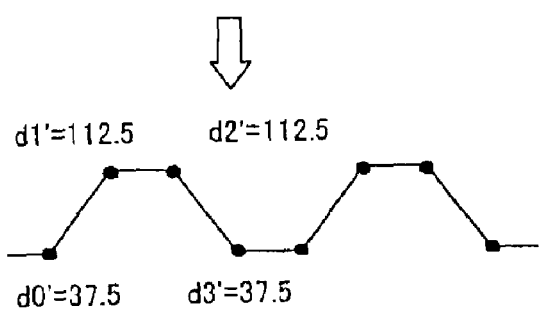

FIG. 74A
CONTINUITY OF RIGHT OBLIQUE EDGE QUANTITY

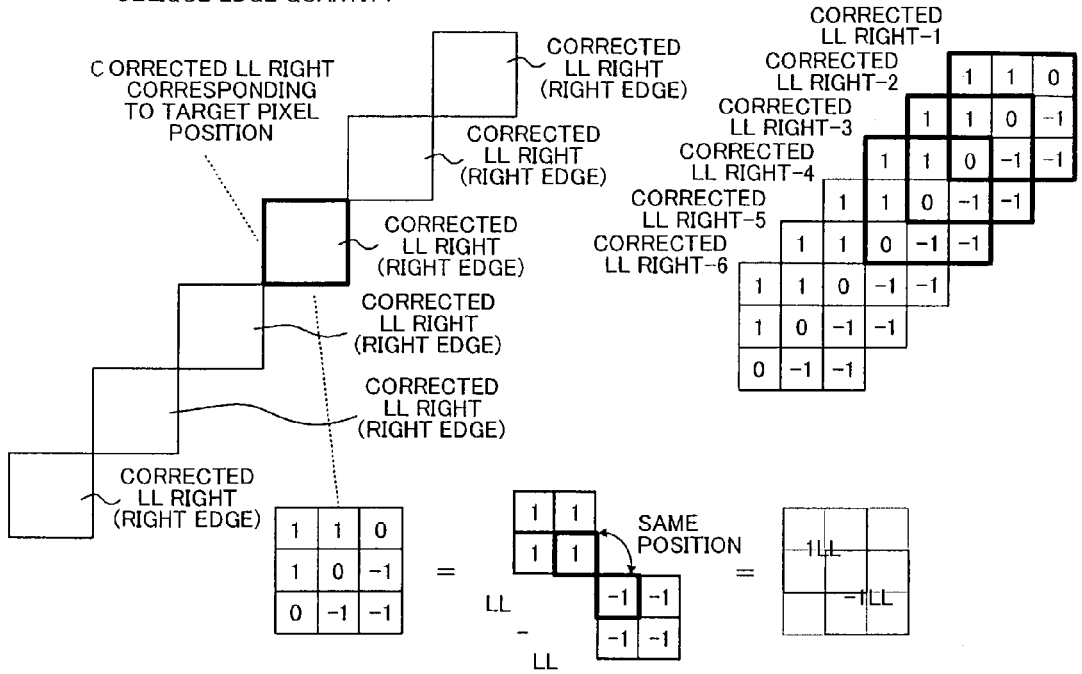

FIG. 74B
CONTINUITY OF LEFT OBLIQUE EDGE QUANTITY

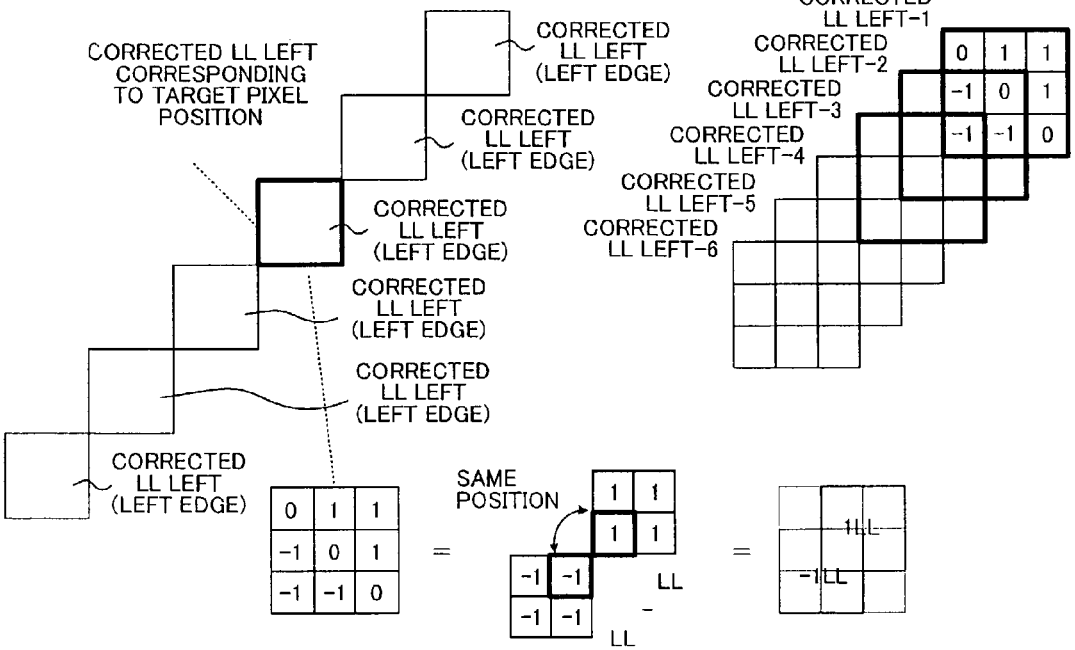

WHEN DIFFERENCE TOTAL OF ADJACENT CORRECTED LL RIGHT IN (A) IS NOT LARGER THAN THRESHOLD <THR1>, AND DIFFERENCE TOTAL OF ADJACENT CORRECTED LL LEFT IN (B) IS NOT LARGER THAN THRESHOLD <THR2>, CORRECTED LL RIGHT (CORRECTED LL RIGHT -3) CORRESPONDING TO THE TARGET PIXEL POSITION IS DESIGNATED AS A CHARACTER EDGE QUANTITIY IN RIGHT OBLIQUE DIRECTION.

FIG. 75A
CONTINUITY OF LEFT OBLIQUE EDGE QUANTITY

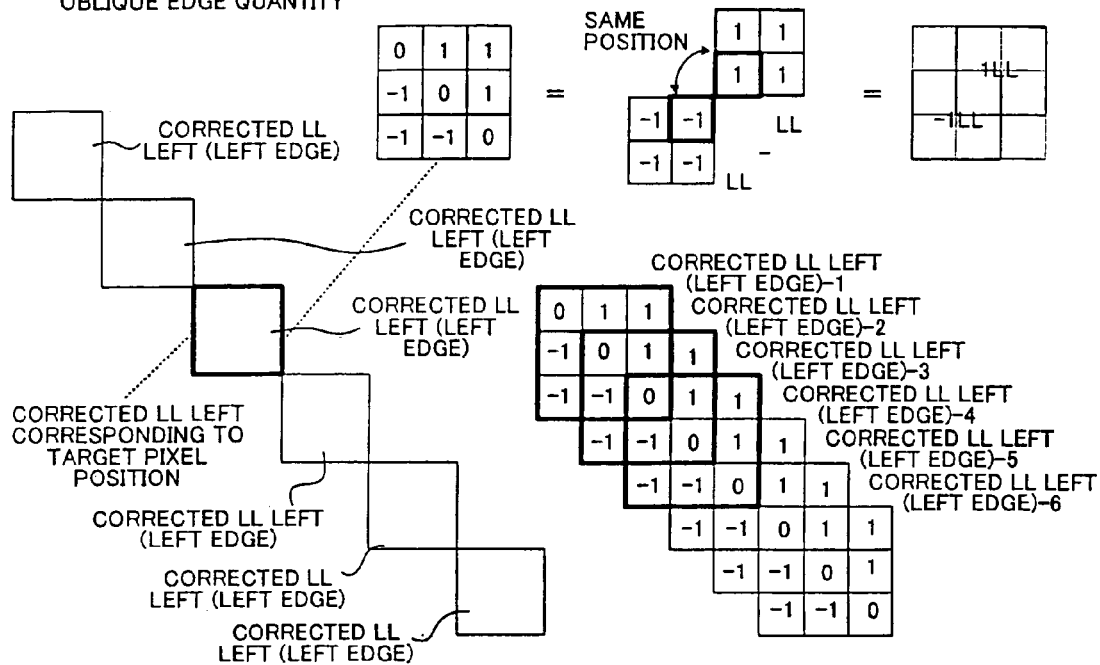

FIG. 75B
CONTINUITY OF RIGHT OBLIQUE EDGE QUANTITY

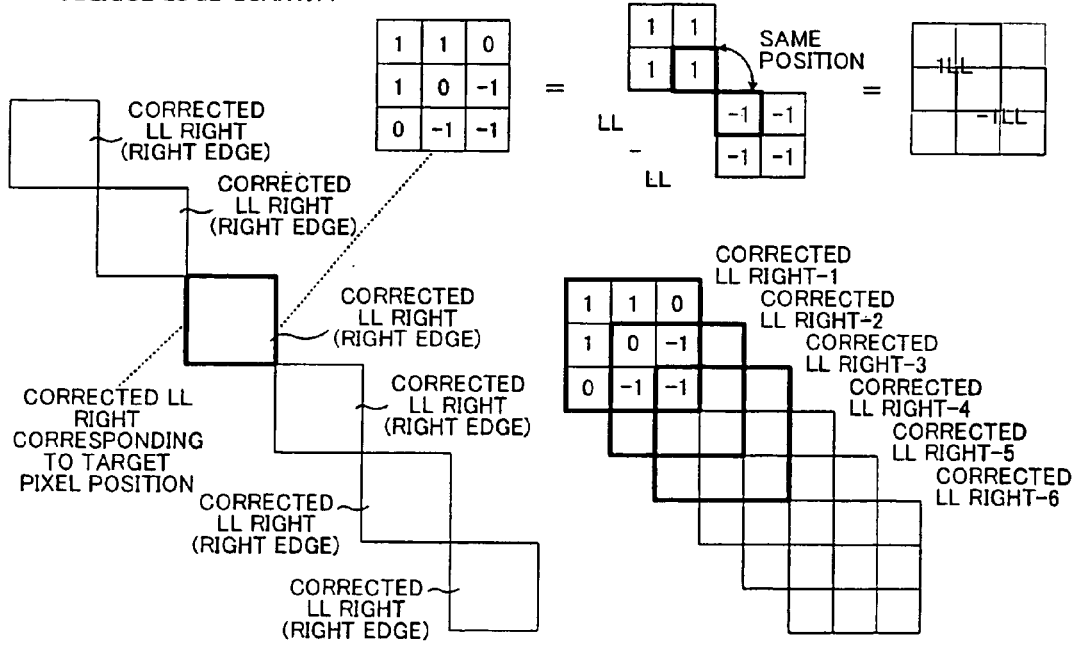

WHEN DIFFERENCE TOTAL OF ADJACENT CORRECTED LL LEFT IN (C) IS NOT LARGER THAN THRESHOLD <THR1>, AND DIFFERENCE TOTAL OF ADJACENT CORRECTED LL RIGHT IN (D) IS NOT LARGER THAN THRESHOLD <THR2>, CORRECTED LL LEFT (CORRECTED LL LEFT −3) CORRESPONDING TO THE TARGET PIXEL POSITION IS DESIGNATED AS A CHARACTER EDGE QUANTITIY IN LEFT OBLIQUE DIRECTION.

IMAGE PROCESSOR AND IMAGE PROCESSING METHOD FOR IMAGE ENHANCEMENT USING EDGE DETECTION

BACKGROUND OF THE INVENTION

1) Field of the Invention

The present invention relates to an image processor and an image processing method, which are applied to image forming apparatus such as printers, digital copying machines, and facsimiles, using an electrophotographic process, and apparatus having the similar function, and performs the optimum image processing, particularly, filtering processing for correcting the sharpness, by using the attribute information of an image.

The present invention relates to an image processor, which is applied to an image processor such as digital copying machines and facsimiles using the electrophotographic process, and particularly, applied to an image processor that detects character edges in an input image, for improving the image quality, and performs appropriate processing based on the detection result.

2) Description of the Related Art

In the image processor such as the digital copying machine and the facsimile, heretofore, the image attribute information such as characters and non-characters (segmentation result) is obtained from the input image signal, and the spatial frequency characteristic of a filter is controlled, based on the obtained image attribute information.

(1) Japanese Patent Application Laid-Open No. 7-95409 discloses an example in which an attribute is judged as a character or a non-character for each pixel unit by a segmentation circuit, and a strong edge enhancement filter is applied to character pixels, and a relatively weak filter is applied to non-character pixels based on the judgment result.

(2) In the image processing method disclosed in Japanese Patent Application Laid-Open No. 2000-134625, an image signal is subjected to sub-band processing, the band components are corrected by referring to the divided components, and the corrected band components are synthesized to form an image signal, to thereby remove noise and emphasize the edge.

(3) In the image processing method disclosed in Japanese Patent Application Laid-Open No. 6-274614, wavelet transform is performed with respect to an image signal, to resolve it into signals in a plurality of frequency bands, and predetermined image processing inverse wavelet transform is performed with respect to at least one frequency band signal. In this predetermined image transform, processing for multiplying a signal in at least one frequency band by a predetermined number is carried out. As a result, a naturally reproduced image corresponding to visual impressions can be obtained, without emphasizing noise at the time of image reproduction.

In the inventions (2) and (3), sharpness is controlled for each band and for each direction, by band-dividing an image signal and correcting the obtained band components to perform inverse transform. The invention (2) is proposes to divide the image signal into a plurality of bands by an optional band dividing filter, and the invention (3) proposes to performing band division by wavelet transform.

(4) The image processing method and the image processor disclosed in Japanese Patent Application Laid-Open No. 6-223172 generate a plurality of band signals from image data, and extracting edge information of the image data by at least one band signal, to detect a character area from the distribution of edge information.

The image quality in the image processor such as digital copying machines and facsimiles can be improved by smoothing the images. When a portion where halftone is expressed by a halftone dot on an original document is read and processed, smoothing for pattern processing is necessary, in order to prevent moire due to halftone dots. On the other hand, if smoothing for pattern processing is similarly carried out with respect to characters, other than characters on a white ground such as characters on dots, sharpness is insufficient, thereby the image quality is deteriorated.

Taking the ground of the character into consideration, conventional techniques for improving the image quality include the followings.

(5) The invention disclosed in Japanese Patent Application Laid-Open No. 8-181864 uses a dot degree calculating filter, which responds to the dot portion in the input image, to perform smoothing processing according to the result. A method is proposed herein, which calculates the degree of dot from the input image, and perform image correction corresponding to the degree of dot, thereby enabling adequate image correction, respectively, with respect to an original document in which all sorts exist together, for example, a character on white ground, a character on dots, dots, and a picture.

(6) The invention disclosed in Japanese Patent Application Laid-Open No. 6-223172 has a configuration such that a plurality of band signals are generated from image data, and edge information of image data is extracted by at least one band signal, to detect a character area from the distribution of edge information. In this invention, a configuration in which a density of band signals having a larger value than a certain threshold is detected to carry out character judgment is disclosed.

However, in the technique shown in (1), since strong and weak filters are switched and used based on the image attribute information judged digitally, the strength of the filter abruptly changes at a boundary portion between the character area and the non-character area. There will be no problem when the judgment of character and non-character areas can be performed highly accurately. However, if a dot portion having a relatively low number of lines, and a pixel, which is misjudged to be a character due to edges in a pattern image, exist together, a strong emphasis filter is locally applied to the pixel.

As a result, pixels having high density scatter in the dot image, causing a problem in that graininess deteriorates, edges of hair and eyebrow in the pattern are emphasized extremely strongly, to give the image a sense of incompatibility, or defects due to a segmentation error are noticeable. In order to solve the problem in such a binary switching, there is an invention in which multivalued segmentation result is generated and stored, to control the filter in multiple steps. However, memory for storing the segmentation data increases, thereby causing a problem of a cost increase.

In the inventions described in (2) and (3), adaptive processing using the image attribute information such as the image area segmentation result is not performed, but a similar control is performed with respect to the character image and the dot image. Therefore, sharpness of the character image and moire suppression in a dot image cannot coexist.

In the invention described in (1), a feature of a character is extracted from the divided signal by an area dividing unit such as wavelet transform, but it relates only to extraction of the feature of a character, and there is no technical disclosure regarding the filter processing using the feature of a character.

In the technique described in (5), the dot detection processing is necessary separately, in order to obtain sharpness satisfactory for a character on dots having a different characteristic from that of a character on white ground. A large processing load is required for such detection processing of the dot portion.

Even with the technique disclosed in (6), a band signal having a large value exists in a dot image, and hence the accuracy of character judgment cannot be improved. Since the configuration is such that a low frequency band signal is generated, while performing downsampling, the judgment accuracy is poor.

As a method for solving the problems other than the conventional methods, there is a method in which an edge that is not a dot, that is, only a character edge is extracted to perform sharpness processing based on the extraction result. According to this method, the character itself on dots is emphasized, and the sharpness is improved. However, since dots adjacent to the character on dots are also emphasized, unevenness that does not exist in a character is reproduced, and as a whole, the image quality of the character on dots cannot be improved.

SUMMARY OF THE INVENTION

It is an object of the present invention to at least solve the problems in the conventional technology.

The image processor according to one aspect of the present invention comprises a plurality of edge quantity extraction units, each edge quantity extraction unit having an edge extraction filter and extracting an edge quantity in a corresponding one of a plurality of frequency band components and corresponding one of a plurality of direction components from an input image signal; a plurality of edge quantity correction units, each edge quantity correction unit performing predetermined transform to the edge quantity extracted by a corresponding one of the edge quantity extraction unit; and an addition unit that adds outputs from the edge quantity correction units to the input image signal. A mask center position of the edge extraction filter in at least one of the edge quantity extraction units is alienated from a target pixel.

The image processor according to another aspect of the present invention comprises a multiple resolution transform unit that divides an input image signal into coefficient signals in a plurality of frequency bands and a plurality of direction components and outputs the signals; a sharpness control unit that inputs a plurality of image attribute signals obtained corresponding to respective positions of the plurality of coefficient signals obtained by the multiple resolution transform unit, and corrects the coefficient signal at a corresponding position, based on the image attribute signal; and a restoration processing unit that obtains a processed image signal by inversely transforming the output from the sharpness control unit. The multiple resolution transform unit holds the obtained coefficient signal without decimation, at the time of dividing the input image signal into coefficient signals in a plurality of frequency bands and a plurality of direction components, and the restoration processing unit outputs a processed image signal based on a plurality of inversely transformed outputs obtained with respect to one input pixel.

The image processing method according to still another aspect of the present invention comprises extracting edge quantity in each of a plurality of frequency band components and direction components from an input image signal, by an edge extraction filter; and performing predetermined transform with respect to each edge quantities extracted. At least one edge quantity is extracted in such a manner that a mask center-position of the edge extraction filter is alienated from a target pixel.

The image processing method according to still another aspect of the present invention comprises dividing an input image signal into coefficient signals in a plurality of frequency bands and a plurality of direction components and outputting the signals; inputting a plurality of image attribute signals obtained corresponding to respective positions of the plurality of coefficient signals obtained at the step of dividing; performing predetermined correction with respect to the coefficient signal at a corresponding position, based on the image attribute signal; and obtaining a processed image signal by inversely transforming the output at the step of performing. At the step of dividing, the obtained coefficient signal is held without decimation, at the time of dividing the input image signal into coefficient signals in a plurality of frequency bands and a plurality of direction components, and at the step of obtaining, a processed image signal is output based on a plurality of inversely transformed outputs obtained with respect to one input pixel.

The image processor according to still another aspect of the present invention comprises a character edge quantity calculation unit that calculates a character edge quantity for each of a plurality of frequency bands from the input image signal; and a sharpness control unit, being a unit that corrects a spatial frequency based on the character edge quantity calculated by the character edge quantity calculation unit, which performs independent correction and control in the frequency band of the corresponding input image signal, based on the character edge quantity for each frequency band, calculated by the character edge quantity calculation unit.

The image processor according to still another aspect of the present invention comprises a band division unit that divides an input image signal into coefficient signals in a plurality of frequency bands and a plurality of direction components and outputs the signal; a character edge quantity calculation unit that calculates a character edge quantity for each of a plurality of frequency bands based on the coefficient signals divided by the band division unit; and a sharpness control unit, being a unit that corrects a spatial frequency based on the character edge quantity calculated by the character edge quantity calculation unit, which performs independent correction and control in the frequency band of the corresponding coefficient signal, based on the character edge quantity for each of a plurality of frequency bands, calculated by the character edge quantity calculation unit.

The image processor according to still another aspect of the present invention comprises a band division unit, being a unit that divides an input image signal into coefficient signals in a plurality of frequency bands and a plurality of direction components and outputs the signal, which performs division without decimation of the pixel of the input image in at least one frequency band; a character edge quantity calculation unit that calculates a character edge quantity for each of a plurality of frequency bands based on the coefficient signals divided by the band division unit; and a sharpness control unit, being a unit that corrects a spatial frequency based on the character edge quantity calculated by the character edge quantity calculation unit, which performs independent correction and control in the frequency band of the corresponding coefficient signal, based on the character edge quantity for each of a plurality of frequency bands, calculated by the character edge quantity calculation unit.

The image processor according to still another aspect of the present invention comprises a character edge quantity calculation unit that calculates character edge quantities for each of a plurality of frequency bands and direction components from the input image signal; and a sharpness control unit, being a unit that corrects a spatial frequency based on the character edge quantity calculated by the character edge quantity calculation unit, which performs independent correction and control in the frequency band and the direction component of the corresponding input image signal, based on the character edge quantities for each of a plurality of frequency bands and direction components, calculated by the character edge quantity calculation unit.

The image processor according to still another aspect of the present invention comprises a band and direction division unit that divides an input image signal into coefficient signals in a plurality of frequency bands and a plurality of direction components and outputs the signals; a character edge quantity calculation unit that calculates character edge quantities for each of a plurality of frequency bands and direction components based on the divided coefficient signals; and a sharpness control unit, being a unit that corrects a spatial frequency based on the character edge quantity calculated by the character edge quantity calculation unit, which performs independent correction and control in the frequency band and the direction component of the corresponding input image signal, based on a plurality of character edge quantities for each of a plurality of frequency bands and direction components, calculated by the character edge quantity calculation unit.

The image processor according to still another aspect of the present invention comprises a band and direction division unit, being a unit that divides an input image signal into coefficient signals in a plurality of frequency bands and a plurality of direction components and outputs the signal, which performs division without decimation of the pixel of the input image in at least one frequency band; a character edge quantity calculation unit that calculates character edge quantities for each of a plurality of frequency bands and direction components based on the coefficient signal divided by the band direction division unit; and a sharpness control unit, being a unit that corrects a spatial frequency based on the character edge quantity calculated by the character edge quantity calculation unit, which performs independent correction and control in the frequency band and the direction component of the corresponding input image signal, based on the character edge quantities for each of a plurality of frequency bands and direction components, calculated by the character edge quantity calculation unit.

The other objects, features and advantages of the present invention are specifically set forth in or will become apparent from the following detailed descriptions of the invention when read in conjunction with the accompanying drawings.

BRIEF DESCRIPTION OF THE DRAWINGS

FIGS. 3A to 3P are matrices that show coefficients of an edge extraction filter in a plurality of edge quantity extraction units a to p;

FIG. 28 shows coefficients of a filter used in the filtering processing unit according to the seventh embodiment;

FIG. 29 shows coefficients of a filter used in the filtering processing unit according to the seventh embodiment;

FIG. 30 shows coefficients of a filter used in the filtering processing unit according to the seventh embodiment;

FIG. 31 shows coefficients of a filter used in the filtering processing unit according to the seventh embodiment;

FIG. 32 shows coefficients of a filter used in the filtering processing unit according to the seventh embodiment;

FIG. 33 shows coefficients of a filter used in the filtering processing unit according to the seventh embodiment;

FIG. 34 shows coefficients of a filter used in the filtering processing unit according to the seventh embodiment;

FIG. 35 shows coefficients of a filter used in the filtering processing unit according to the seventh embodiment;

FIG. 37 shows a character edge quantity calculation process of a high frequency vertical character edge quantity calculation unit provided in the filtering processing unit according to the seventh embodiment;

FIG. 38 shows a character edge quantity calculation process of a high frequency right diagonal direction character edge quantity calculation unit provided in the filtering processing unit according to the seventh embodiment;

FIG. 70 explains calculation of a feature of an image, when subsampling is performed;

FIG. 71 explains calculation of a feature of an image according to the ninth embodiment (when subsampling is not performed);

FIGS. 74A and 74B show a character edge quantity calculation process in the second hierarchy and right diagonal direction by a second hierarchy right diagonal direction character edge quantity calculation unit provided in the filtering processing unit according to the tenth embodiment;

FIGS. 75A to 75B explain a character edge quantity calculation process in the second hierarchy and left diagonal direction by a second hierarchy left diagonal direction character edge quantity calculation unit provided in the filtering processing unit according to the tenth embodiment;

DETAILED DESCRIPTION

Exemplary embodiments of the image processor and the image processing method according to the present invention are explained in detail, with reference to the accompanying drawings.

Figure 1:
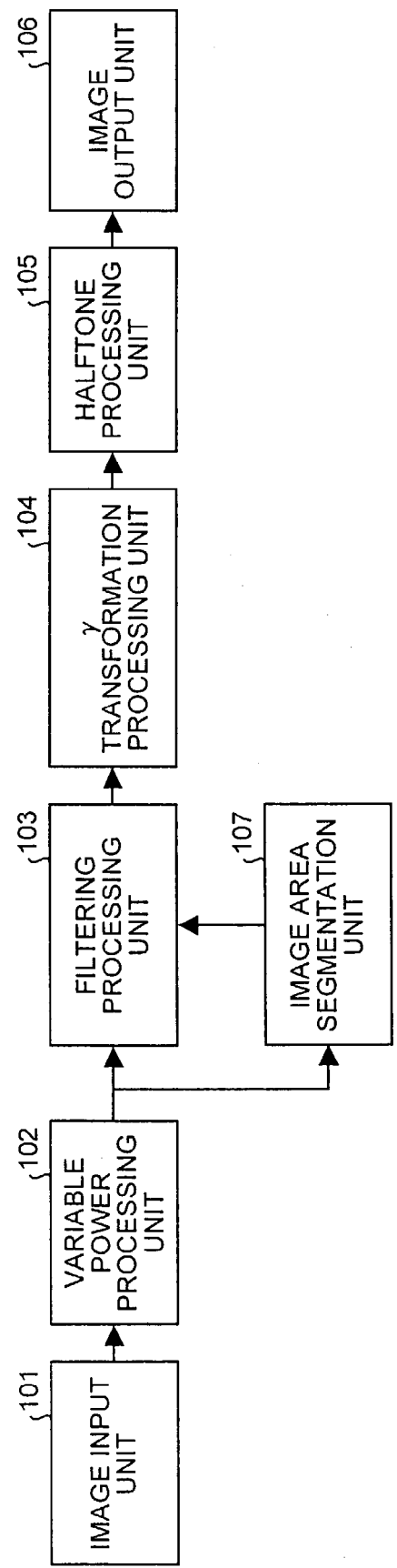
FIG. 1 is a block diagram of an image processor according to the present invention.

FIG. 1 is a block diagram of the image processor according to a first embodiment of the present invention. The image magnification of an image signal input by an image input unit 101 such as a scanner is changed by a variable power processing unit 102 based on the magnification specified by an operation panel (not shown). The image signal whose image magnification has been changed is input to an image area segmentation unit 107, where judgment of character area and non-character area is performed in a unit of pixel, and the obtained image area segmentation result is input to a filtering processing unit 103.

In the filtering processing unit 103, after having been converted into a desired spatial frequency characteristic corresponding to the image area segmentation result, the image is transformed to have a desired density characteristic by a γ transformation processing unit 104, and output to an image output unit 106 such as an electrophotographic printer, via a halftone processing unit 105.

Figure 2:
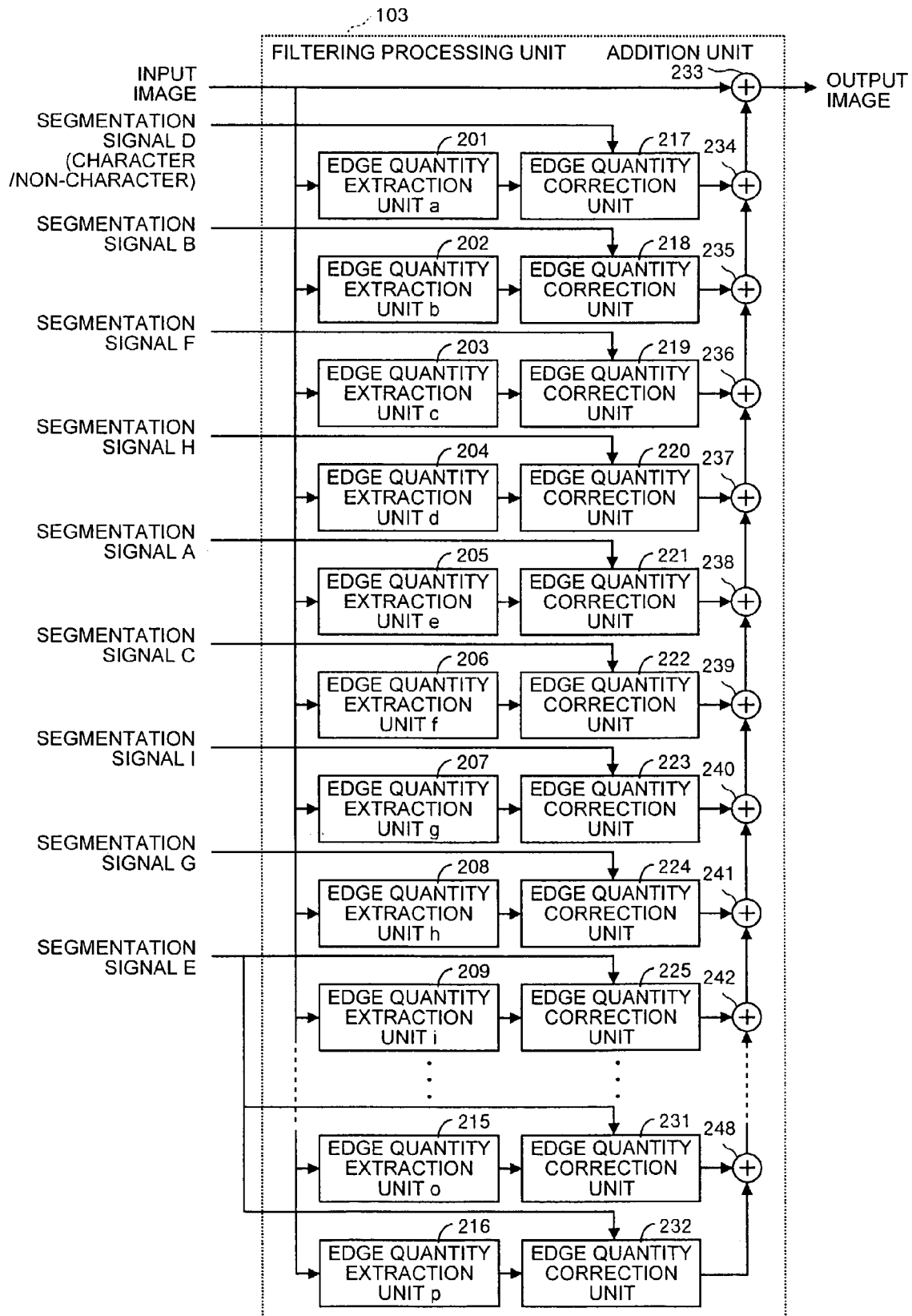
FIG. 2 is a block diagram of a filtering processing unit in the image processor according to a first embodiment of the present invention.

FIG. 2 is a block diagram of the filtering processing unit 103, being a main part of the image processor according to the first embodiment of the present invention. At first, the input image signal (hereinafter, "input image") is subjected to edge quantity extraction in different frequency bands and in different directions by 16 edge quantity extraction units a to p (201 to 216).

FIG. 3 is a matrix that shows coefficients of an edge extraction filter in the edge quantity extraction units a to p. The edge extraction filter in FIG. 3A shows filter coefficients used in the edge quantity extraction unit a (201) in FIG. 2, and in the same manner, the edge extraction filters in FIGS. 3B to 3P show filter coefficients used in the edge quantity extraction units b (202) to p (216).

Of these, the edge extraction filters in FIGS. 3A to 3H have a large mask size, and are for extracting an edge quantity in a relatively low frequency band, and for extracting, respectively, an edge quantity in different directions (up and down, right and left, and diagonal directions, in total 8 directions), based on the mask center position. The edge extraction filters in FIGS. 3I to 3P, that is, the edge extraction filters in the edge quantity extraction units i to p (209 to 216) have a small mask size, and are for extracting an edge quantity in a relatively high frequency band, and can extract, respectively, an edge quantity in different directions (up and down, right and left, and diagonal directions, in total 8 directions), based on the mask center position.

The edge quantity extraction units 201 to 216 perform convolution operation by using these edge extraction filters, and multiply the result by a preset magnification corresponding to the respective edge extraction filters, and output the resulted value. These magnifications shall be explained using FIG. 3. For example, in the edge extraction filter shown in FIG. 3A, the magnification is 1/128.

In FIGS. 3A to 3P, pixels enclosed by a thick square show a position of a target pixel X to be processed, respectively, and pixels shown by diagonal lines respectively show a mask center position Z of the respective edge extraction filters. For convenience sake, these target pixel X and mask center position are shown only in FIG. 3A. Strictly speaking, in the edge extraction filters shown in FIGS. 3I to 3P, the mask center position Z is different from the actual center position, but in this embodiment, it is set as a pixel position close to the center. The edge quantities obtained by these edge quantity extraction units 201 to 216 having these edge extraction filters are respectively input to the edge quantity correction units 217 to 232, and then correction of edge quantity is performed.

Figure 4:
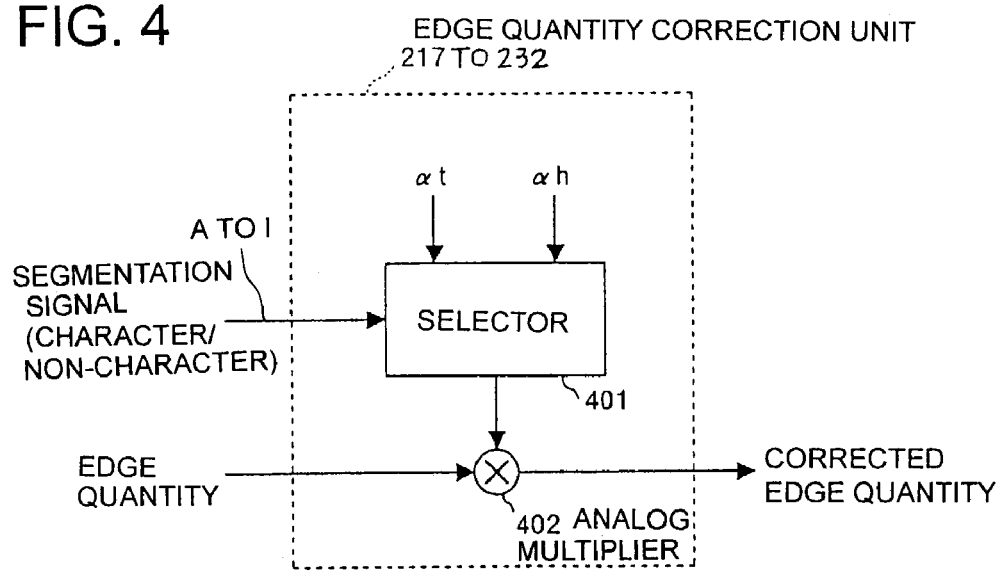
FIG. 4 is a block diagram of an edge quantity correction unit.

FIG. 4 is a block diagram of the edge quantity correction units 217 to 232. To the respective edge quantity correction units 217 to 232 are respectively input edge quantities obtained by the corresponding edge quantity extraction units 201 to 216 and segmentation signals (segmentation signals A to I shown in FIG. 2) at a position corresponding to the mask center position Z of the edge extraction filter used at this time are respectively input, so that different processing is performed depending on whether each of the segmentation signals A to I is a character or a non-character.

When the segmentation signal indicates a character, an emphasis coefficient αt for characters is selected by a selector 401, and when the segmentation signal indicates a non-character, an emphasis coefficient αh for non-characters is selected, and input to an analog multiplier 402. The analog multiplier 402 multiplies an edge quantity supplied from the corresponding edge quantity extraction unit by the emphasis coefficients αt or αh, and outputs the result as an edge quantity after correction. The emphasis coefficients αt and αh are values inherently set by the respective edge quantity correction units 217 to 232, and are set to an optimum value for the sharpness of characters, reduction of moire in a pattern portion, and improvement of graininess.

Figure 5:
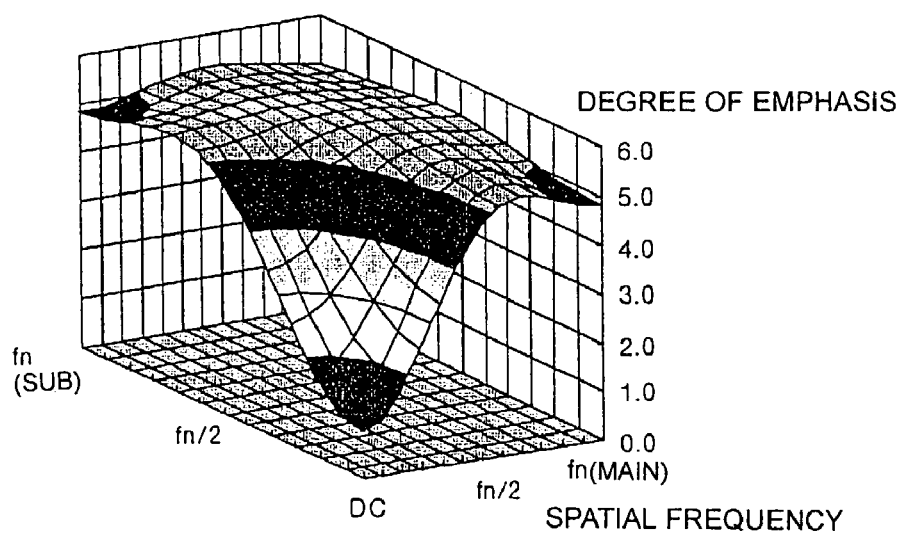
FIG. 5 shows a filter property suitable for a character portion in an image.

For example, when the segmentation signal indicates a character, if the emphasis coefficient αt with respect to the edge quantity correction units 217 to 224 is set to 6, and the emphasis coefficient αt with respect to the edge quantity correction units 225 to 232 is set to 4, the filter property as shown in FIG. 5 can be obtained, where sufficient emphasis can be given to the character portion.

Figure 6:
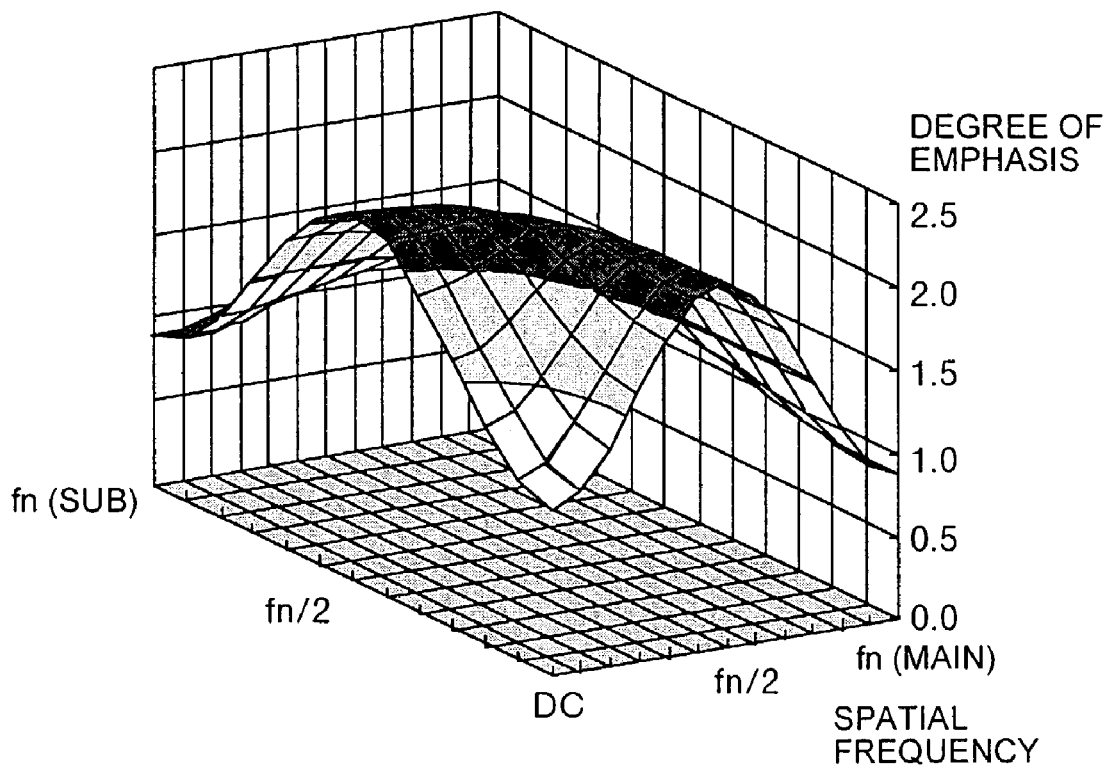
FIG. 6 shows a filter property suitable for a pattern portion in an image.

When the segmentation signal indicates a non-character, if the emphasis coefficient αh with respect to the edge quantity correction units 217 to 224 is set to 4, and the emphasis coefficient αh with respect to the edge quantity correction units 225 to 232 is set to 0, the filter property as shown in FIG. 6 can be obtained, which is suitable for a pattern portion such as a dot image.

The characteristic configuration of this invention, that is, the configuration in which the positions of the segmentation signals input by the respective edge quantity extraction filters are different, is explained, with reference to FIG. 2. For example, in the edge quantity extraction unit a (201) in FIG. 2, as shown in FIG. 3A, the left pixel position of the target pixel X is the mask center position Z, and the segmentation result corresponding to this position is input.

Figure 7:
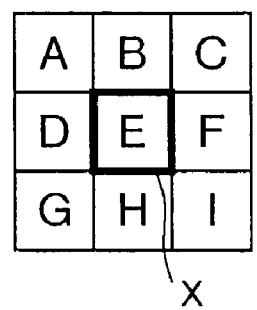
FIG. 7 shows a position in each direction with respect to a target pixel.

FIG. 7 shows a position in each direction with respect to the target pixel. With respect to the position E of the target pixel X in FIG. 7, the segmentation result for the left position D is output to the edge quantity correction unit 217. Similarly, the segmentation result for the position B is output to the edge quantity correction unit 218, and the segmentation result for the position F is output to the edge quantity correction unit 219. The segmentation result for the position G is output to the edge quantity correction unit 224. In this manner, the segmentation results for the upper, lower, right, left, and diagonal positions (A to I) are output, based on the target pixel X.

In the edge quantity correction units 225 to 232, since the mask center position Z in the corresponding filter diagrams 3I to 3P are handled so as to agree with the position of the target pixel X, the segmentation results corresponding to the position E in FIG. 7 are output in all cases.

As shown in FIG. 2, the edge quantities after correction by the respective edge quantity correction units 217 to 232 are added to the input image signal by the addition units 233 to 248, and are synthesized and filter-processed. In this manner, the edge quantity correction units 217 to 232 switch the emphasis coefficient αt for characters and the emphasis coefficient αh for non-characters and apply it, corresponding to the character or non-character segmentation signals A to I.

In this first embodiment, when the filtering processing is performed with respect to the target pixel X, the edge components corresponding to the respective positions are emphasized according to the segmentation results using the matrix of 3×3, centering on the target pixel X, and the characteristic thereof is determined by adding these. Therefore, even if there is a place where dots and characters are misseparated in the processing process of a dot image or the like, if the most of the circumference thereof is judged to be non-characters, strong emphasis is not applied, and hence a defect due to missegmentation can be reduced.

Figure 8:
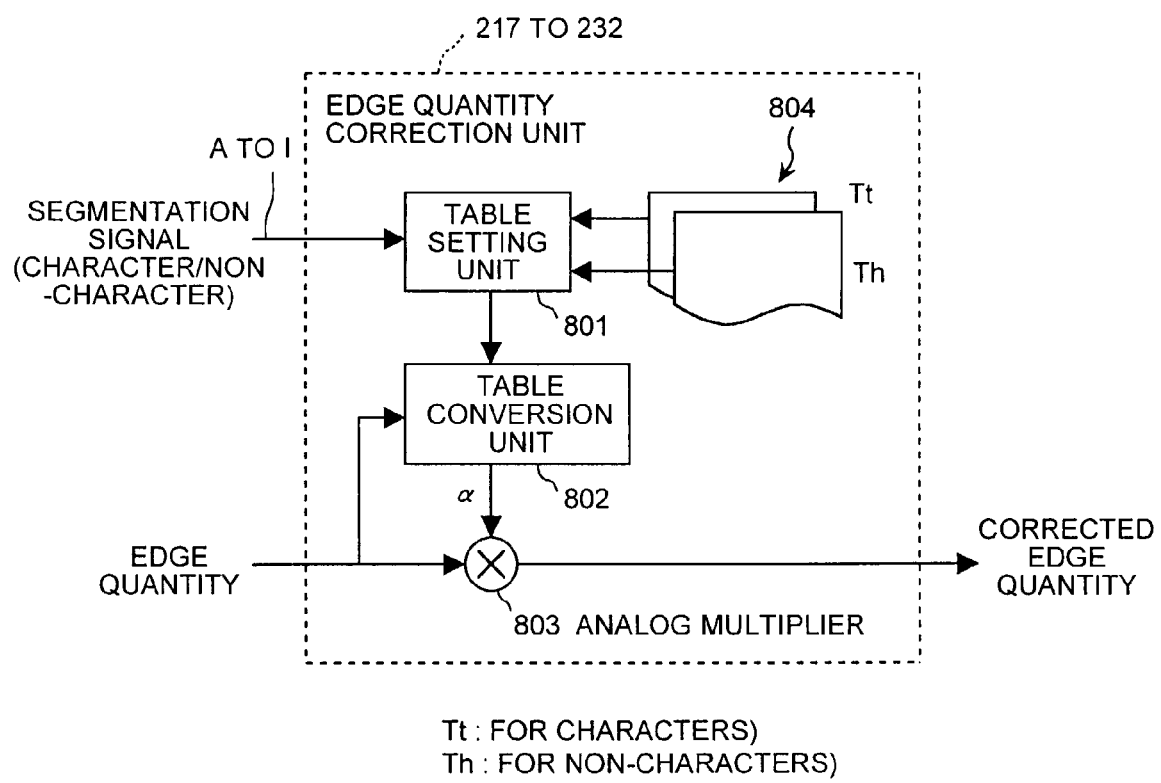
FIG. 8 is a block diagram of the edge quantity correction unit according to a second embodiment of the present invention.

As a second embodiment, the emphasis coefficient is changed adaptively corresponding to the size of the input edge quantity, while using the configuration of the first embodiment (see FIG. 1 and FIG. 2). FIG. 8 is a block diagram of any of the edge quantity correction units 217 to 232 (see FIG. 2) according to the second embodiment of the present invention.

In a table setting unit 801, segmentation signals A to I are input. An emphasis coefficient Tt for characters and an emphasis coefficient Th for non-characters corresponding to characters and non-characters are stored in a look-up table format in advance in a memory 804 as a conversion table. The table setting unit 801 reads the relevant conversion table corresponding to whether the segmentation signal A to I indicates a character or a non-character, and outputs the emphasis coefficient Tt for characters or the emphasis coefficient Th for non-characters to a table conversion unit 802.

When the segmentation signals A to I are characters, the conversion table of the emphasis coefficient Tt for characters is selected and read. When the segmentation signals A to I are non-characters, the conversion table of the emphasis coefficient Th for non-characters is selected and read. The table conversion unit 802 determines the emphasis coefficient α corresponding to the input edge quantity, based on the read emphasis coefficient Tt for characters or the emphasis coefficient Th for non-characters, and outputs the emphasis coefficient α to an analog multiplier 803. The analog multiplier 803 multiplies the input edge quantity by the emphasis coefficient α, and outputs the result as an edge quantity after correction.

Figure 9:
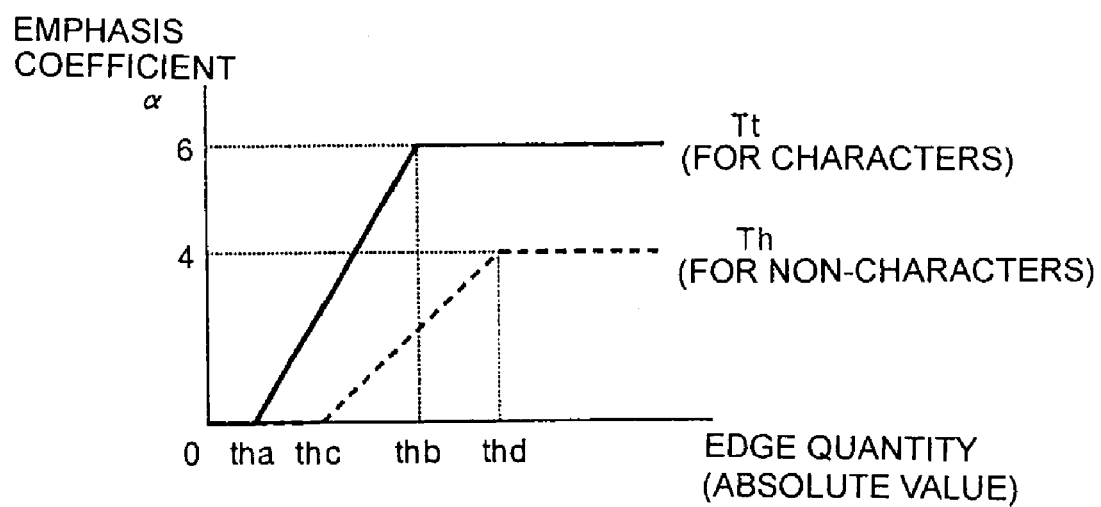
FIG. 9 shows an emphasis coefficient for characters and an emphasis coefficient for non-characters stored in a conversion table.

FIG. 9 shows the emphasis coefficient for characters and for non-characters stored in the conversion table in the memory 804. In this figure, one example of correction contents by the edge quantity correction unit 217 is shown. The conversion table outputs the emphasis coefficient α corresponding to the absolute value of the edge quantity. When the absolute value of the edge quantity is small, the emphasis coefficient α is set to 0 (that is, not emphasized), and as the absolute value of the edge quantity increases, the emphasis coefficient α is increased, and when the absolute value of the edge quantity exceeds a predetermined threshold, the emphasis coefficient α is saturated to a predetermined emphasis coefficient α. In this example, in the case of the emphasis coefficient Tt for characters, the emphasis coefficient α saturates at 6, when the edge quantity becomes Thb or higher, and in the case of the emphasis coefficient Th for non-characters, the emphasis coefficient α saturates at 4, when the edge quantity becomes Thd (a value larger than Thb) or higher.

By controlling in this manner, a noise level signal or undulate components in a dot image having a relatively small edge quantity are not emphasized, and on the other hand, significant density undulation can be emphasized. Further, the character portion can be emphasized strongly than in a pattern portion, by setting the maximum value of the emphasis coefficient for characters to a large value, with respect to the maximum value of the emphasis coefficient for non-characters, thereby excellent sharpness control can be performed.

According to the second embodiment, since the filter strength can be adaptively controlled, with respect to the character area and the non-character area, high-quality image reproduction becomes possible. In the present invention, an example in which the character area and the non-character area are adaptively controlled is shown. However, in order to simplify the configuration, the configuration may be such that a fixed emphasis coefficient is applied to the character area, and the adaptive correction is performed only for the non-character area such as a dot image, where relatively fine control is necessary, based on the edge quantity.

In the second embodiment, an example of a correction method is shown in which a conversion table storing a value to be multiplied to the extracted edge quantity is selectively read to perform multiplication. However, if the configuration is such that correction is performed using a table in which after direct correction is performed with respect to the edge quantity, the edge quantity is output, correction having greater freedom can be performed. Alternatively, a configuration using a conversion expression may be used.

Figure 10:
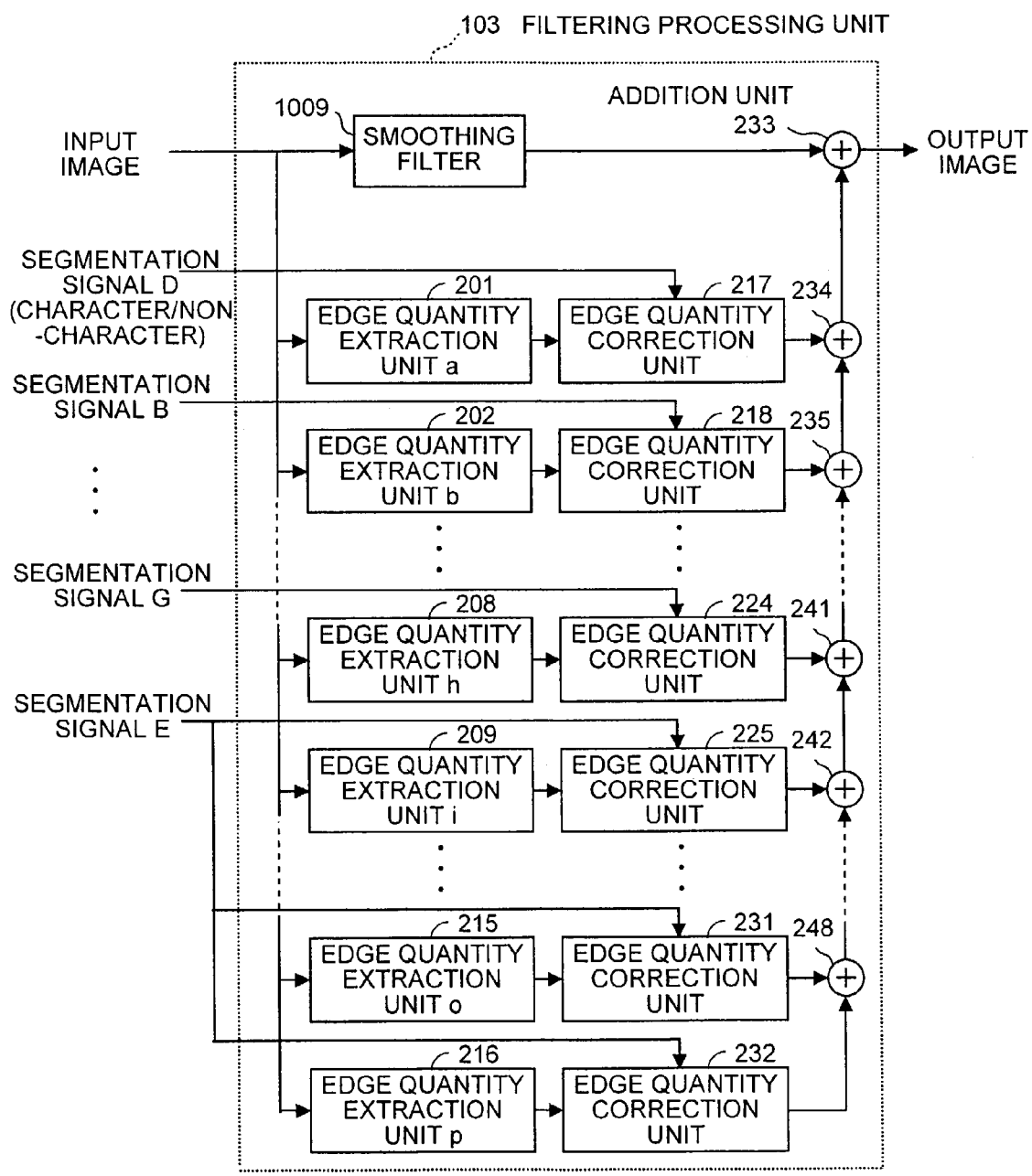
FIG. 10 is a block diagram of the filtering processing unit according to a third embodiment of the present invention.

FIG. 10 is a block diagram of the filtering processing unit 103 according to a third embodiment of the present invention. The overall configuration of the image processor in the third embodiment is similar to that of the first embodiment, and hence the explanation thereof is omitted.

As shown in FIG. 10, the filtering processing unit 103 in the third embodiment performs smoothing with respect to the input image signal by a smoothing filter 1009, and signals from the respective edge quantity correction units 217 to 232 are synthesized with the smoothed image signal. In the configuration shown in the figure, the components similar to those in the first embodiment (FIG. 2) are denoted by the same reference signs. The components are the same as those of shown in FIG. 2, except that the smoothing filter 1009 is added.

When all emphasis coefficients multiplied by the edge quantity correction units 217 to 232 are 0, the edge quantity after the correction becomes all 0, and the output image signal from the filtering processing unit 103 in this embodiment becomes one obtained by applying the smoothing filter 1009 to the input image signal. Because of such a configuration, the filter property obtained comprehensively can be controlled under various strength from smoothing to emphasizing, thereby realizing a filtering processing with a wide coverage.

Figure 11:
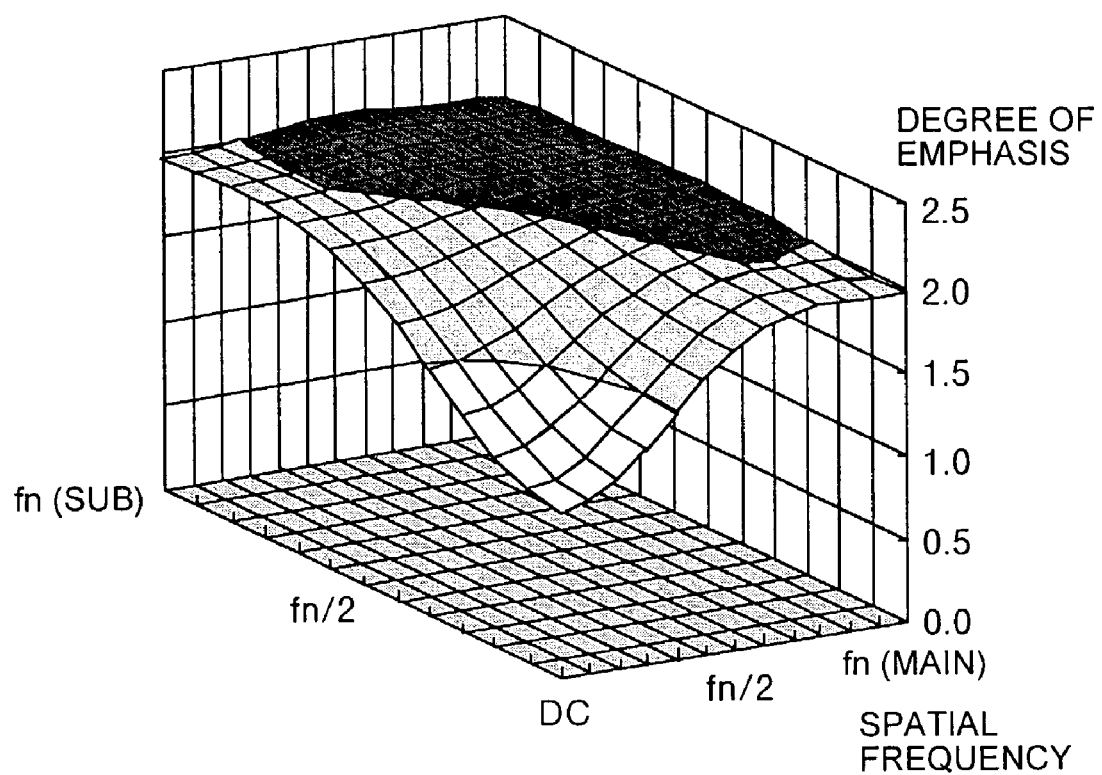
FIG. 11 shows a filter property at the time of outputting a signal without correcting it by the edge quantity correction unit.

FIG. 11 shows a filter property, when the edge quantity correction units 217 to 232 in the first embodiment (see FIG. 2) or in the third embodiment (see FIG. 10) do not perform correction, and the edge quantity output by the edge quantity extraction units 201 to 216 are directly output. The overall configuration of the image processor according to a fourth embodiment is similar to that of the third embodiment (see FIG. 1 and FIG. 10), but in the fourth embodiment, the property of the smoothing filter 1009 (see FIG. 10) is set as follows. That is, when the edge quantity correction units 217 to 232 directly output the edge quantity from the edge quantity extraction units 201 to 216 as the edge quantity after correction, without correcting the edge quantity (that is, multiply the edge quantity output from the edge quantity extraction units by 1 and output the results), the property of the smoothing filter 1009 is set such that the filter property of the output image finally obtained is roughly 1 (filter through), that is, substantially 1 (including 1), with respect to the whole bands.

Figures 12, 13:
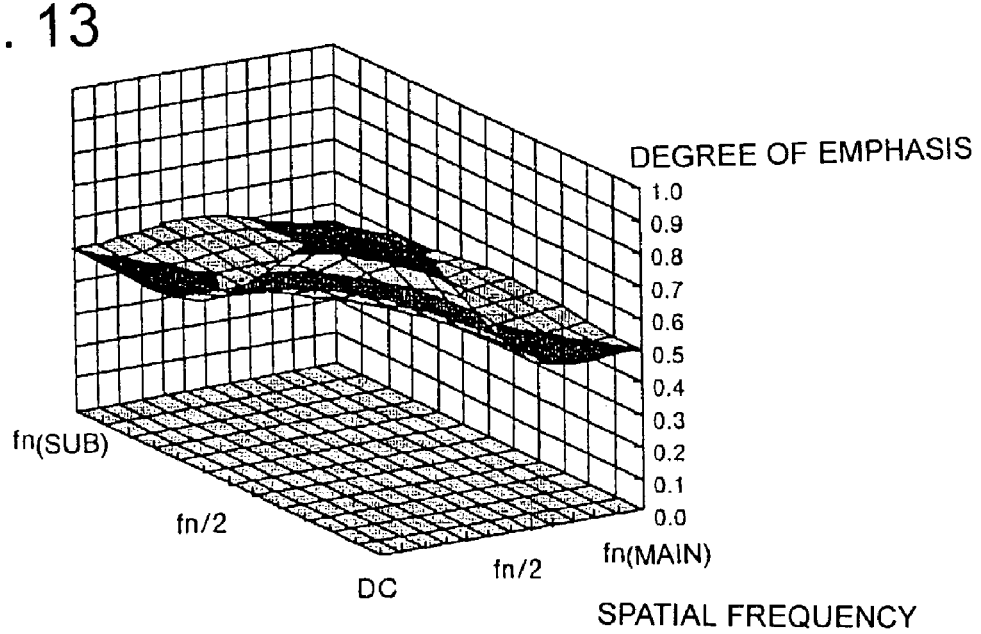
FIG. 12 is a matrix diagram that shows a filter coefficient of a smoothing filter in a fourth embodiment of the present invention.
FIG. 13 shows a filter property of the smoothing filter.

FIG. 12 is a matrix diagram that shows a filter coefficient of the smoothing filter 1009. As described above, when the correction by the respective edge quantity correction units is not performed, the shown coefficient is applied to the input image signal, thereby realizing a filter in which the emphasis degree becomes 1 substantially over the whole bands, at the time of synthesis. FIG. 13 shows a filter property of the smoothing filter 1009 in FIG. 12.

Setting the filter property in this manner is very effective in designing the parameter. When it is desired to have a filter property close to the filter through image, the emphasis coefficient α is set to about 1, and when it is desired to emphasize the image, the emphasis coefficient α is made sufficiently larger than 1, and on the contrary, when it is desired to smooth the image, the emphasis coefficient α is set to a value less than 1. These emphasis coefficients can be controlled for each band, and for each direction. As a result, there is the merit that an unrestrained filter property can be easily realized.

The image processor according to a fifth embodiment of the present invention is substantially the same as that of the third embodiment (see FIG. 1 and FIG. 10), but different from that of the third embodiment in that the property of the smoothing filter 1009 (see FIG. 10) is set to the optimum property for processing a dot image, and when a segmentation signal indicating a non-character is supplied, correction is performed such that all edge quantities are made 0 by the edge quantity correction units 217 to 232 (that is, the edge quantities from the edge quantity extraction units are multiplied by 0). By having such a configuration, the filter property applied to the image signal by the filtering processing unit 103 in the fifth embodiment becomes a property of the smoothing filter 1009, and is very effective in designing the parameter. In other words, the emphasis coefficient α is set to 0 for a pattern portion, and the emphasis coefficient α other than 0 is applied to other characters. In this embodiment, the smoothing filter 1009 is used, but when the most suitable filter property for the pattern portion such as a dot image and a continuous tune image is used, a band emphasizing type, such a filter may be used.

In a sixth embodiment of the present invention, the configuration is such that a filter (filtering processing unit 103) realized by synthesizing edge components at a plurality of positions is efficiently performed, by using wavelet transform, and the overall configuration is similar to that of the first embodiment shown in FIG. 1.

Realizing the filter by the wavelet transform is a method in which the band is repetitively divided by a sub-band, and hence there is an advantage in that calculation is simple. Further, if a basis function such as Harr is used, the low frequency component obtained by band division becomes an image after smoothing processing. Therefore, the smoothed image can be easily obtained by cutting the high frequency component, and it is efficient, since it is not necessary to prepare a separate smoothing filter.

A configuration is explained, in which the input image signal is transformed to a coefficient signal in the frequency space by sub-band coding such as wavelet transform, and processing is performed with respect to the transformed signal, to thereby obtain the similar effect.

Figure 14:
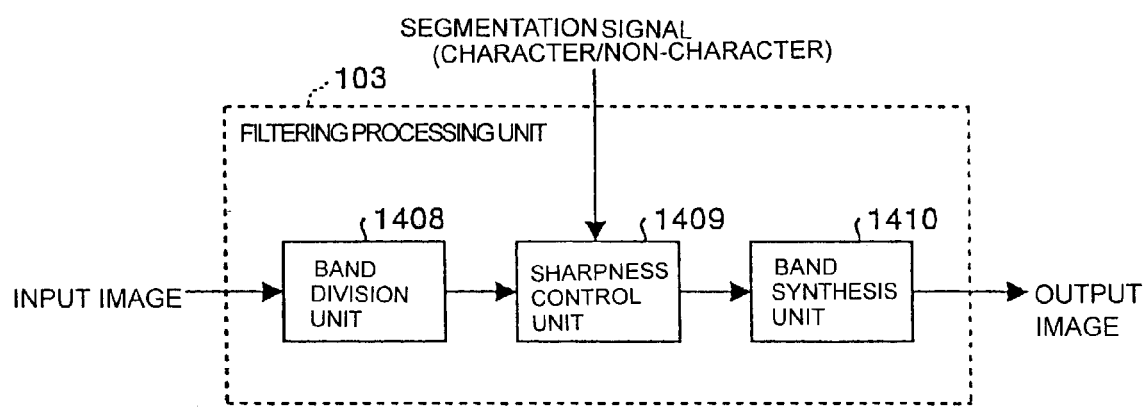
FIG. 14 is a block diagram of the filtering processing unit in a sixth embodiment of the present invention.

FIG. 14 is a block diagram of the filtering processing unit 103 in the sixth embodiment. As shown in this figure, the input image signal is first input to a band division unit 1408, and is resolved to a plurality of image band signals. A segmentation signal is input to a sharpness control unit 1409, and the sharpness control unit 1409 performs predetermined emphasizing processing and smoothing processing of the image, corresponding to the character information and the non-character information. A band synthesis unit 1410 inversely transforms the signal to a real space image signal, and outputs the signal.

Figure 15:
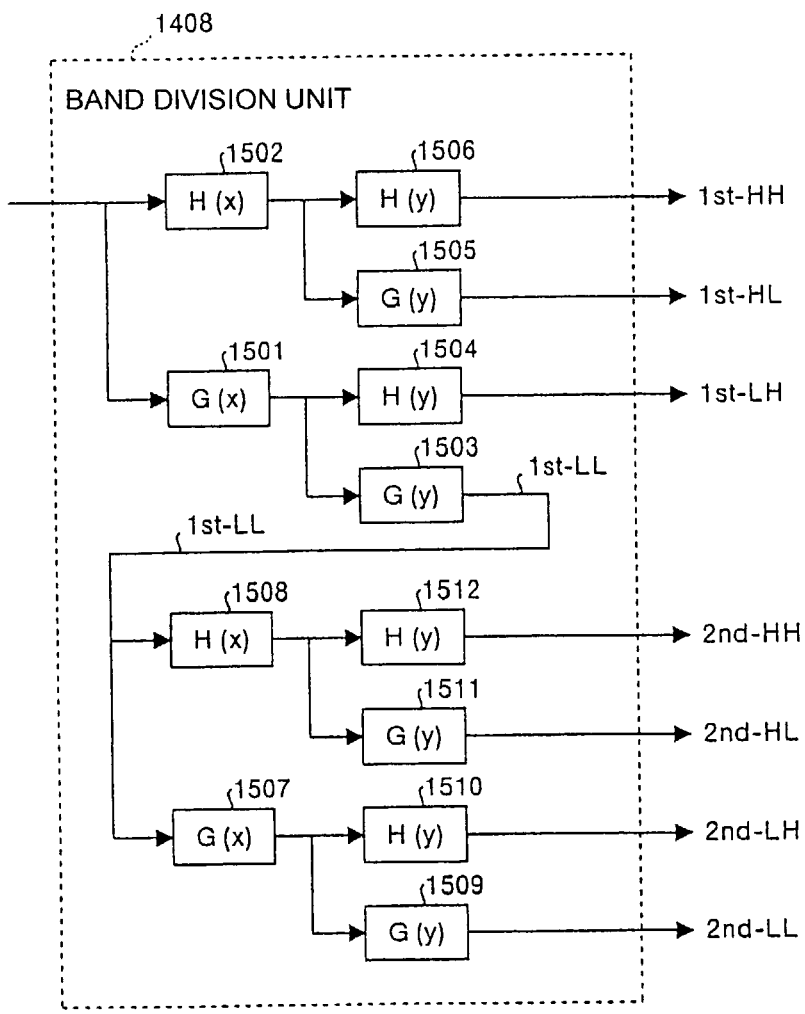
FIG. 15 is a block diagram that explains wavelet transform processing in a band division unit provided in the filtering processing unit in the sixth embodiment.

FIG. 15 is a block diagram that explains the wavelet transform processing in the band division unit 1408. The input image signal is first input to a low-pass filter G(x) 1501 and a high-pass filter H(x) 1502, and subjected to the wavelet transform in the x direction.

Figure 16A:
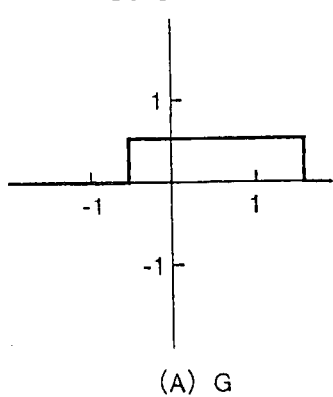
FIGS. 16A and 16B shows properties of a low-pass filter and a high-pass filter provided in the band division unit in the sixth embodiment.
Figure 16B:
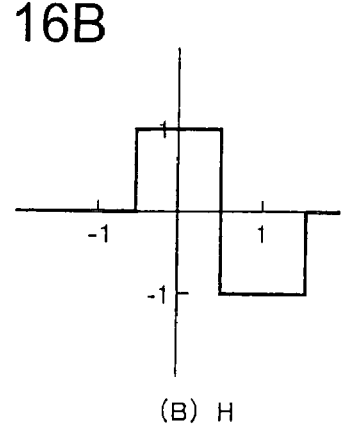

FIGS. 16A and 16B show the properties of the low-pass filter G(x) 1501 and the high-pass filter H(x) 1502. The low-pass filter G(x) 1501 is a low frequency component extraction filter for obtaining a mean-value component as shown in FIG. 16A. The high-pass filter H(x) 1502 is a high frequency component extraction filter for obtaining a difference component as shown in FIG. 16B.

In the sixth embodiment, the wavelet basis function (Harr) having a property as shown in FIG. 16 is explained as an example. Wavelet transform in the y direction is performed with respect to the obtained image signal, by filter groups 1503, 1504, 1505, and 1506 (FIG. 15). What is obtained by this transform is a first hierarchy wavelet coefficient.

The output 1st-LL shown in FIG. 15 is a first hierarchy low frequency component, and is an image signal obtained by determining a mean value of 2×2 pixels with respect to the original image. The output 1st-LH is a first hierarchy horizontal high frequency component, and is an image signal obtained by extracting an edge signal in a horizontal direction, equivalent to the Nyquist frequency. Similarly, the output 1st-HL is a first hierarchy vertical high frequency component, and is an image signal obtained by extracting an edge signal in a vertical direction, and the output 1st-HH is an image signal obtained by extracting an edge signal in a diagonal direction.

Figure 17:
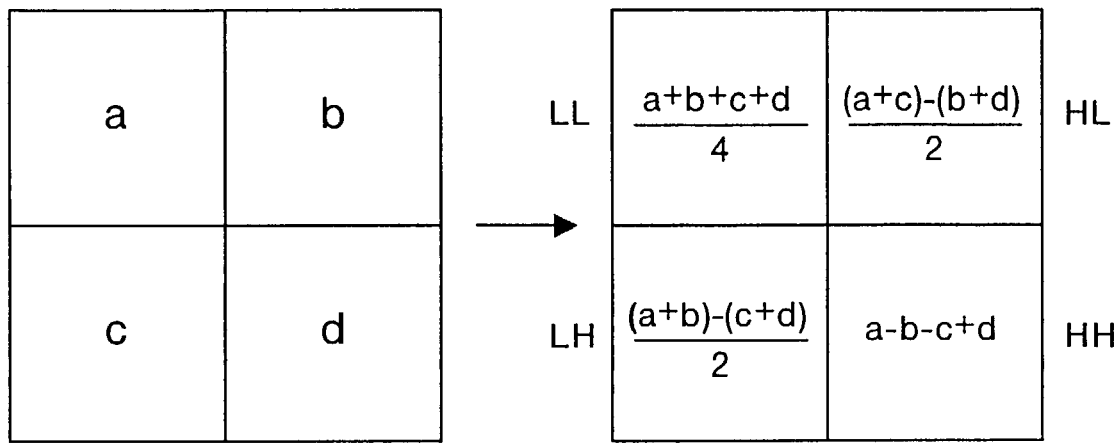
FIG. 17 shows the processing content (before and after transform) of the wavelet transform.

FIG. 17 shows the processing content (before (left) and after transform (right)) of the wavelet transform. As shown in the figure, it is seen that the wavelet transform is a transform for extracting a mean value and an edge component in the respective directions.

As shown in FIG. 15, second hierarchy wavelet transform is carried out in the same procedure, with respect to the obtained output 1st-LL. As a result, outputs 2nd-LL, 2nd-LH, 2nd-HL, and 2nd-HH of the image signal transformed by the filter groups 1507 to 1512 are obtained.

The output 2nd-LL is an image signal that obtains a mean value of 4×4 pixels, and is an image signal in a lower frequency band than that of the first hierarchy. Similarly, the output 2nd-LH is a component in a lower frequency band than 1st-LH, and is an image signal obtained by extracting the horizontal edge in the frequency band, being half of the Nyquist frequency. Similarly, the output 2nd-HL is a second hierarchy vertical high frequency component, and is an image signal obtained by extracting a vertical frequency edge signal in a lower frequency than 1st-HL, and the output 2nd-HH is an image signal obtained by extracting an edge signal in a diagonal direction. As described above, wavelet coefficient signals up to the second hierarchy (outputs 1st-LL to 1st-HH, and outputs 2nd-LL to 2nd-HH) are obtained.

Figure 18:
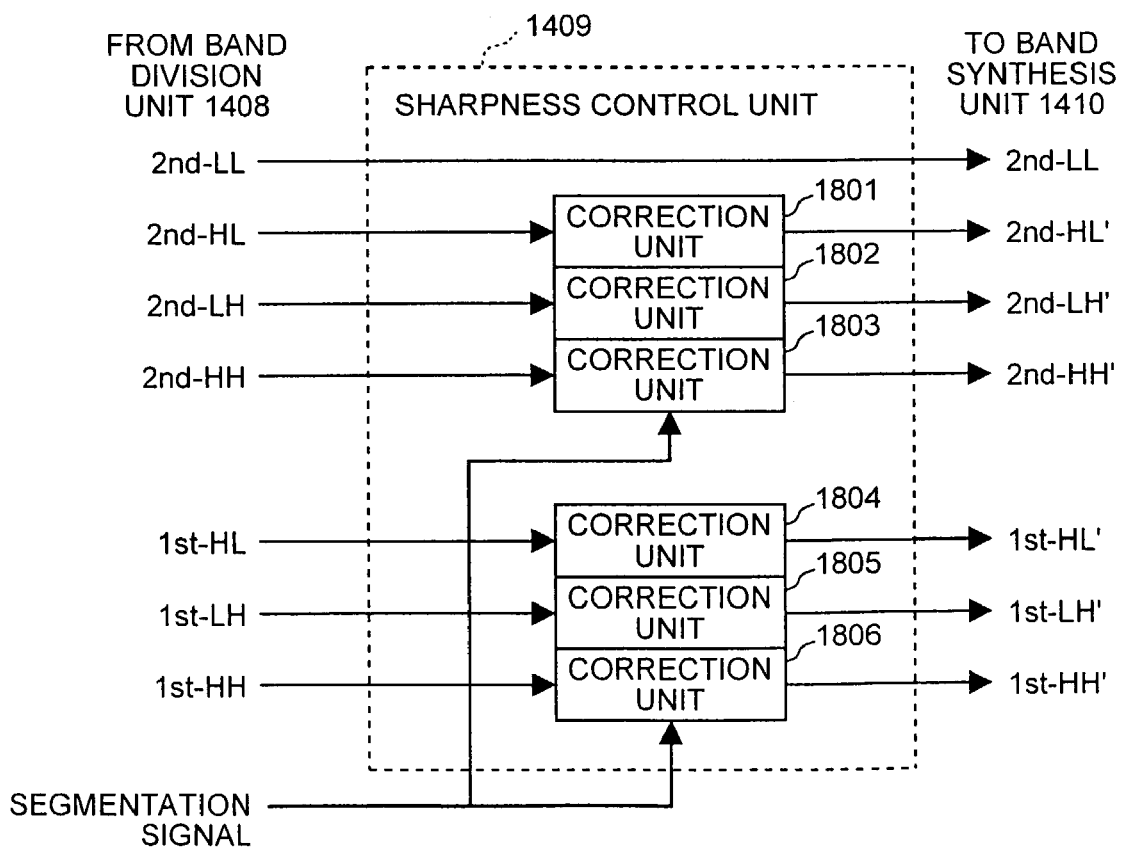
FIG. 18 is a block diagram that explains the operation of a sharpness control unit provided in the band division unit in the sixth embodiment.

The operation of the sharpness control unit 1409 is explained, with reference to the block diagram shown in FIG. 18. The sharpness control unit 1409 performs emphasizing processing and smoothing processing of the image signal, based on the segmentation signal. As shown in FIG. 18, correction units 1801 to 1806 perform predetermined correction with respect to the first hierarchy high frequency components (outputs 1st-HL, 1st-LH, 1st-HH) and the second hierarchy high frequency components (outputs 2nd-HL, 2nd-LH, 2nd-HH), corresponding to the segmentation signal.

Figure 19:
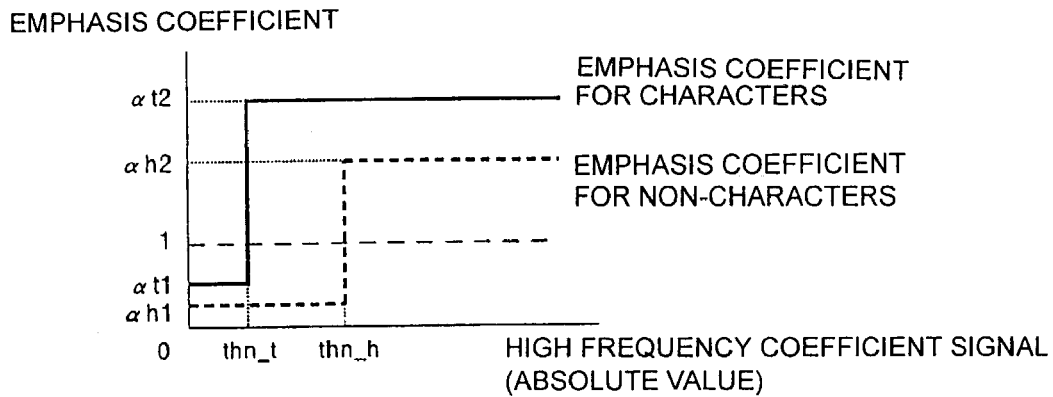
FIG. 19 shows the correction processing in a correction unit provided in the sharpness control unit in the sixth embodiment.

FIG. 19 shows the correction processing by the correction units 1801 to 1806. As shown in the figure, when the absolute value of the high frequency coefficient signal input to the correction units 1801 to 1806 is smaller than a predetermined noise rejection threshold (thn_t for pixels in a character area, and thn_h (a larger value than thn_t) for pixels in a non-character area), the correction units 1801 to 1806 multiply the value of the input high frequency coefficient signal by a relatively small emphasis coefficient $\alpha$ ($\alpha t1$ for pixels in the character area, and $\alpha h1$ for pixels in the non-character area), to thereby perform correction such that the value of the coefficient signal after correction becomes very small.

When the absolute value of the high frequency coefficient signal is not smaller than the noise rejection threshold, the correction units 1801 to 1806 multiply the value of the input high frequency coefficient signal by a relatively large emphasis coefficient $\alpha$ ($\alpha t2$ for pixels in the character area, and $\alpha h2$ for pixels in the non-character area), and output the result.

By controlling in this manner, a high frequency component smaller than the noise rejection threshold can be attenuated as noise, and hence the same image as that obtained by smoothing can be obtained, and since the high frequency component not smaller than the noise rejection threshold is emphasized as a significant signal, the difference component increases, and as a result, an image to which the emphasized filtering processing is applied can be obtained.

The noise rejection threshold and the respective emphasis coefficients can be set respectively independently, for each of different frequency bands (1st, 2nd) and for each of different direction components (HL, LH, HH), and corresponding to the segmentation signal. In other words, since the size of the high frequency component to be removed in the respective bands and directions and the degree of emphasis can be controlled, fine noise rejection (smoothing) and emphasizing can be performed.

The emphasis coefficient $\alpha$ for characters is set to be larger than the emphasis coefficient $\alpha$ for non-characters, so that sharpness of characters and line drawing, graininess of a pattern portion, and moire suppression are realized. The noise rejection threshold for non-characters can attenuate relatively large high frequency components by being set to be higher than the noise rejection threshold for characters, thereby moire in a dot portion can be suppressed, and the graininess can be improved. After having performed such a correction, the high frequency coefficient signal after correction is input to the band synthesis unit 1410, and is inversely transformed into a real space image.

Figure 20:
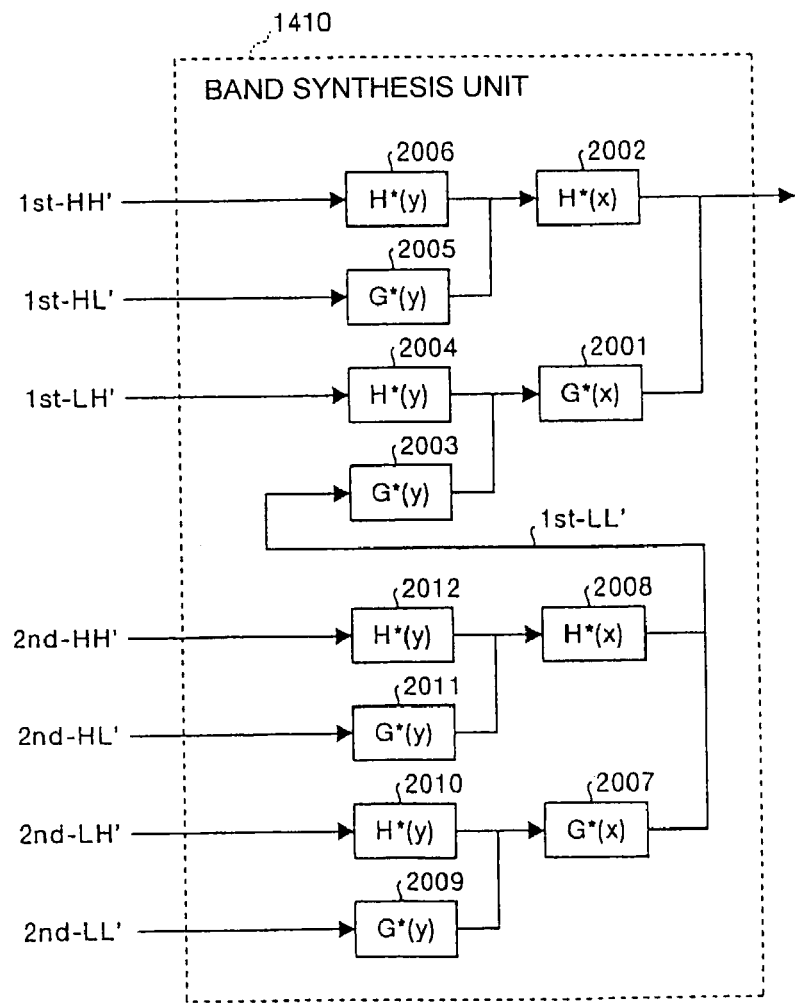
FIG. 20 is a block diagram of a band synthesis unit provided in the filtering processing unit in the sixth embodiment.

FIG. 20 is a block diagram of the band synthesis unit 1410. The band synthesis processing is performed from a higher hierarchy wavelet coefficient signal. The second hierarchy coefficient signals, that is outputs 2nd-LL' and 2nd-LH', are inverted in the y direction by inversion filter H*(y) 2010 and G*(y) 2009, and further inverted in the x direction by an inversion filter G*(x) 2007. Similarly, the second hierarchy coefficient signals, that is outputs 2nd-HH' and 2nd-HL', are inverted in the y direction by inversion filter H*(y) 2012 and G*(y) 2011, and further inverted in the x direction by an inversion filter G*(x) 2008.

The image signal obtained by the inversion is a first hierarchy LL signal after correction (1st-LL'), and is subjected to similar band synthesis processing together with other first hierarchy coefficient signals after correction (output 1st-HL', 1st-LH', 1st-HH'), by inversion filters H*(y) and G*(y) 2003 to 2006, and an inversion filter H*(x) 2001 and an inversion filter G*(x) 2002. In this manner, a real space image signal after filtering processing can be obtained.

Figure 21:
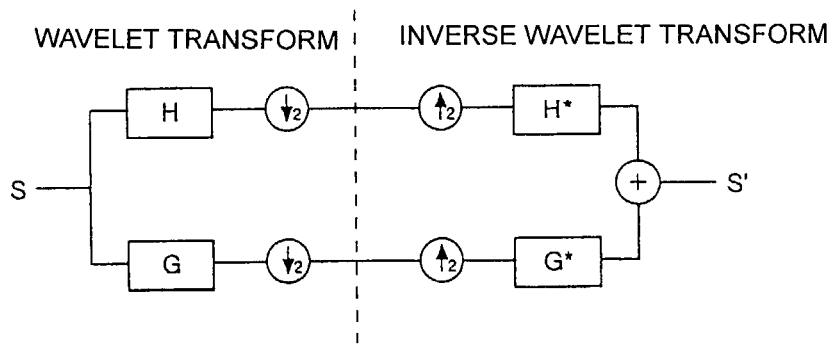
FIG. 21 shows a procedure of the wavelet transform for performing subsampling.

The wavelet transform performed by the filtering processing unit 103 in the sixth embodiment has a configuration in which subsampling (decimation of pixels) normally performed in the compression processing is not performed. The processing content of the wavelet transform that performs subsampling is shown in FIG. 21. As shown in this figure, once the processing by the high-pass filter and the low-pass filter is over, processing for decimation of one pixel into two pixels is performed, to thereby obtain a coefficient signal. In the inverse transform, upsampling is performed, and inversion is carried out by the inversion filters.

Figure 22:
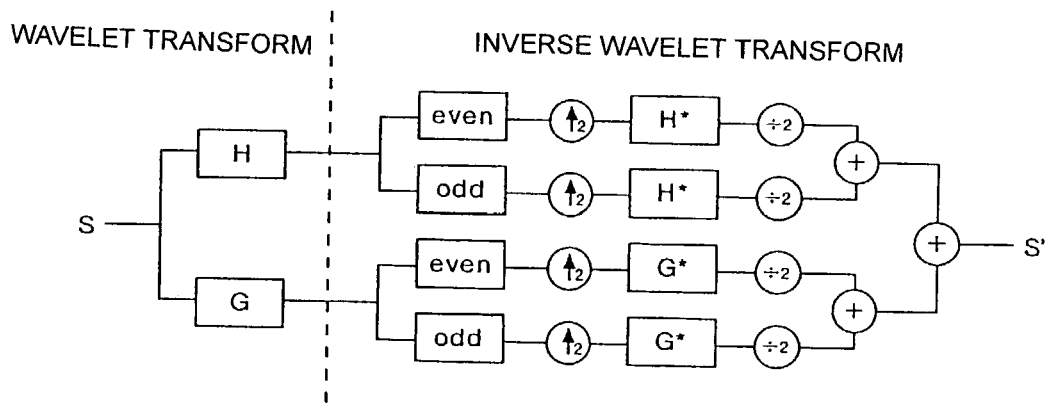
FIG. 22 shows a procedure of the wavelet transform according to the sixth embodiment.
Figure 23:
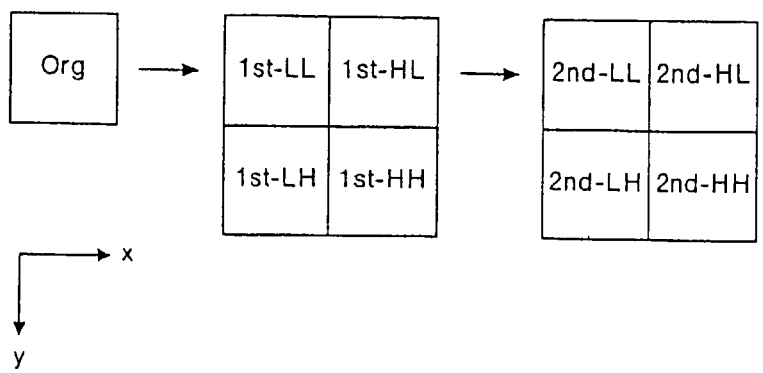
FIG. 23 shows an input image at the time of wavelet transform in the sixth embodiment, and an image size of coefficient signals in each hierarchy and in each direction.

As shown in FIG. 22, in the wavelet transform in the sixth embodiment, downsampling is not performed at the time of normal transform. Therefore, as shown in FIG. 23, the image size of the coefficient signal in each hierarchy and each direction becomes the same size as that of the input image Org. At the time of inverse transform, as shown in FIG. 22, upsampling is performed respectively for each of the even pixel group and the odd pixel group, to perform inverse transform by the inversion filters. In this manner, the inversion result from the even and odd pixel groups can be obtained with respect to one original image pixel, and hence these are averaged, to obtain the image data after the inversion transform.

Figure 24:
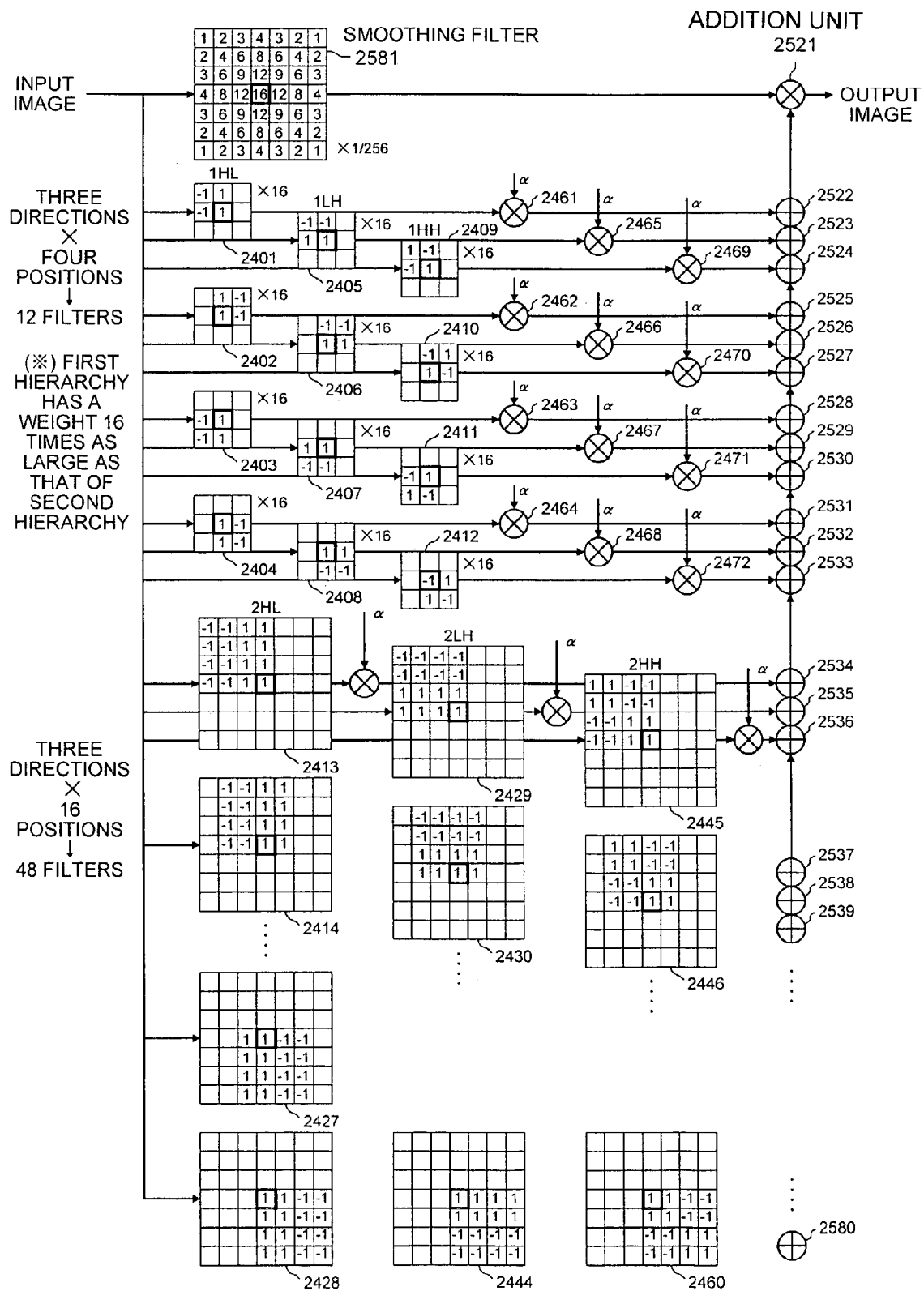
FIG. 24 shows an equivalent circuit, when filtering processing is developed with respect to an adaptive edge filter in a real space in the embodiments, such that wavelet transform without decimation is performed up to the second hierarchy, to thereby control sharpness.

FIG. 24 shows an equivalent circuit, when filtering processing is developed with respect to an adaptive edge filter in a real space in the first to sixth embodiments, such that wavelet transform (transform basis is Harr) without decimation is performed up to the second hierarchy, to thereby control sharpness.

As shown in FIG. 24, it can be considered that the input image signal is a signal obtained by correcting components obtained by 60 primary differential filters and adding these to the processing result of one smoothing filter. The edge extraction filters 2401 to 2412 are high frequency components extracted by the first hierarchy wavelet transform, wherein filters 2401 to 2404 are first hierarchy vertical components (1st-HL), and four components with the position shifted with respect to the target pixel (a pixel enclosed by a thick square in the figure), respectively.

Reference sign 2401 denotes a filter in which a lower right pixel in the primary differential filter having a size of 2×2 becomes the position of the target pixel, the filter 2402 is a filter in which a lower left pixel becomes the target pixel, the filter 2403 is a filter in which an upper right pixel becomes the target pixel, and the filter 2402 is a filter in which an upper left pixel becomes the target pixel. Similarly, filters 2405 to 2408 are first hierarchy horizontal components (1st-LH), and filters 2409 to 2412 are first hierarchy diagonal components (1st-HH), and four components with the position shifted with respect to the target pixel, respectively. As described above, it is equivalent to that the primary differential filters corresponding to first hierarchy high frequency component exist in three directions (vertical, horizontal, and diagonal directions), and at four positions (upper right, lower right, upper left, and lower left), respectively, that is, in total 12 filters exist.

The edge extraction filters 2413 to 2460 are high frequency components extracted by the second hierarchy wavelet transform, and filters 2413 to 2428 are second hierarchy vertical component (2nd-HL), and 16 components with the position shifted with respect to the target pixel (a pixel enclosed by a thick square in the figure), respectively. These correspond to 16 edge extraction filters installed so as to be shifted in order, so that the respective positions of the primary differential filters having a size of 4×4 becomes the target pixel. Similarly, filters 2429 to 2444 are second hierarchy horizontal components (2nd-LH), and filters 2445 to 2460 are second hierarchy diagonal components (2nd-HH), and 16 components with the position shifted with respect to the target pixel, respectively. As described above, it is equivalent to that the primary differential filters corresponding to second hierarchy high frequency component exist in three directions, and at sixteen positions, that is, in total 48 filters exist.

This configuration is equivalent to a configuration in which an edge is extracted by 60 primary differential filters in total in the first hierarchy and second hierarchy, and the mask center position of the edge extraction filter can be alienated from the target pixel, as in the filter (filtering processing unit 103) described in the first embodiment (see FIG. 2).

The components obtained by these edge extraction filters 2401 to 2460 are multiplied by the predetermined emphasis coefficient α by analog multipliers 2461 to 2520 (partly, particularly, the vicinity of 2520 is not shown) and corrected, and then synthesized with a signal after passing through the smoothing filter 2581 by addition units 2521 to 2580 (partly, particularly, the vicinity of 2480 is not shown), and are output.

The emphasis coefficient α for correcting the respective edge extracted components is individually set for each component, and as shown in FIG. 19, a coefficient respectively suitable for the character area and the non-character area is set by the segmentation signal. The segmentation signals A to I are not one signal with respect to the pixel to be processed, and are a plurality of segmentation signals corresponding to the respective positions of the respective edge extraction filters (four in the first hierarch, and sixteen in the second hierarchy), and respective directions (vertical, horizontal, and diagonal directions).

The similar effect to that of the filtering processing in the first to the sixth embodiments can be obtained by controlling the sharpness, using the wavelet transform. Further, according to the configuration using the wavelet transform, when developed in a real space filter, it is equivalent to the one constituted by primary differential filters as many as 60, and hence various fine filter properties can be realized. In the Harr transform, calculation is simple and high speed, and hence high speed processing is possible, as compared with one in which edge extraction filters are arranged in parallel in a real space to perform processing.

Figure 25:
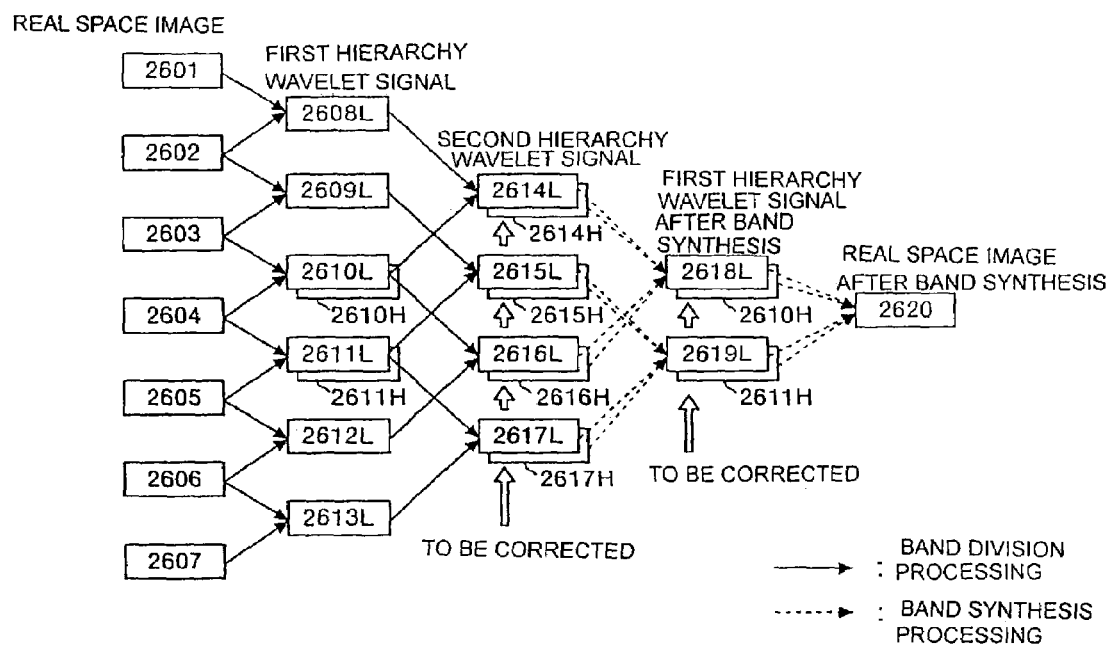
FIG. 25 shows the filtering processing using the wavelet transform.

FIG. 25 shows the filtering processing using the wavelet transform. In FIG. 25, the filtering processing using the wavelet transform in the sixth embodiment is shown one-dimensionally. In order to obtain the filtering processing result of one pixel, three pixels back and forth, that is, seven pixels are referred.

The sub-band processing is performed between adjacent pixels, using seven real space image signals 2601 to 2607. The signals are processed according to the Harr transform, to obtain first hierarchy wavelet signals, that is, six low-pass filter results 2608L to 2613L, and six high-pass filter results 2608H to 2613H. However, since 2608H, 2609H, 2612H, and 2613H are not necessary, these are not shown in the figure.

Four sets of second hierarchy wavelet signals (2614L to 2617L, 2614H to 2617H) are obtained from the obtained six low frequency components (2608L to 2613L). The second hierarchy wavelet signals can be obtained by using alternately the first hierarchy low frequency components and applying the low-pass filter and the high-pass filter thereto.

Of the obtained signals, the high frequency component (2614H to 2617H) are to be corrected, and correction of the high frequency components are performed according to the method of using the emphasis coefficient for characters and the emphasis coefficient for non-characters as explained in the second embodiment (see FIG. 9). The second hierarchy high frequency components after correction and low frequency components 2614L to 2617L are used to apply the band synthesis processing, to thereby obtain two first hierarchy wavelet signals after band synthesis (first hierarchy low frequency signals after correction) 2618L and 2619L. Further, correction is similarly performed with respect to the first hierarchy wavelet signals obtained before (first hierarchy high frequency signals) 2610H and 2611H, and band synthesis is applied thereto, using the signals after correction and the first hierarchy wavelet signals after band synthesis (low frequency components) 2618L and 2619L, to thereby obtain a real space image signal 2620 after correction, corresponding to the image signal 2604.

When considered one-dimensionally, correction is necessary with respect to four second hierarchy high frequency components and two first hierarchy high frequency components, whose positions are shifted with respect to the pixel to be processed, and by applying the segmentation result corresponding to the position respectively, one property can be realized.

The image processors explained in the first to the sixth embodiments of the present invention use segmentation result corresponding to a plurality of positions around the target pixel, when the filtering processing is performed with respect to the target pixel, emphasize the edge component corresponding to the respective positions, and the characteristic thereof is determined by totaling these. Therefore, even if there is a place misseparated as a character in the processing portion of the dot image, if the most of the circumference thereof is judged to be non-characters, strong emphasis is not applied, and hence a defect due to the segmentation error can be reduced. Further, even if the segmentation result is binary data, since it acts in multi-valued as described above, the compatibility with the binary segmentation result becomes very high.

The conventional image area segmentation processing includes a method in which the area is judged in a unit of block, a method in which hysteresis property is provided, and once it is judged as a character, the probability to be judged as a character is increased, and a method in which misseparated area included in the judgment is eliminated by expansion and contraction processing, but in these methods, the circuit size becomes large for the judgment, or tends to be complicated. However, the image processor explained in the embodiments is preferable, because it makes it easy to make the best use of the advantage in that multi-level control can be easily performed in data in which the segmentation results scatter in a small unit, than data in which the area is judged in a unit of block, or data in which scattering of the segmentation results occurs in a large unit due to the hysteresis. Therefore, even if complicated processing such as processing in a unit of block is not performed, performance of the same level or higher can be obtained, and there is a large merit in view of the cost.

When the filtering processing is performed with respect to the target pixel, segmentation results corresponding to a plurality of positions around the target pixel are used, to emphasize the edge components corresponding to the respective positions. However, only one amount of characteristic corresponding to the target pixel position or all edge components corresponding to the segmentation results may be controlled.

In the sixth embodiment, Harr type wavelet is explained as an example of the wavelet basis function, but other basis functions can be similarly applied. Application is not limited to the wavelet transform and is also possible to sub-band coding for dividing an image into a plurality of frequency bands. Further, the present invention may be applied to a system constituted of a plurality of equipment, or may be applied to apparatus consisting of one equipment.

Figure 26:
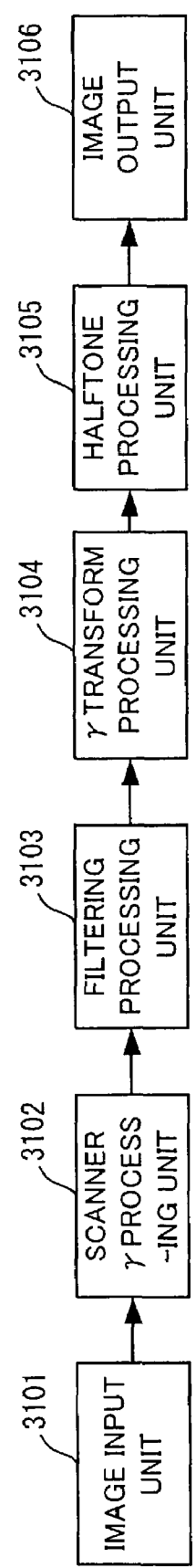
FIG. 26 is a block diagram that shows the overall configuration of an image processor according to a seventh embodiment of the present invention.

FIG. 26 is a block diagram that shows the overall configuration of the image processor according to a seventh embodiment. An image signal is input to an image input unit 3101. The image input unit 3101 is, for example, a scanner. A scanner γ processing unit 3102 transforms image data, received from the image input unit 3101 and having linear reflectivity, to image data having linear density or linear brightness. The function of the scanner γ processing unit 3102 can be made through (invalid).

The scanner γ processing unit 3102 inputs the image data to a filtering processing unit 3103. The filtering processing unit 3103 transforms the image so as to have a desired spatial frequency characteristic. The image data output from the filtering processing unit 3103 is transformed so as to have a desired density characteristic by a γ transform processing unit 3104, and further transformed to multivalued or binary image data by a halftone processing unit 3105.

The halftone processing unit 3105 may use various methods such as dither processing and error scattering. The image data output from the halftone processing unit 3105 is output to an image output unit 3106 such as an electro-photographic printer.

Figure 27:
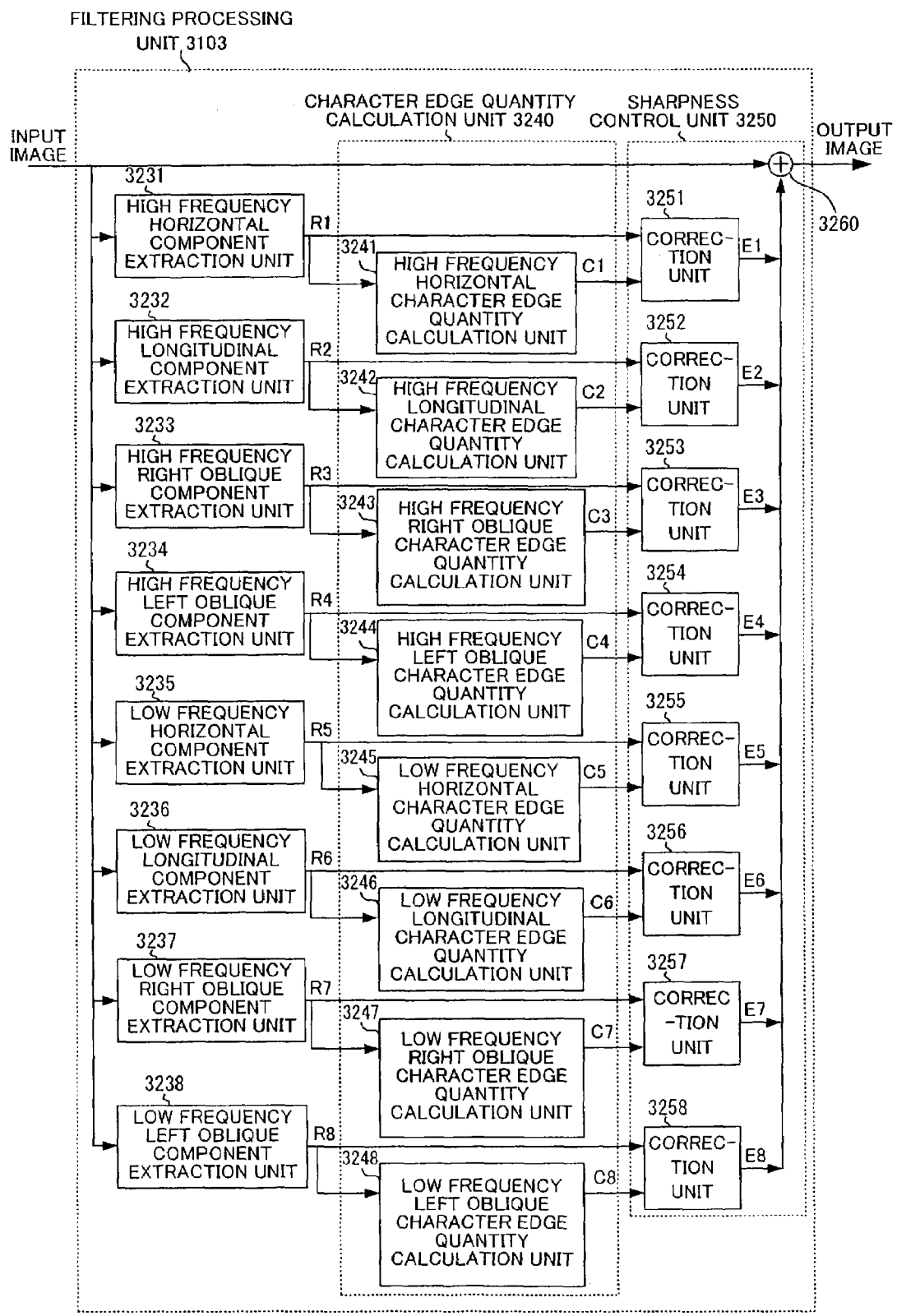
FIG. 27 is a block diagram of the filtering processing unit according to the seventh embodiment.

FIG. 27 is a block diagram of the filtering processing unit 3103 in the seventh embodiment. The image signal input (hereafter, "input image") to the image processing unit 3103 is input to component extraction units 3231 to 3238, and signals R1 to R8 having a plurality of frequency band direction components are extracted.

The component extraction units 3231 to 3238 are composed of a plurality of units formed by combining high frequency, low frequency, horizontal direction, vertical direction, right diagonal direction, and left diagonal direction, and in total eight units, that is, a high frequency horizontal component extraction unit 3231, a high frequency vertical component extraction unit 3232, . . . , and a low frequency left diagonal component extraction unit 3238 are provided. Filters having a matrix coefficient as shown in FIGS. 28 to 35 are used respectively for extracting signals R1 to R8 in these component extraction units 3231 to 3238.

A character edge quantity calculation unit 3240 uses the extracted signals R1 to R8, to calculate a character edge quantity, such as a character and a line in the input image signal. This character edge quantity calculation unit 3240 calculates the character edge quantity in the frequency and in the direction component respectively corresponding to the component extraction units 3231 to 3238. In other words, it has, in total, eight units of a high frequency horizontal character edge quantity calculation unit 3241, a high frequency vertical character edge quantity calculation unit 3242, . . . , and a low frequency left diagonal character edge quantity calculation unit 3248.

A sharpness control unit 3250 performs emphasis processing and smoothing processing of the image, corresponding to the calculation result by the character edge quantity calculation unit 3240. The sharpness control unit 3250 has eight correction units 3251 to 3258 respectively corresponding to the character edge quantity calculation units 3241 to 3248 in a plurality of frequencies and directions. The respective signals after the sharpness control has been performed are added to the input signal by an addition unit 3260, and output as an output image of the filtering processing unit 3103.

In this manner, the character edge quantity calculation unit 3240 calculates the character edge quantity for each frequency band and each direction component, and the eight correction units 3251 to 3258 in the sharpness control unit 3250 control the sharpness independently for each frequency band and each direction component, based on the calculation result.

The operation of the character edge quantity calculation unit 3240 is explained in detail, with reference to FIGS. 36 to 43. The signals R1 to R8 of the frequency band and direction components extracted by the component extraction units 3231 to 3238 in FIG. 27 are input to the character edge quantity calculation unit 3240, and the character edge quantity calculation unit 3240 extracts the character edge quantities C1 to C8 in the low frequency and high frequency regions, and horizontal, vertical, right diagonal, and left diagonal directions by the respective character edge quantity calculation units 3241 to 3248 for each frequency band and each direction component, from the signals R1 to R8, and outputs these character edge quantities.

Figure 36:
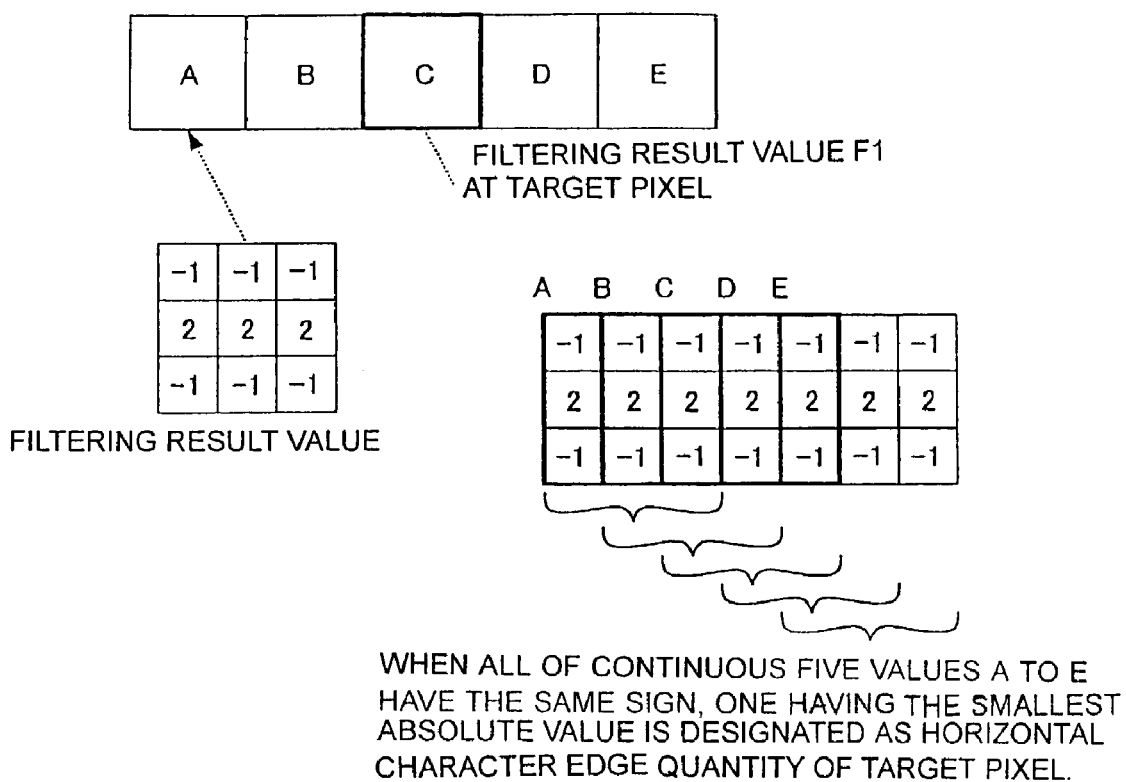
FIG. 36 shows a character edge quantity calculation process of a high frequency horizontal character edge quantity calculation unit provided in the filtering processing unit according to the seventh embodiment.

The high frequency horizontal character edge quantity calculation unit 3241 calculates the character edge quantity C1 in the high frequency horizontal direction. The calculation is performed such that a filtering result F1 shown in FIG. 28 in the target pixel is designated as a center, and the filtering results for the right and left two pixels thereof, five pixels in total, are used to calculate the character edge quantity C1 according to the following conditional expression. FIG. 36 shows the character edge quantity calculation process by the high frequency horizontal character edge quantity calculation unit 3241.

if (all of continuous five filtering results have the same sign), then (C1=smallest absolute value of five filtering results)

else (C1=0).

As shown in FIG. 36, when all of the five continuous values of horizontal pixels A to E have the same sign, a value having the smallest absolute value is designated as the horizontal character edge quantity C1.

The high frequency vertical character edge quantity calculation unit 3242 calculates the character edge quantity C2 in the high frequency vertical direction. The calculation is performed in the same manner as the character edge quantity calculation method by the high frequency horizontal character edge quantity calculation unit 3241, such that a filtering result F2 shown in FIG. 29 in the target pixel is designated as a center, and the filtering results for the upper and lower two pixels thereof, five pixels in total, are used to calculate the character edge quantity C2 according to the following conditional expression. FIG. 37 shows the character edge quantity calculation process by the high frequency vertical character edge quantity calculation unit 3242.

if (all of continuous five filtering results have the same sign),
   then (C2=smallest absolute value of five filtering results)
else
   (C2=0).

As shown in FIG. 37, when all of the five continuous values of vertical pixels A to E have the same sign, a value having the smallest absolute value is designated as the vertical character edge quantity C2.

The high frequency right diagonal character edge quantity calculation unit 3243 calculates the character edge quantity C3 in the high frequency right diagonal direction. The calculation is performed in the same manner as described above, such that a filtering result F3 shown in FIG. 30 in the target pixel is designated as a center, and the filtering results for two pixels in the upper and lower right diagonal directions thereof, five pixels in total, are used to calculate the character edge quantity C3 according to the following conditional expression. FIG. 38 shows the character edge quantity calculation process by the high frequency right diagonal character edge quantity calculation unit 3243.

if (all of continuous five filtering results have the same sign),
   then (C3=smallest absolute value of five filtering results)
else
   (C3=0).

As shown in FIG. 38, when all of the five continuous values of pixels A to E in the right diagonal direction have the same sign, a value having the smallest absolute value is designated as the character edge quantity C3 in the right diagonal direction.

Figure 39:
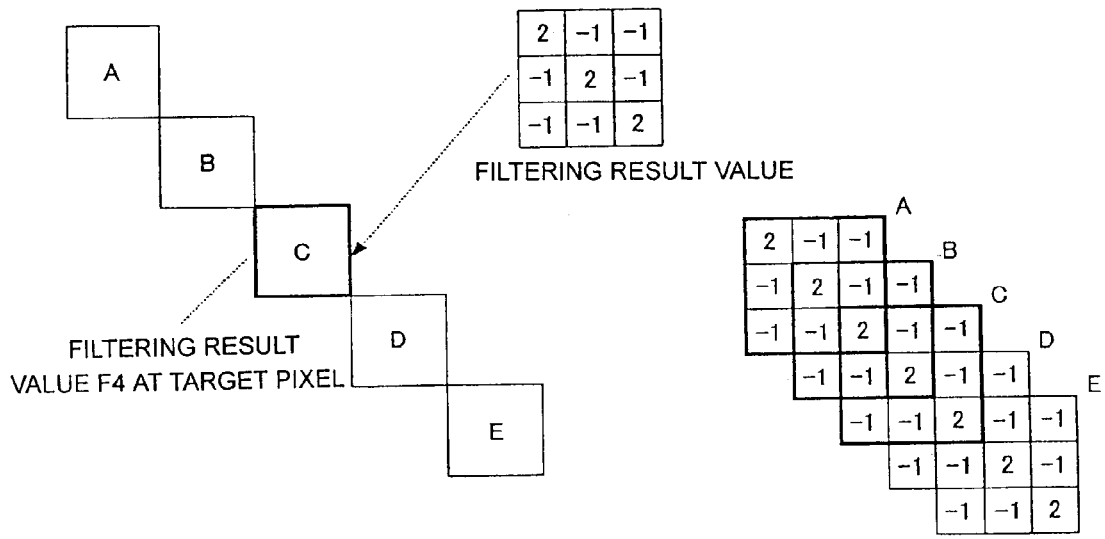
FIG. 39 shows a character edge quantity calculation process of a high frequency left diagonal direction character edge quantity calculation unit provided in the filtering processing unit according to the seventh embodiment.

The high frequency left diagonal character edge quantity calculation unit 3244 calculates the character edge quantity C4 in the high frequency left diagonal direction. The calculation is performed in the same manner as described above, such that a filtering result F4 shown in FIG. 31 in the target pixel is designated as a center, and the filtering results for two pixels in the upper and lower left diagonal directions thereof, five pixels in total, are used to calculate the character edge quantity C4 according to the following conditional expression. FIG. 39 shows the character edge quantity calculation process by the high frequency left diagonal character edge quantity calculation unit 3244.

if (all of continuous five filtering results have the same sign),
   then (C4=smallest absolute value of five filtering results)
else
   (C4=0).

As shown in FIG. 39, when all of the five continuous values of pixels A to E in the left diagonal direction have the same sign, a value having the smallest absolute value is designated as the character edge quantity C4 in the left diagonal direction.

Figure 40:
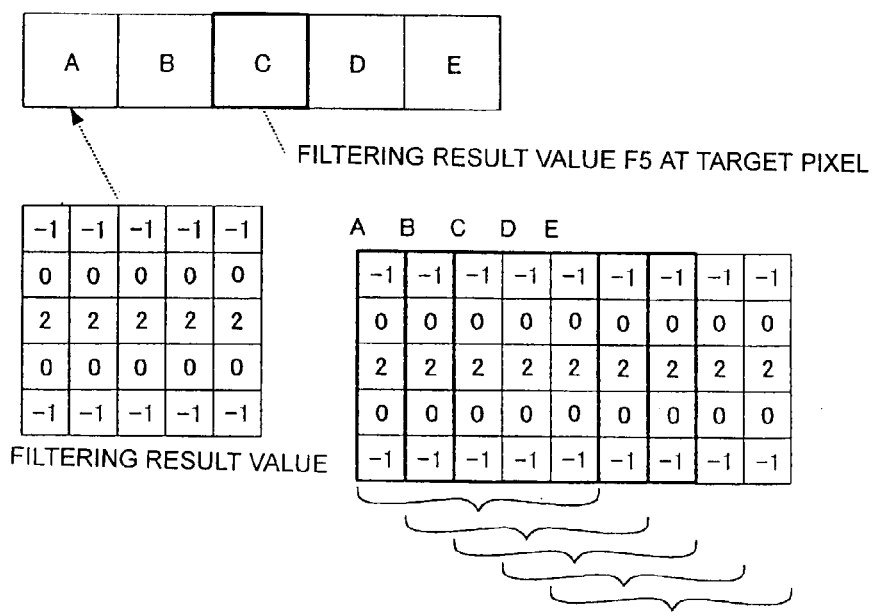
FIG. 40 shows a character edge quantity calculation process of a low frequency horizontal character edge quantity calculation unit provided in the filtering processing unit according to the seventh embodiment.

The low frequency horizontal character edge quantity calculation unit 3245 calculates the character edge quantity C5 in the low frequency horizontal direction. The calculation is performed in the same manner as in the high frequency band, such that a filtering result F5 shown in FIG. 32 in the target pixel is designated as a center, and the filtering results for the right and left two pixels thereof, five pixels in total, are used to calculate the character edge quantity C5 according to the following conditional expression. FIG. 40 shows the character edge quantity calculation process by the low frequency horizontal character edge quantity calculation unit 3245.

if (all of continuous five filtering results have the same sign),
   then (C5=smallest absolute value of five filtering results)
else
   (C5=0).

As shown in FIG. 40, when all of the five continuous values of horizontal pixels A to E have the same sign, a value having the smallest absolute value is designated as the horizontal character edge quantity C5.

Figure 41:
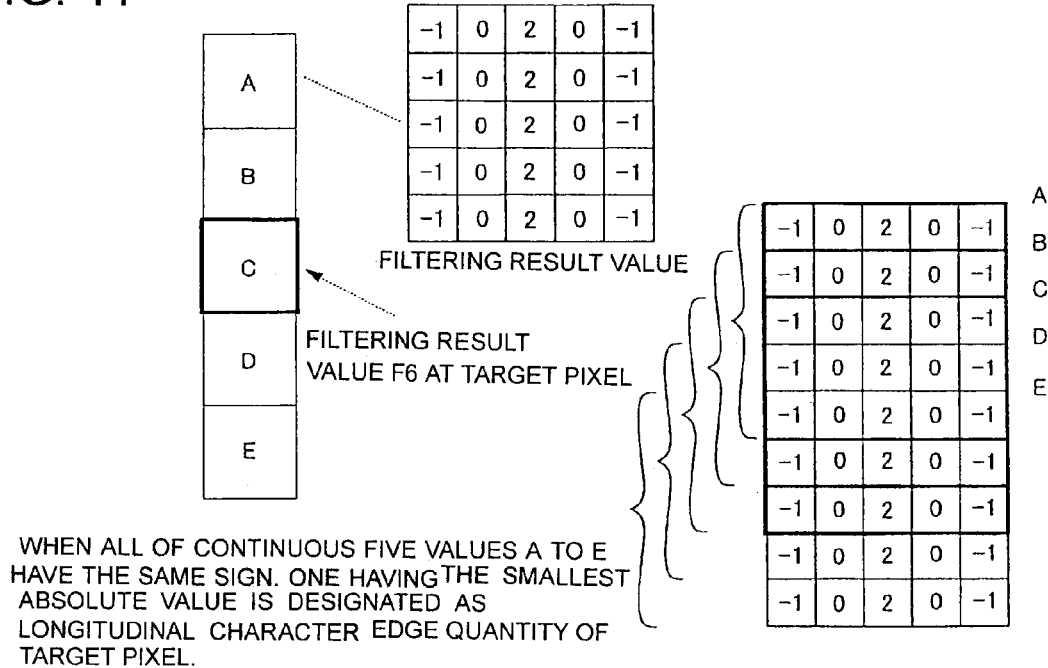
FIG. 41 shows a character edge quantity calculation process of a low frequency vertical character edge quantity calculation unit provided in the filtering processing unit according to the seventh embodiment.

The low frequency vertical character edge quantity calculation unit 3246 calculates the character edge quantity C6 in the low frequency vertical direction. The calculation is performed in the same manner as the character edge quantity calculation method, such that a filtering result F6 shown in FIG. 33 in the target pixel is designated as a center, and the filtering results for the upper and lower two pixels thereof, five pixels in total, are used to calculate the character edge quantity C6 according to the following conditional expression. FIG. 41 shows the character edge quantity calculation process by the low frequency vertical character edge quantity calculation unit 3246.

if (all of continuous five filtering results have the same sign),
   then (C6=smallest absolute value of five filtering results)
else
   (C6=0).

As shown in FIG. 41, when all of the five continuous values of vertical pixels A to E have the same sign, a value having the smallest absolute value is designated as the vertical character edge quantity C6.

Figure 42:
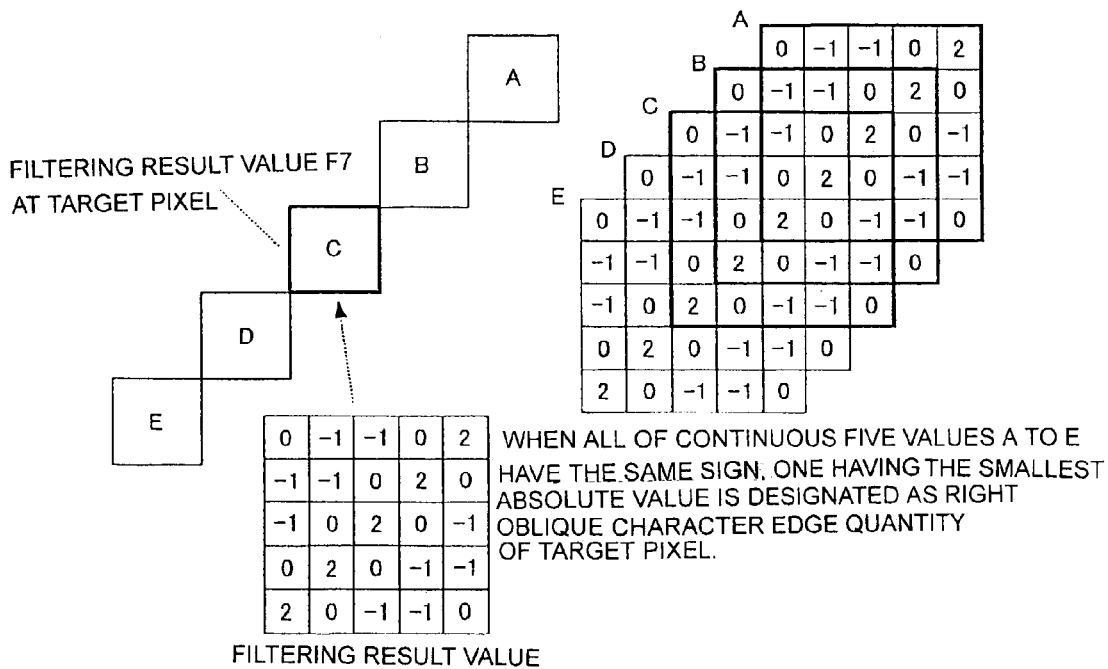
FIG. 42 shows a character edge quantity calculation process of a low frequency right diagonal direction character edge quantity calculation unit provided in the filtering processing unit according to the seventh embodiment.

The low frequency right diagonal character edge quantity calculation unit 3247 calculates the character edge quantity C7 in the low frequency right diagonal direction. The calculation is performed in the same manner as described above, such that a filtering result F7 shown in FIG. 34 in the target pixel is designated as a center, and the filtering results for two pixels in the upper and lower right diagonal directions thereof, five pixels in total, are used to calculate the character edge quantity C7 according to the following conditional expression. FIG. 42 shows the character edge quantity calculation process by the low frequency right diagonal character edge quantity calculation unit 3247.

if (all of continuous five filtering results have the same sign),
   then (C7=smallest absolute value of five filtering results)
else
   (C7=0).

As shown in FIG. 42, when all of the five continuous values of pixels A to E in the right diagonal direction have the same sign, a value having the smallest absolute value is designated as the character edge quantity C7 in the right diagonal direction.

Figure 43:
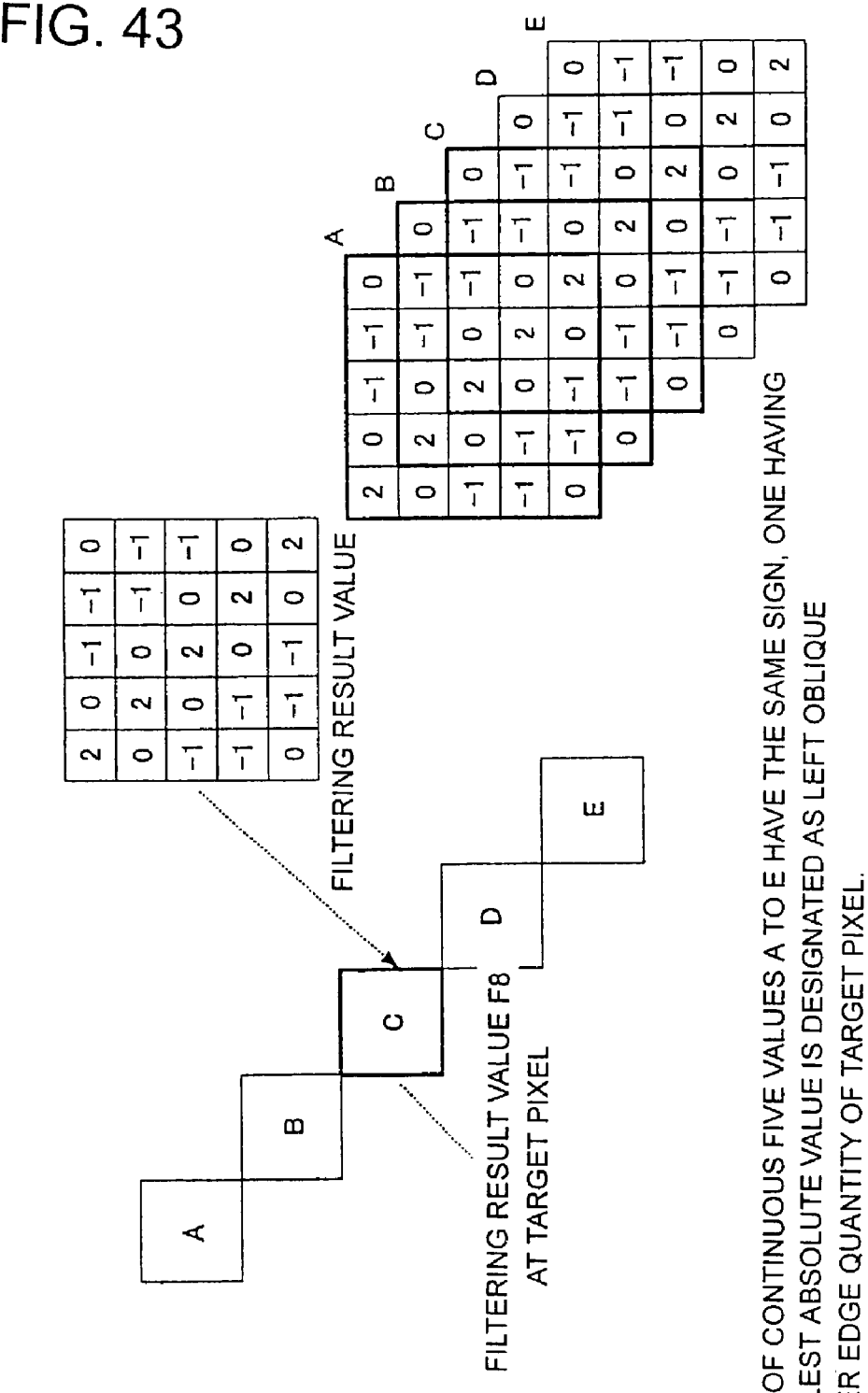
FIG. 43 shows a character edge quantity calculation process of a low frequency left diagonal direction character edge quantity calculation unit provided in the filtering processing unit according to the seventh embodiment.

The low frequency left diagonal character edge quantity calculation unit 3248 calculates the character edge quantity C8 in the low frequency left diagonal direction. The calculation is performed in the same manner as described above, such that a filtering result F8 shown in FIG. 35 in the target pixel is designated as a center, and the filtering results for two pixels in the upper and lower left diagonal directions thereof, five pixels in total, are used to calculate the character edge quantity C8 according to the following conditional expression. FIG. 43 shows the character edge quantity calculation process by the low frequency left diagonal character edge quantity calculation unit 3248.

if (all of continuous five filtering results have the same sign),
then (C8=smallest absolute value of five filtering results)
else
(C8=0).

As shown in FIG. 43, when all of the five continuous values of pixels A to E in the left diagonal direction have the same sign, a value having the smallest absolute value is designated as the character edge quantity C8 in the left diagonal direction.

Figure 44:
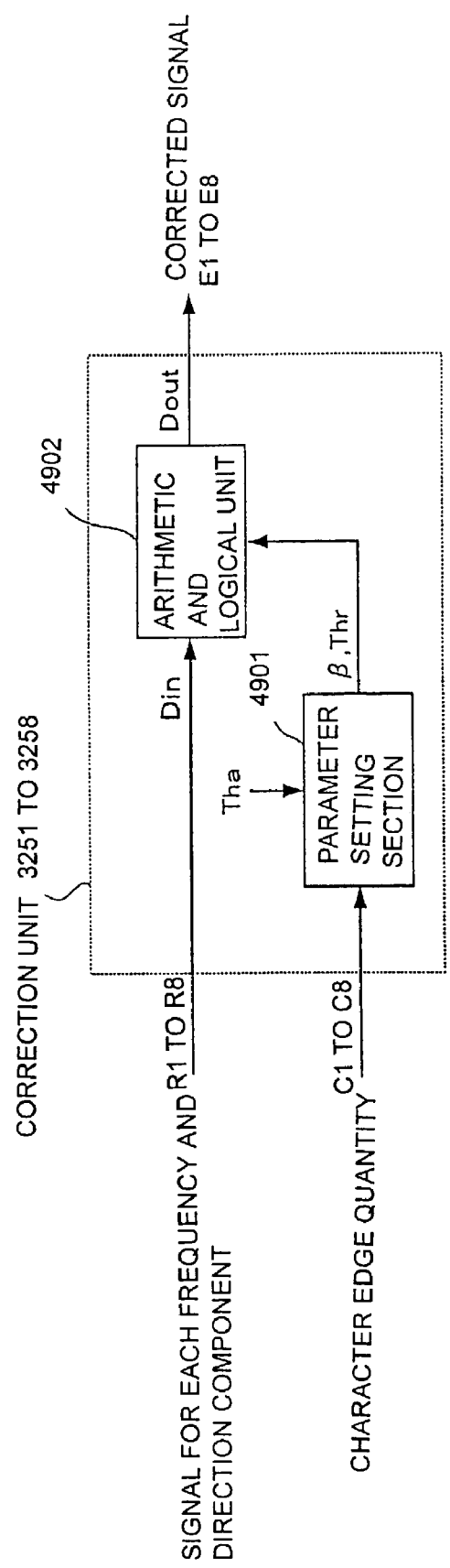
FIG. 44 is a block diagram of the correction unit provided in the filtering processing unit according to the seventh embodiment.
Figure 45:
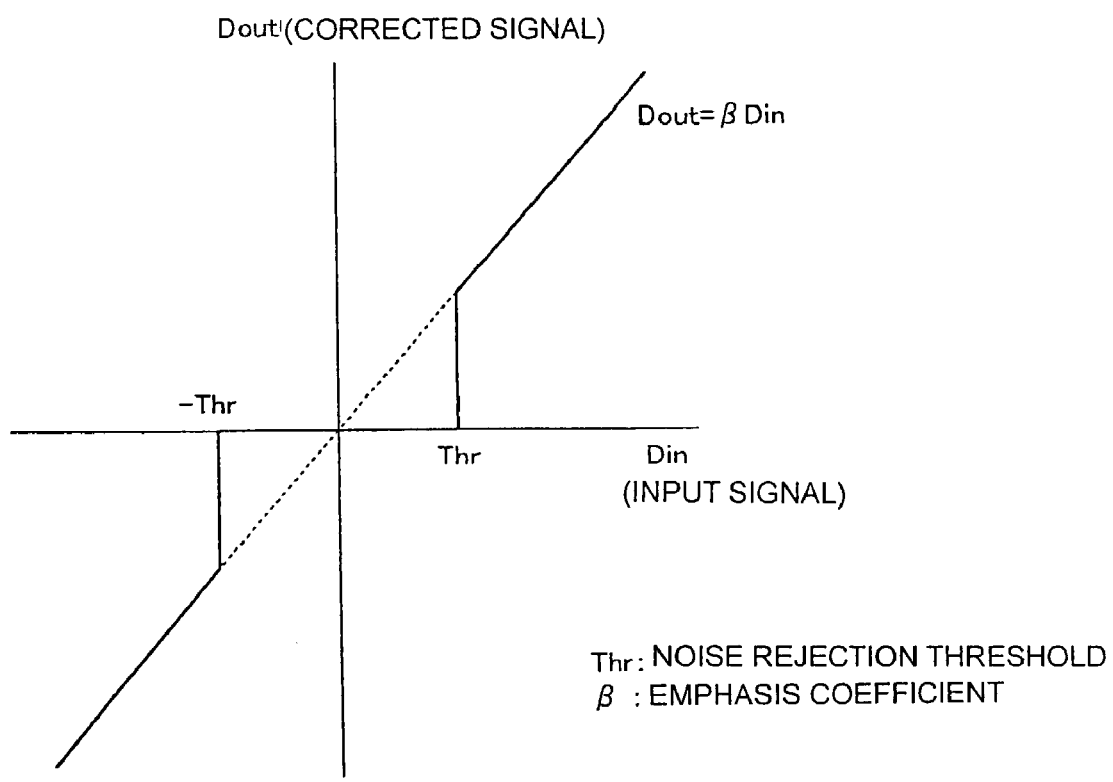
FIG. 45 shows the input and output state of a signal in an arithmetic and logical unit provided in the filtering processing unit according to the seventh embodiment.

The processing content of the sharpness control unit 3250 is explained in detail, with reference to FIG. 44 and FIG. 45. The sharpness control unit 3250 uses the respective results calculated by the character edge quantity calculation unit 3240, as shown in FIG. 27, to perform the emphasis processing and the smoothing processing of the image signal, independently, for each frequency and each direction component.

Specifically, the predetermined correction is respectively performed by the correction units 3251 to 3258 with respect to the signals R1 to R8 extracted for ach frequency and each direction component, according to the results (character edge quantity) C1 to C8 of the character edge quantity calculation unit 3240.

FIG. 44 is a block diagram of any of the correction units 3251 to 3258. A parameter setting section 4901 in each of the correction units 3251 to 3258 outputs, a predetermined emphasis coefficient β for each frequency and each direction component, and a noise rejection threshold Thr, based on the size of the character edge quantity.

FIG. 45 shows the input and output state of a signal in an arithmetic and logical unit 4902. When an absolute value of the input signal Din for each frequency and each direction component input from the correction unit is smaller than the noise rejection threshold Thr, the arithmetic and logical unit 4902 outputs 0 as a value of the signal Dout after correction. When the absolute value of the input signal Din for each frequency and each direction component is not smaller than the noise rejection threshold Thr, the arithmetic and logical unit 4902 multiplies a value of the input signal Din for each frequency and each direction component by the emphasis coefficient β, and outputs the result of multiplication as the signal Dout after correction. This signal Dout after correction corresponds to the corrected signals E1 to E8 shown in FIG. 27.

When the size of the character edge quantity is larger than a predetermined threshold Tha for each frequency and each direction component, the parameter setting section 4901 outputs the emphasis coefficient β for characters and the noise rejection threshold Thr, and when the size of the character edge quantity is smaller than the threshold Tha, the parameter setting section 4901 outputs the emphasis coefficient β for pattern areas and the noise rejection threshold Thr.

By performing the processing described using FIG. 45, a signal component smaller than the noise rejection threshold Thr is removed as noise, to thereby give a smoothed image. A signal not smaller than the noise rejection threshold Thr is multiplied by β (β>1), and hence a difference component increases to give an emphasized image. The size of high frequency component to be removed for each frequency band and each direction, and the degree of emphasis can be controlled, by setting an individual value for Thr and β for each of the different frequency bands and different direction components. As a result, fine noise rejection (smoothing) and emphasis can be performed.

The parameter setting section 4901 judges character areas and pattern areas according to the size of the character edge quantity, and performs switching of the parameter group, so that a larger value is set for the character areas than the pattern areas, to thereby obtain sufficient sharpness in characters and line drawings. Further, by setting the noise rejection threshold Thr to a small value, a relatively fine density change can be emphasized, to satisfy the sharpness of the characters and the line drawings.

In the seventh embodiment, sharpness control for the image signal is performed independently for each frequency and each direction component, based on the respective character edge quantities calculated for each frequency band and each direction component by the character edge quantity calculation unit 3240. Therefore, emphasis only on the necessary frequency and direction becomes possible. For example, only a direction along the character edge can be emphasized in a character on dots to emphasize the character, while suppressing the emphasis on the adjacent dots, thereby sharpness and reproducibility of the character on dots can be particularly improved. Since emphasis only on the necessary frequency band is possible, a harmonic distortion due to the emphasis on excessive high frequency components in dots and characters can be suppressed, while ensuring sharpness necessary for the reproduced image.

The overall configuration of an image processor according to an eighth embodiment of the present invention is similar to that of the seventh embodiment (see FIG. 26) with a difference in the configuration of the filtering processing unit 3103. The filtering processing unit 3103 is such that the character edge quantity calculation unit 3240 calculates the character edge quantity for each of the high frequency bands and the low frequency bands, and the sharpness control unit 3250 controls the sharpness independently based on the respective results.

Figure 46:
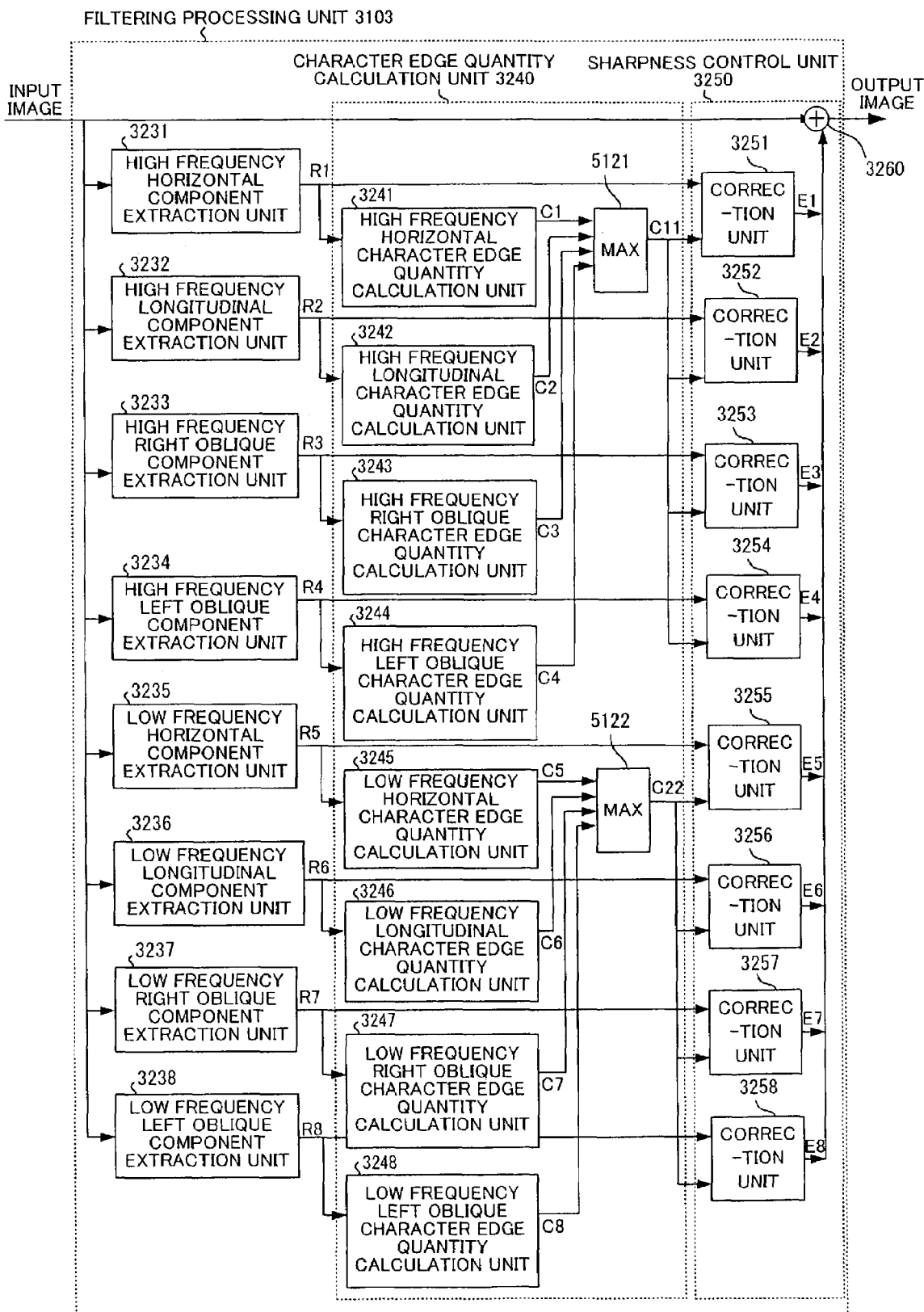
FIG. 46 is a block diagram of the filtering processing unit according to an eighth embodiment of the present invention.

FIG. 46 is a block diagram of the filtering processing unit 3103 according to the eighth embodiment. As shown in this figure, maximum value calculation units (MAX) 5121 and 5122 are provided in the character edge quantity calculation unit 3240, for each of the high frequency bands and the low frequency bands.

In the high frequency band, the maximum values of the character edge quantity calculation results C1 to C4 in the respective horizontal, vertical, right diagonal, and left diagonal directions are calculated by the maximum value calculation unit 5121, and are output as a high frequency band character edge quantity C11. Based on the result, the sharpness control unit 3250 performs sharpness control of the high frequency band signals R1 to R4.

Similarly, in the low frequency band, the maximum values of the character edge quantity calculation results C5 to C8 in the respective horizontal, vertical, right diagonal, and left diagonal directions are calculated by the maximum value calculation unit 5122, and are output as a low frequency band character edge quantity C22. Based on the result, the sharpness control unit 3250 performs sharpness control of the low frequency band signals R5 to R8.

The respective correction units 3251 to 3258 in the sharpness control unit 3250 set either the parameter Thr for character areas or the parameter β for patterns areas, based on the size of the input character edge quantity for each frequency band, and set an individual value for each of the different frequency bands and different direction components. As a result, the size of the high frequency component to be removed for each band and each direction and the degree of emphasis can be controlled, thereby enabling fine noise rejection (smoothing) and emphasis.

Figure 47:
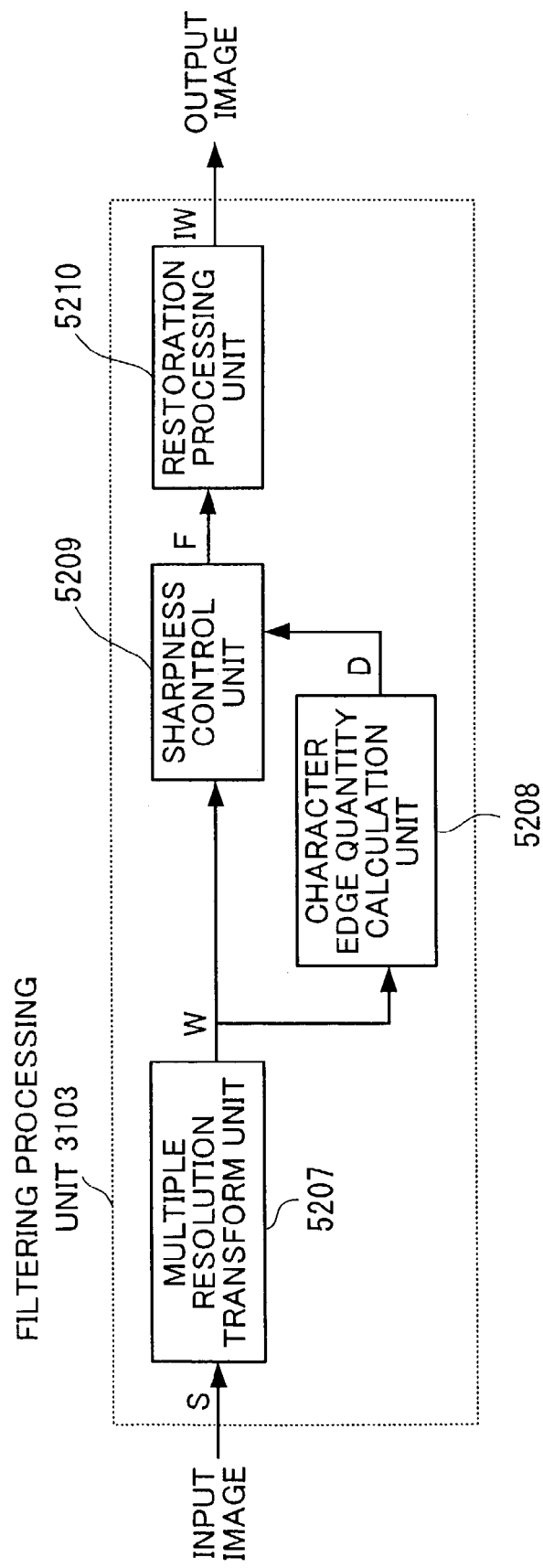
FIG. 47 is a block diagram of the filtering processing unit according to a ninth embodiment of the present invention.

An image processor according to a ninth embodiment has almost the same configuration as that of the seventh embodiment (see FIG. 26) with a difference that the filtering processing unit 3103 is constituted using a wavelet coefficient signal. FIG. 47 is a block diagram of the filtering processing unit 3103 according to the ninth embodiment.

As shown in FIG. 47, the input image signal (input image) S is input to a multiple resolution transform unit 5207, and resolved into a plurality (two in FIG. 47) of image band signals W. The character edge quantity calculation unit 5208 calculates a character edge quantity D such as a character or a line in the input image signal, using one of the broken down image band signals W.

The sharpness control unit 5209 performs the emphasis processing and the smoothing processing of the image signal corresponding to the output D of the character edge quantity calculation unit 5208. Though not shown in FIG. 47, the character edge quantity calculation unit 5208 calculates the character edge quantity for each frequency band and each direction component, and outputs the calculation results to the sharpness control unit 5209. Based on the calculation results, the sharpness control unit 5209 controls the sharpness independently for each frequency band and each direction component. The details of the character edge quantity calculation unit 5208 and the sharpness control unit 5209 is described later. A restoration processing unit 5210 transforms the signal into a real space image signal IW based on the output F of the sharpness control unit 5209, and outputs the signal as an output image.

Figure 48:
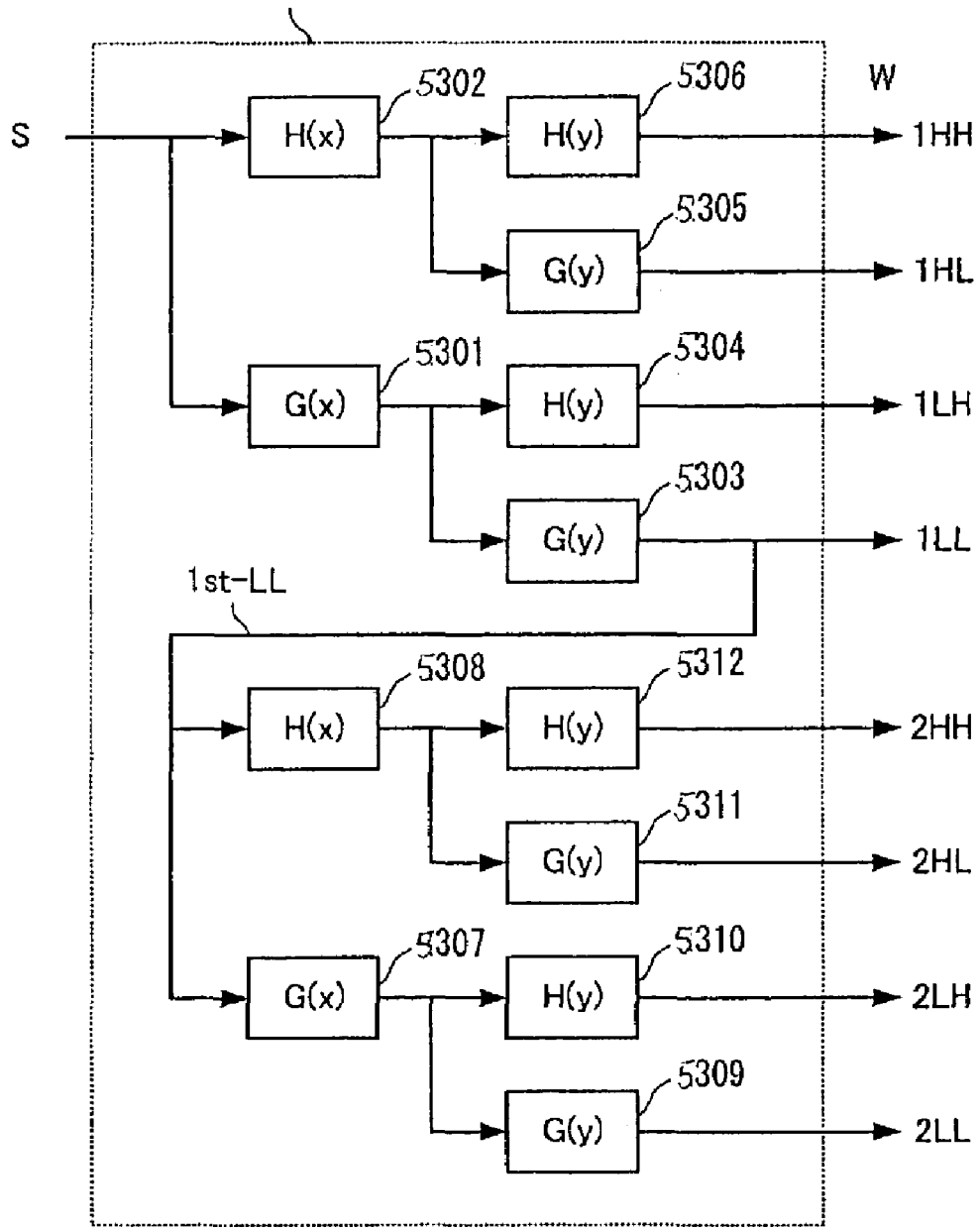
FIG. 48 is a block diagram of a multiple resolution transform unit provided in the filtering processing unit according to the ninth embodiment.

FIG. 48 is a block diagram of the multiple resolution transform unit 5207. As shown in this figure, the multiple resolution transform unit 5207 is realized by the wavelet transform. The input image signal S is wavelet-transformed in the x direction by the low-pass filter G(x) 5301 and the high-pass filter H(x) 5302.

Figure 49A:
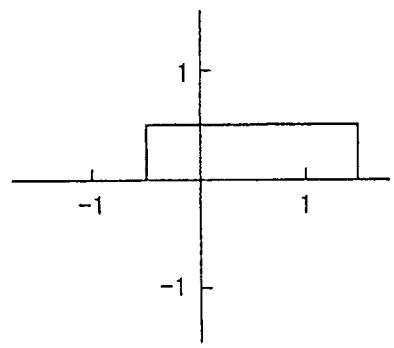
FIGS. 49A and 49B show the filter property of a low-pass filter and a high-pass filter in the multiple resolution transform unit provided in the filtering processing unit according to the ninth embodiment.
Figure 49B:
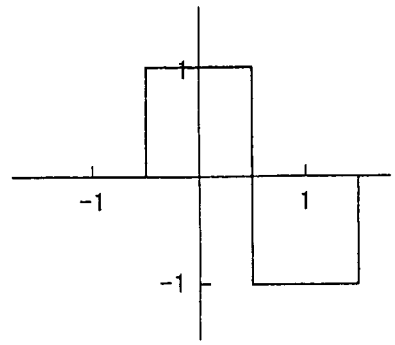

FIGS. 49A and 49B show the filter property of the low-pass filter and the high-pass filter. The low-pass filter G(x) 5301 is a low frequency component extraction filter for obtaining a mean value component, as shown in FIG. 49A. The high-pass filter H(x) 5302 is a high frequency component extraction filter for obtaining a difference component, as shown in FIG. 49B.

In the ninth embodiment, a wavelet basis function (Harr) having a property as shown in FIGS. 49A and 49B is explained as an example. Wavelet transform in the y direction is performed with respect to the obtained image signal, by filter groups 5303, 5304, 5305, and 5306. What is obtained by this transform is a first hierarchy wavelet coefficient.

The output 1st-LL (1 LL) shown in FIG. 48 is a first hierarchy low frequency component, and is an image signal obtained by determining a mean value of 2×2 pixels with respect to the original image. The output 1st-LH (1LH) is a first hierarchy horizontal high frequency component, and is an image signal obtained by extracting an edge signal in a horizontal direction, equivalent to the Nyquist frequency. Similarly, the output 1st-HL (1HL) is a first hierarchy vertical high frequency component, and is an image signal obtained by extracting an edge signal in a vertical direction, and the output 1st-HH (1HH) is an image signal obtained by extracting an edge signal in a diagonal direction.

Figure 50:
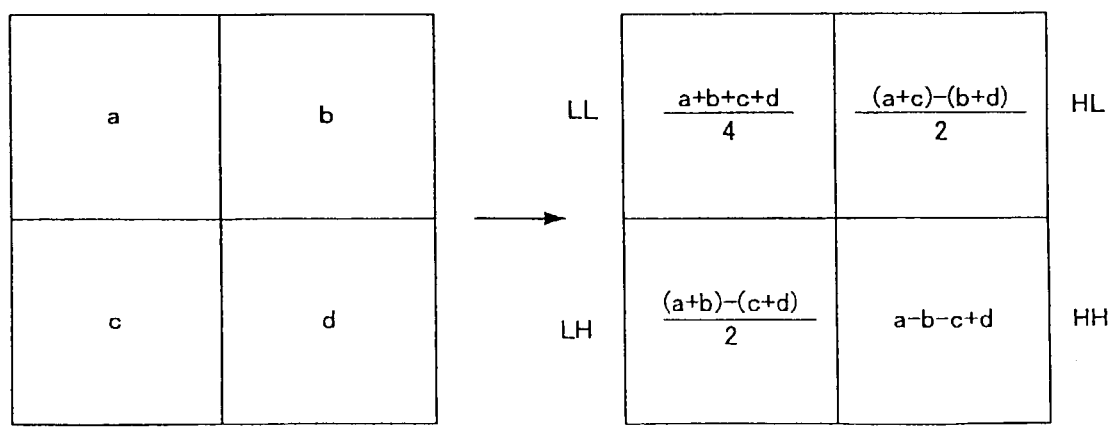
FIG. 50 shows the state of pixels before and after the wavelet transform in the filtering processing unit according to the ninth embodiment.

FIG. 50 shows the state of pixels before and after the wavelet transform. The wavelet transform becomes a transform for extracting a mean value and an edge component in the respective directions, with respect to the 2×2 pixel blocks of a, b, c, and d.

Second hierarchy wavelet transform is carried out in the same procedure, with respect to the obtained 1st-LL signal, to thereby obtain image signals 2nd-LL (2LL), 2nd-LH(2LH), 2nd-HL (2HL), and 2nd-HH (2HH) transformed by the filter groups 5307 to 5312.

The 2nd-LL signal is an image signal that obtains a mean value of 4×4 pixels, and is an image signal in a lower frequency band than the first hierarchy. Similarly, the 2nd-LH signal is a component in a lower frequency band than 1st-LH, and is an image signal obtained by extracting the horizontal edge in the frequency band, being half of the Nyquist frequency. Similarly, the 2nd-HL signal is a second hierarchy vertical high frequency component, and is an image signal obtained by extracting a vertical frequency edge in a lower frequency than 1st-HL, and the 2nd-HH signal is an image signal obtained by extracting an edge signal in a diagonal direction. As described above, wavelet coefficient signals up to the second hierarchy (1st-LL to 1st-HH, and 2nd-LL to 2nd-HH) are obtained.

Figure 51:
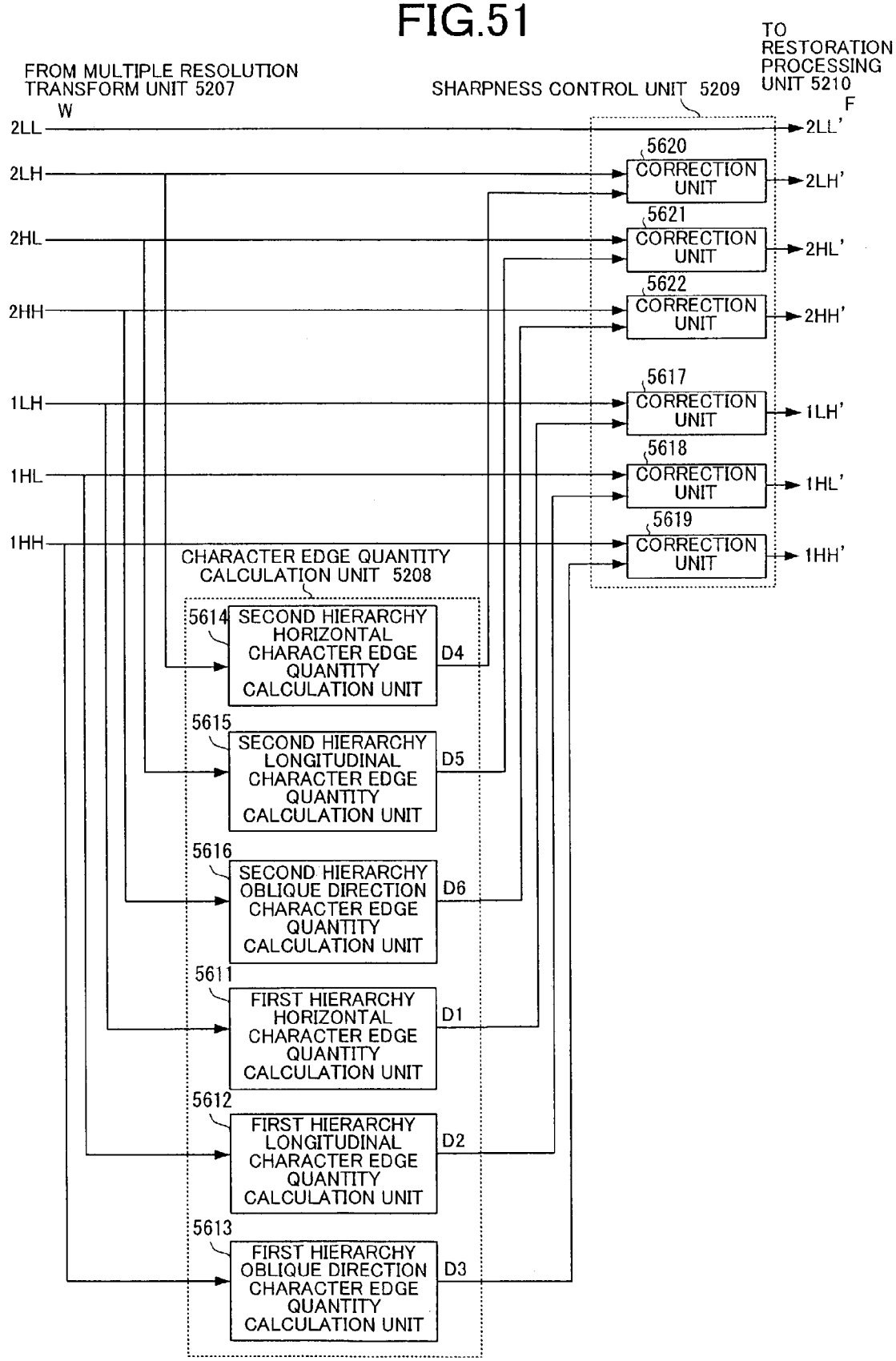
FIG. 51 is a block diagram of a character edge quantity calculation unit and a sharpness control unit provided in the filtering processing unit according to the ninth embodiment.

The character edge quantity calculation unit 5208 and the sharpness control unit 5209, being a characteristic configuration in the ninth embodiment, is explained below. FIG. 51 is a block diagram of the character edge quantity calculation unit 5208 and the sharpness control unit 5209.

In the ninth embodiment, the character edge quantity calculation unit 5208 calculates a character edge quantity for each frequency band and each direction component, and based on the calculation results, the sharpness control unit 5209 controls sharpness independently for each frequency band and each direction component. The processing content of the character edge quantity calculation unit 5208 is explained in detail, with reference to FIGS. 51 to 61.

The wavelet coefficient signal W output from the multiple resolution transform unit 5207 is input to the character edge quantity calculation unit 5208, and the character edge quantity calculation unit 5208 extracts character edge quantities D1, D2, D3, D4, D5, and D6 in the horizontal, vertical, and diagonal directions for the first hierarchy band and the second hierarchy band from the coefficient signal W, by the character edge quantity calculation units 5611, 5612, 5613, 5614, 5615, and 5616, and outputs the results. The processing contents of the character edge quantity calculation units 5611 to 5616 for each frequency band and each direction component is explained below.

Figure 52:
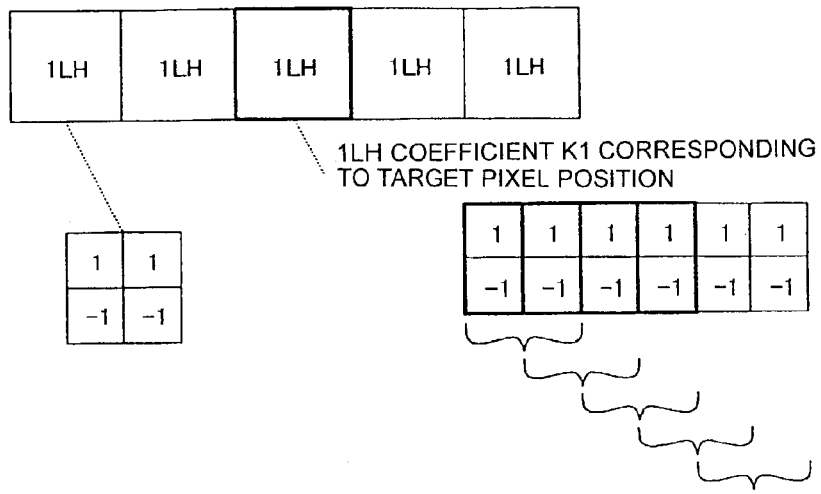
FIG. 52 shows a character edge quantity calculation process by a first hierarchy horizontal character edge quantity calculation unit provided in the filtering processing unit according to the ninth embodiment.

The first hierarchy horizontal character edge quantity calculation unit 5611 calculates the character edge quantity D1 in the first hierarchy and horizontal direction. D1 is calculated according to the following conditional expression, using the first hierarchy LH (1LH) coefficient K1 corresponding to the target pixel position, and two right and left coefficients thereof, in total 5 coefficients. FIG. 52 shows the character edge quantity calculation process by the first hierarchy horizontal character edge quantity calculation unit 5611.

if (all of continuous five 1LH coefficients have the same sign), then (D1=smallest absolute value of five 1LH coefficients)

else (D1=0).

As shown in FIG. 52, when all of the horizontally continuous 1LH coefficients have the same sign, a value having the smallest absolute value is designated as the horizontal character edge quantity D1 of the target pixel.

Figure 53:
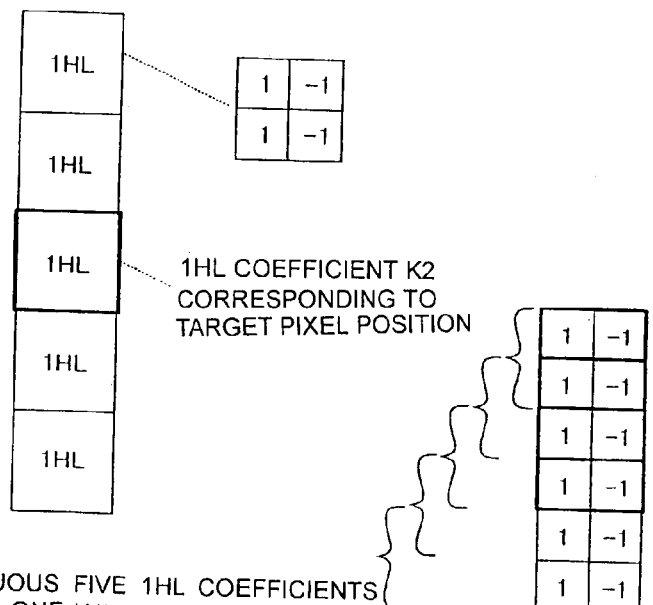
FIG. 53 shows a character edge quantity calculation process by a first hierarchy vertical character edge quantity calculation unit provided in the filtering processing unit according to the ninth embodiment.

The first hierarchy vertical character edge quantity calculation unit 5612 calculates the character edge quantity D2 in the first hierarchy and vertical direction. D2 is calculated according to the following conditional expression, in the same manner as the calculation method of the horizontal character edge quantity, using the first hierarchy HL (1HL) coefficient K2 corresponding to the target pixel position, and two upper and lower coefficients thereof, in total 5 coefficients. FIG. 53 shows the character edge quantity calculation process by the first hierarchy vertical character edge quantity calculation unit 5612.

if (all of continuous five 1HL coefficients have the same sign),
then (D2=smallest absolute value of five 1HL coefficients)
else
(D2=0).

As shown in FIG. 53, when all of the vertically continuous HL coefficients have the same sign, a value having the smallest absolute value is designated as the vertical character edge quantity D2 of the target pixel.

Figure 54:
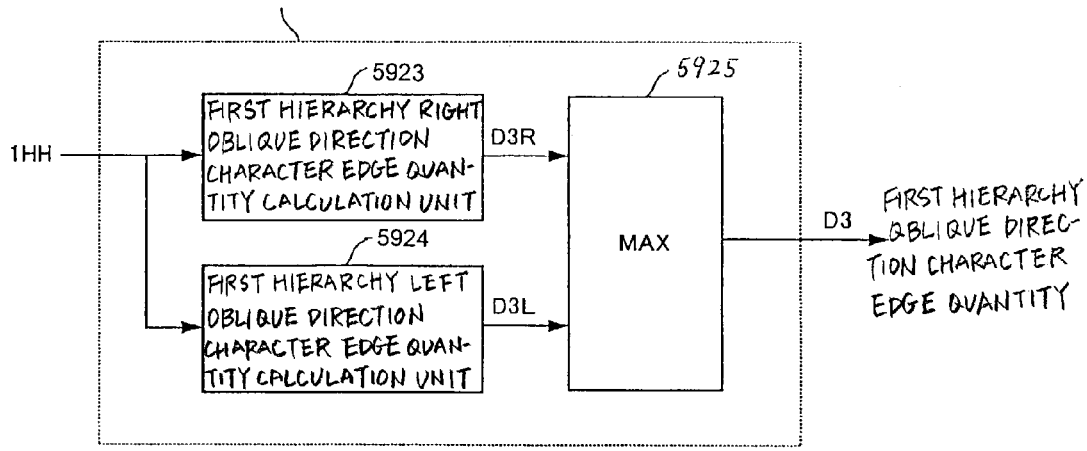
FIG. 54 is a block diagram of a first hierarchy diagonal direction character edge quantity calculation unit provided in the filtering processing unit according to the ninth embodiment.

FIG. 54 is a block diagram of a character edge quantity calculation unit 5913 for each frequency band and each direction component. This figure corresponds to the first hierarchy diagonal direction character edge quantity calculation unit 5613 shown in FIG. 51. The character edge quantity calculation unit 5913 for each frequency band and each direction component comprises a first hierarchy right diagonal direction character edge quantity calculation unit 5923, a first hierarchy left diagonal direction character edge quantity calculation unit 5924, and a maximum value calculation unit 5925.

In the character edge quantity calculation unit 5913 for each frequency band and each direction component, different from the edge quantity calculation in the vertical and horizontal directions, the first hierarchy right diagonal direction character edge quantity calculation unit 5923 calculates the character edge quantity D3R in the first hierarchy and right diagonal direction, the first hierarchy left diagonal direction character edge quantity calculation unit 5924 calculates the character edge quantity D3L in the first hierarchy and left diagonal direction, and the maximum value calculation unit 5925 outputs the maximum value thereof as the character edge quantity D3 in the first hierarchy and diagonal direction.

Figure 55:
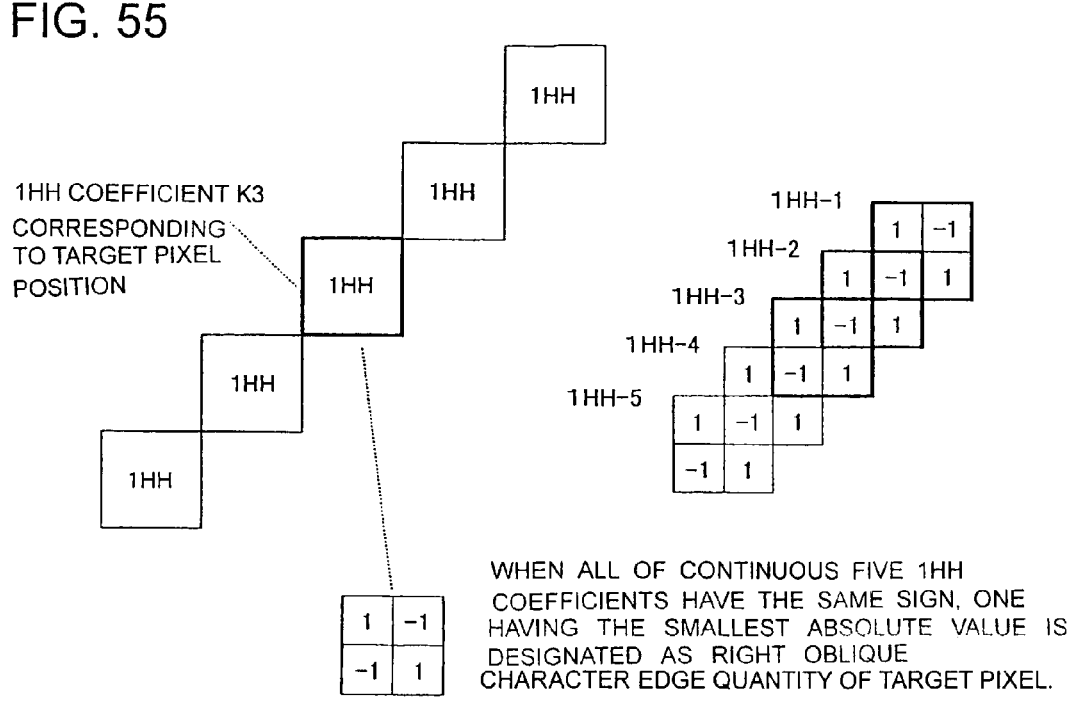
FIG. 55 shows a character edge quantity calculation process by a first hierarchy right diagonal direction character edge quantity calculation unit provided in the filtering processing unit according to the ninth embodiment.

The calculation method of the character edge quantity D3R in the first hierarchy and right diagonal direction is explained. In the same manner as the vertical and horizontal edge quantity calculation method, D3R is calculated according to the following conditional expression, using the first hierarchy HH (1HH) coefficient K3 corresponding to the target pixel position, and two adjacent coefficients in the right diagonal direction, in total 5 coefficients. FIG. 55 shows the character edge quantity calculation process by the first hierarchy right diagonal character edge quantity calculation unit 5923.

if (all of five 1HH coefficients continuous in the right diagonal direction have the same sign),
then (D3R=smallest absolute value of five 1HH coefficients)
else
(D3R=0).

As shown in FIG. 55, when all of the continuous 1HH coefficients in the right diagonal direction have the same sign, a value having the smallest absolute value is designated as the character edge quantity D3R of the target pixel in the right diagonal direction.

Figure 56:
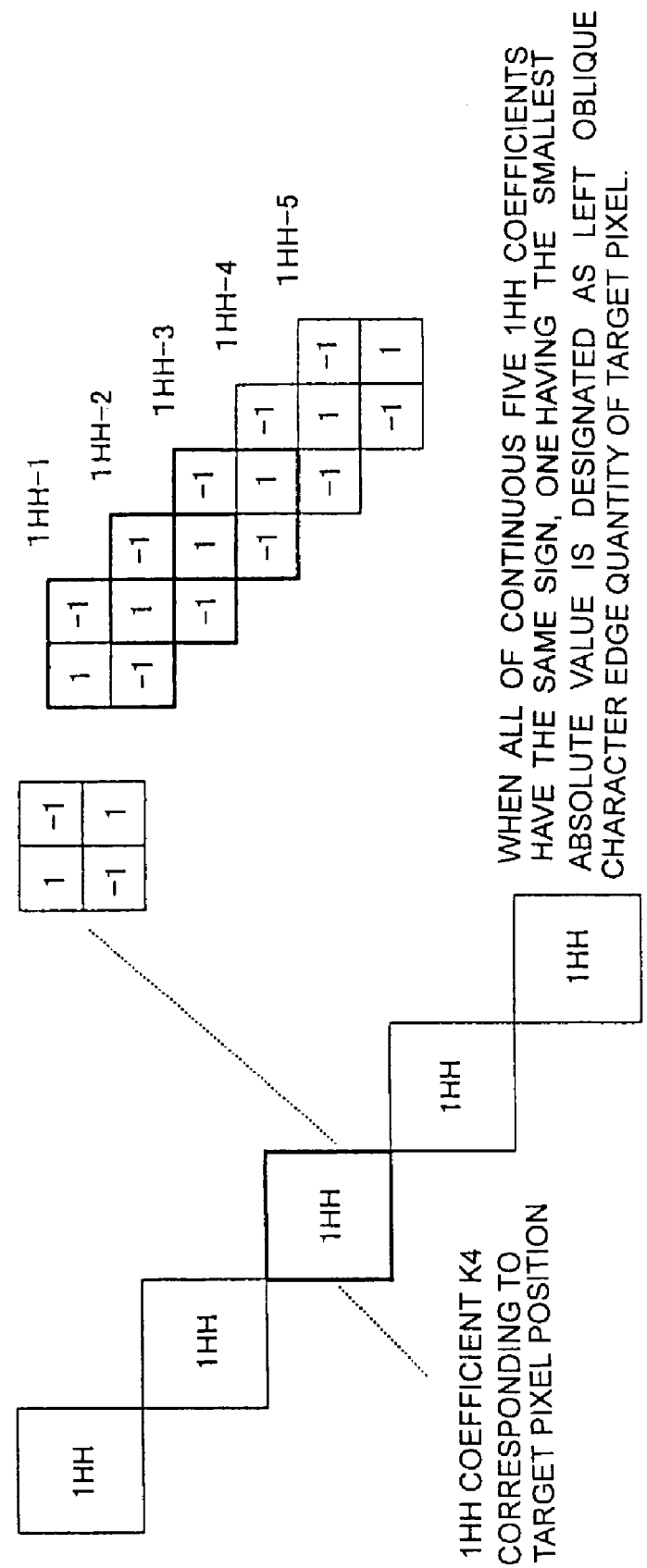
FIG. 56 shows a character edge quantity calculation process by a first hierarchy left diagonal direction character edge quantity calculation unit provided in the filtering processing unit according to the ninth embodiment.

The calculation method of the character edge quantity D3L in the first hierarchy and left diagonal direction is explained. In the same manner as the calculation method of a character edge quantity D3R in the first hierarchy and right diagonal direction, D3L is calculated according to the following conditional expression, using the first hierarchy HH (1HH) coefficient K4 corresponding to the target pixel position, and two adjacent coefficients in the left diagonal direction, in total 5 coefficients. FIG. 56 shows the character edge quantity calculation process by the first hierarchy left diagonal character edge quantity calculation unit 5924.

if (all of five 1HH coefficients continuous in the left diagonal direction have the same sign),
then (D3L=smallest absolute value of five 1HH coefficients)
else
(D3L=0).

As shown in FIG. 56, when all of the continuous 1HH coefficients in the left diagonal direction have the same sign, a value having the smallest absolute value is designated as the character edge quantity D3L of the target pixel in the left diagonal direction.

The character edge quantity D3R in the first hierarchy and right diagonal direction and the character edge quantity D3L in the first hierarchy and left diagonal direction calculated above are input to the maximum calculation unit 5925. The maximum calculation unit 5925 outputs the maximum value of these calculation results as the first hierarchy diagonal character edge quantity D3.

Figure 57:
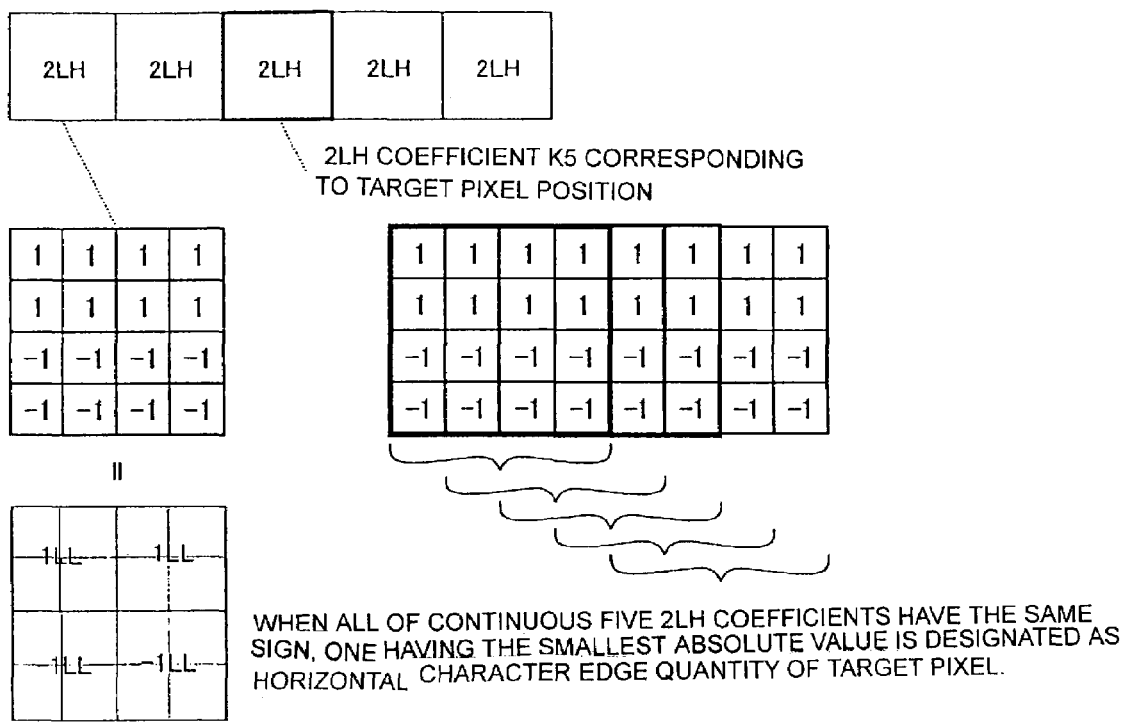
FIG. 57 shows a character edge quantity calculation process by a second hierarchy horizontal character edge quantity calculation unit provided in the filtering processing unit according to the ninth embodiment.

A second hierarchy horizontal character edge quantity calculation unit 5614 shown in FIG. 51 calculates the character edge quantity D4 in the second hierarchy and horizontal direction. D4 is calculated according to the following conditional expression, in the same manner as the calculation method in the case of first hierarchy, using the second hierarchy LH (2LH) coefficient K5 corresponding to the target pixel position, and two right and left coefficients thereof, in total 5 coefficients. FIG. 57 shows the character edge quantity calculation process by the second hierarchy horizontal character edge quantity calculation unit 5614.

if (all of continuous five 2LH coefficients have the same sign),
then (D4=smallest absolute value of five 2LH coefficients)
else
(D4=0).

As shown in FIG. 57, when all of the horizontally continuous 2LH coefficients have the same sign, a value having the smallest absolute value is designated as the horizontal character edge quantity D4 of the target pixel.

Figure 58:
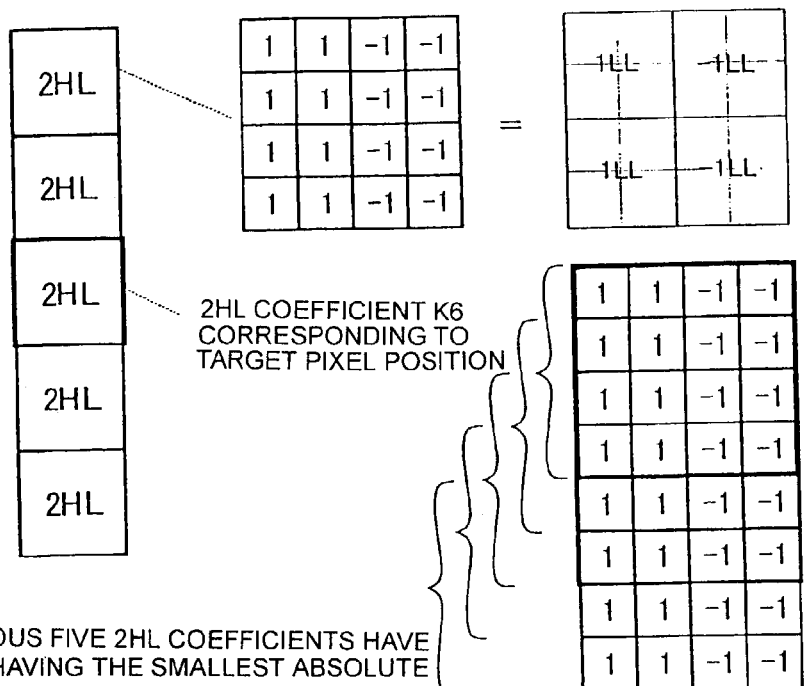
FIG. 58 shows a character edge quantity calculation process by a second hierarchy vertical character edge quantity calculation unit provided in the filtering processing unit according to the ninth embodiment.

A second hierarchy vertical character edge quantity calculation unit 5615 calculates the character edge quantity D5 in the second hierarchy and vertical direction. D5 is calculated according to the following conditional expression, in the same manner as the calculation method of the horizontal character edge quantity, using the second hierarchy HL (2HL) coefficient K6 corresponding to the target pixel position, and two upper and lower coefficients thereof, in total 5 coefficients. FIG. 58 shows the character edge quantity calculation process by the second hierarchy vertical character edge quantity calculation unit 5615.

if (all of continuous five 2HL coefficients have the same sign),
then (D5=smallest absolute value of five 2HL coefficients)
else
(D5=0).

As shown in FIG. 58, when all of the vertically continuous 2HL coefficients K6 have the same sign, a value having the smallest absolute value is designated as the vertical character edge quantity D5 of the target pixel.

Figure 59:
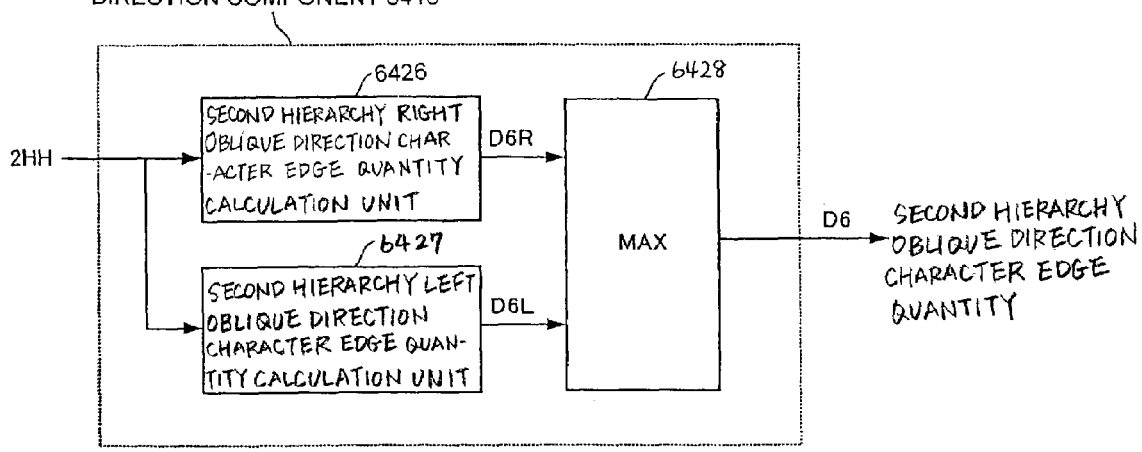
FIG. 59 is a block diagram of a second hierarchy diagonal direction character edge quantity calculation unit provided in the filtering processing unit according to the ninth embodiment.

FIG. 59 is a block diagram of a character edge quantity calculation unit 6416 for each frequency band and each direction component. This configuration corresponds to the second hierarchy diagonal direction character edge quantity calculation unit 5616 shown in FIG. 51. The character edge quantity calculation unit 6416 for each frequency band and each direction component comprises a second hierarchy right diagonal direction character edge quantity calculation unit 6426, a second hierarchy left diagonal direction character edge quantity calculation unit 6427, and a maximum value calculation unit 6428.

In the second hierarchy diagonal direction character edge quantity calculation unit 6416, in the same manner as in the case of the first hierarchy and diagonal direction, different from the edge quantity calculation in the vertical and horizontal directions, the second hierarchy right diagonal direction character edge quantity calculation unit 6426 calculates the character edge quantity D6R in the second hierarchy and right diagonal direction, the second hierarchy left diagonal direction character edge quantity calculation unit 6427 calculates the character edge quantity D6L in the second hierarchy and left diagonal direction, and the maximum value calculation unit 6428 outputs the maximum value thereof as the character edge quantity D6 in the second hierarchy and diagonal direction.

Figure 60:
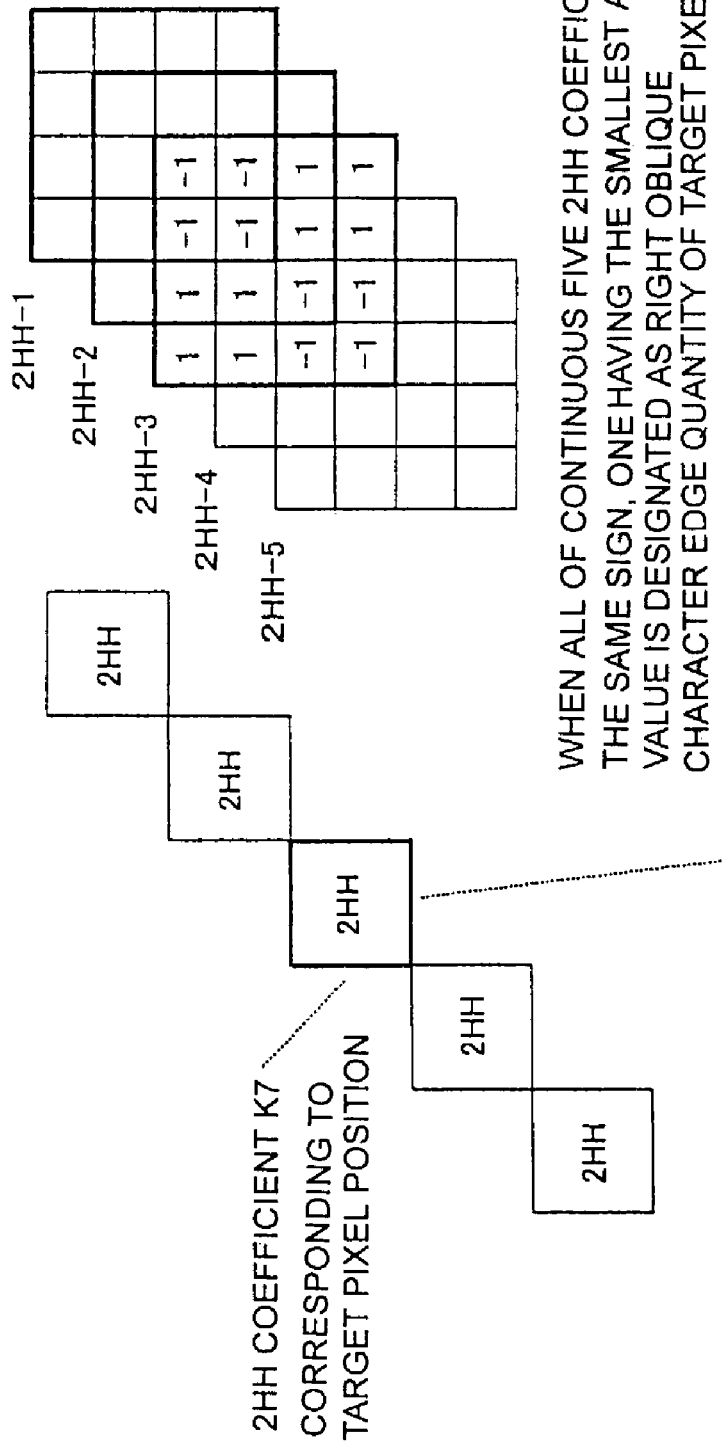
FIG. 60 shows a character edge quantity calculation process by a second hierarchy right diagonal direction character edge quantity calculation unit provided in the filtering processing unit according to the ninth embodiment.

The second hierarchy right diagonal direction character edge quantity calculation unit 6426 calculates D6R according to the following conditional expression, using the second hierarchy HH (2HH) coefficient K7 corresponding to the target pixel position, and two adjacent coefficients in the right diagonal direction, in total 5 coefficients. FIG. 60 shows the character edge quantity calculation process by the second hierarchy right diagonal character edge quantity calculation unit 6426.

if (all of five 2HH coefficients continuous in the right diagonal direction have the same sign),
    then (D6R=smallest absolute value of five 2HH coefficients)
    else
    (D6R=0).

As shown in FIG. 60, when all of the continuous 2HH coefficients K7 in the right diagonal direction have the same sign, a value having the smallest absolute value is designated as the character edge quantity D6R of the target pixel in the right diagonal direction.

Figure 61:
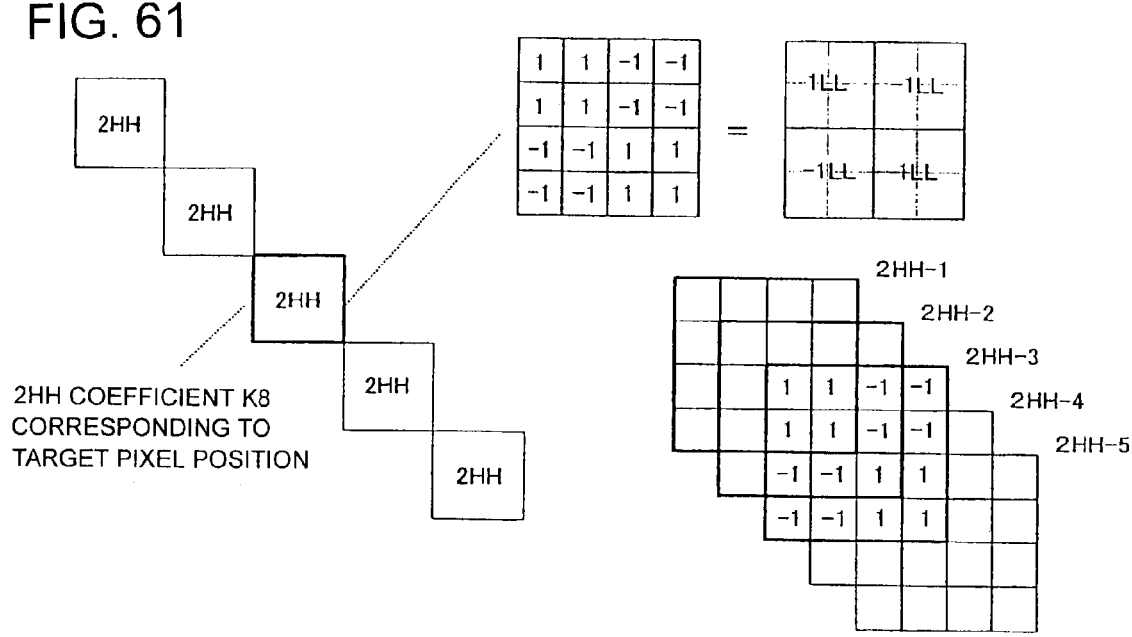
FIG. 61 shows a character edge quantity calculation process by a second hierarchy left diagonal direction character edge quantity calculation unit provided in the filtering processing unit according to the ninth embodiment.

In the same manner as the calculation method of a character edge quantity D6R in the second hierarchy and right diagonal direction, the second hierarchy left diagonal direction character edge quantity calculation unit 6427 calculates D6L according to the following conditional expression, using the second hierarchy HH (2HH) coefficient K8 corresponding to the target pixel position, and two adjacent coefficients in the left diagonal direction, in total 5 coefficients. FIG. 61 shows the character edge quantity calculation process by the second hierarchy left diagonal character edge quantity calculation unit 6427.

if (all of five 2HH coefficients continuous in the left diagonal direction have the same sign),
    then (D6L=smallest absolute value of five 2HH coefficients)
    else
    (D6L=0).

As shown in FIG. 61, when all of the continuous 2HH coefficients K8 in the left diagonal direction have the same sign, a value having the smallest absolute value is designated as the character edge quantity D6L of the target pixel in the left diagonal direction.

A maximum value in the calculation results of the character edge quantity D6R in the second hierarchy and right diagonal direction and the character edge quantity D6L in the second hierarchy and left diagonal direction calculated above is output as the second hierarchy diagonal character edge quantity D6.

According to the character edge quantity calculation unit 5208 having the above configuration, calculation of the character edge quantity is performed, positively using such a characteristic that in the character portion and the line drawing portion of the input image, the value of the wavelet coefficient signal is large and the continuity also increases, but in the dot portion, though the value of the wavelet coefficient signal is large, the continuity decreases. It becomes possible to separate the dot portion by detecting the continuity of the sign of the wavelet coefficient signals, without adding large hardware such as dot segmentation, and extraction of only the character edge, which is desirably emphasized by the filtering processing, can be realized.

Figure 62:
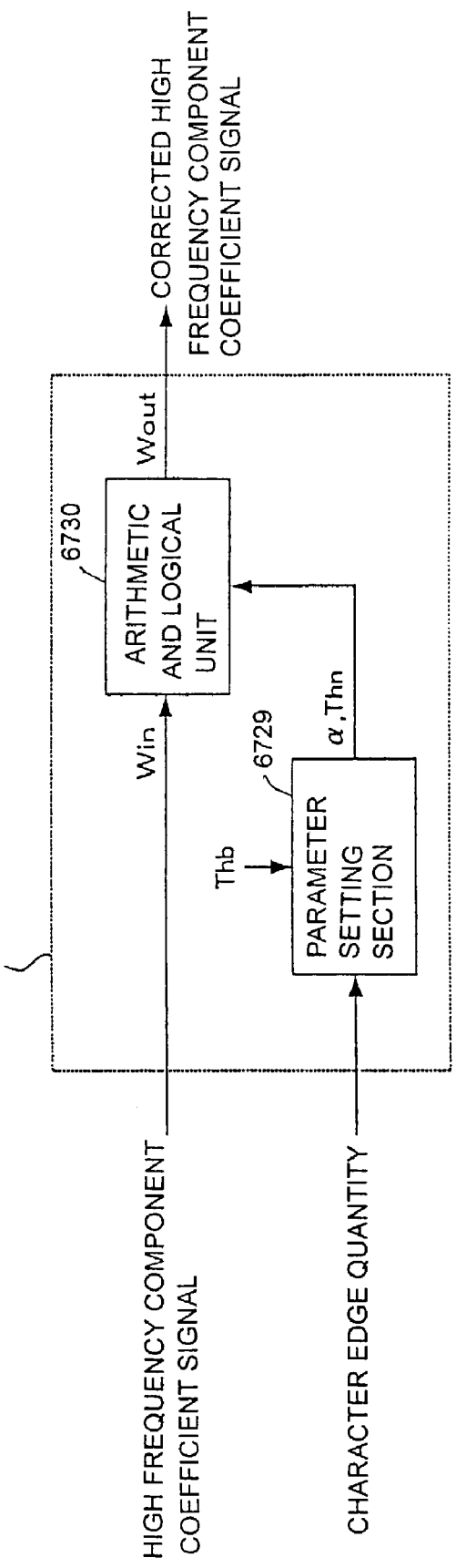
FIG. 62 is a block diagram of a correction unit provided in the filtering processing unit according to the ninth embodiment.
Figures 63, 64:
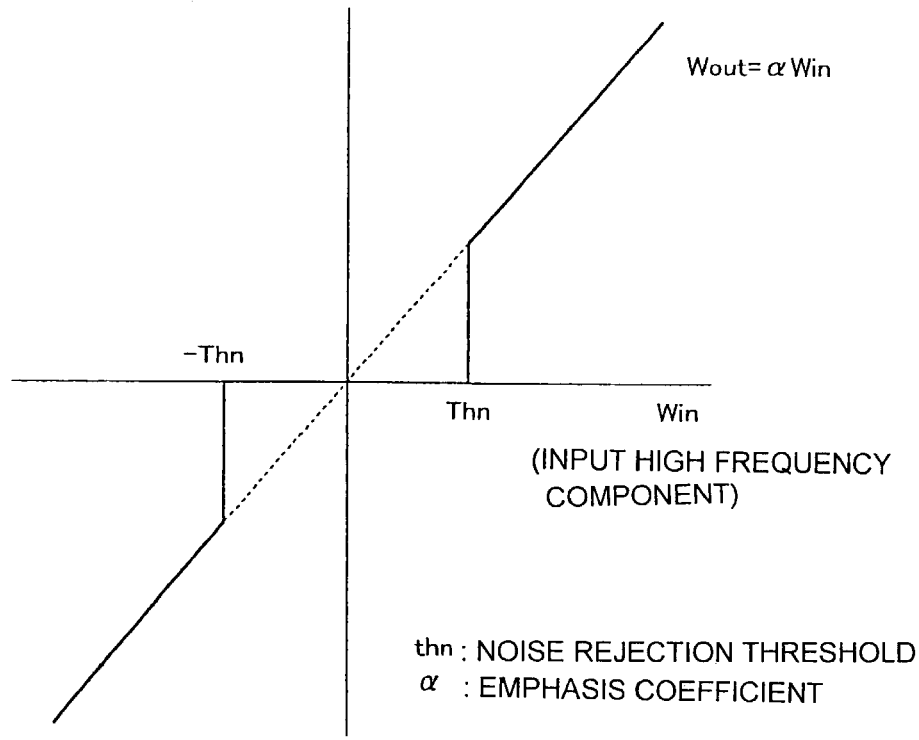
FIG. 63 shows the input and output state of a signal in an arithmetic and logical unit provided in the filtering processing unit according to the ninth embodiment.
FIG. 64 shows a setting example of parameters set by a parameter setting section in the filtering processing unit according to the ninth embodiment.

The operation of the sharpness control unit 5209 is explained in detail, with reference to FIG. 62 and FIG. 63. The sharpness control unit 5209 uses the respective results calculated by the character edge quantity calculation unit 5208, to perform emphasis processing and smoothing processing of the image signal independently for each frequency band and each direction component.

Specifically, it is constructed such that predetermined correction is performed by the correction units 5617 to 5622 shown in FIG. 51, with respect to the first hierarchy and second hierarchy wavelet high frequency component coefficients 1LH, 1HL, 1HH, 2LH, 2HL, and 2HH, corresponding to the calculation results (outputs) D1 to D6 of the character edge quantity calculation unit 5208.

FIG. 62 is a block diagram of any of the correction units 5617 to 5622. Each of the correction units 5617 to 5622 has a parameter setting section 6729 and an arithmetic and logical unit 6730. The parameter setting section 6729 outputs a predetermined emphasis coefficient α for each frequency band and each direction component, and a noise rejection threshold Thn, to the arithmetic and logical unit 6730, based on the size of the character edge quantity.

FIG. 63 shows the input and output state of a signal in the arithmetic and logical unit 6730. When the absolute value of the input high frequency coefficient signal Win is smaller than the noise rejection threshold Thn, the arithmetic and logical unit 6730 outputs 0 as a value of the high frequency coefficient signal Wout after correction. When the absolute value of the input high frequency coefficient signal Win is not smaller than the noise rejection threshold Thn, the arithmetic and logical unit 6730 performs calculation of multiplying the value of the input high frequency coefficient signal Win by the emphasis coefficient α, and outputs the result as the high frequency coefficient signal Wout after correction.

When the size of the character edge quantity is larger than a predetermined threshold Thb preset for each frequency band and each direction component, the parameter setting section 6729 outputs the emphasis coefficient α for characters and the noise rejection threshold Thn, and when the size of the character edge quantity is smaller than the threshold Thb, the parameter setting section 6729 outputs the emphasis coefficient α for pattern areas and the noise rejection threshold Thn. FIG. 64 shows an example of parameters set by the parameter setting section 6729. The emphasis coefficient α for character areas and pattern areas and the noise rejection threshold Thn are set separately for each of different frequency bands (first hierarchy and second hierarchy) and different direction components (HL, LH, HH).

By performing the above-described processing, the correction units 5617 to 5622 can remove high frequency components smaller than the noise rejection threshold Thn as noise, to thereby obtain a smoothed image. The high frequency components not smaller than the noise rejection threshold Thn are multiplied by α (α>1) as a signal, and hence a difference component increases to give an emphasized image.

Since the noise rejection threshold Thn and the emphasis coefficient α can be set independently for each of different frequency bands (first hierarchy and second hierarchy), and different direction components (HL, LH, HH), the size of the high frequency component to be removed for each frequency and direction, and the degree of emphasis can be controlled, thereby enabling fine noise rejection (smoothing) and emphasis.

The parameter setting section 6729 judges character areas and pattern areas according to the size of the character edge quantity, and switches the parameter group, to thereby set the emphasis coefficient α to a larger value in the character areas than a value in the pattern areas. As a result, in character and line drawing portions, sufficient sharpness can be obtained. Further, a relatively small density change can be emphasized by setting the noise rejection threshold Thn to a small value, thereby sharpness of the character and line drawing portions can be satisfied.

Particularly, since the character edge quantity calculation unit 5208 controls sharpness of the image signal independently for each frequency band and each direction component, based on the respective character edge quantities calculated for each frequency band and each direction component, emphasis only on the necessary frequency ban and direction becomes possible. For example, characters are emphasized by emphasizing only the direction along the edge of a character even for a character on dots, while suppressing the emphasis on adjacent dots, thereby enabling improvement in sharpness and reproducibility of the character on dots. Since it is possible to emphasize only the necessary frequency band, a harmonic distortion due to emphasis on an excessive high frequency component can be suppressed in dots and characters, while ensuring necessary sharpness in the reproduced image.

In setting for each band, for example, it is possible to set such that the degree of emphasis becomes highest on the second hierarchy high frequency components. In an ordinary document, sufficient sharpness can be obtained with respect to a character image as small as 6 point Mincho typeface, by increasing the emphasis in the vicinity of image frequency corresponding to 6 per mm. If excessive emphasis is performed with respect to a frequency band higher than this, there is the possibility to emphasize the noise component, and hence it is not preferable. For example, based on an image signal read by a scanner having a resolution of 600 dpi, the high frequency component corresponding to 6 per mm is a second hierarchy signal (2nd-HL, 2nd-LH, 2nd-HH), and hence the emphasis coefficient α for the second hierarchy is set highest. In this manner, it is appropriately set in which hierarchy the emphasis coefficient α is set highest.

In the pattern area, a relatively small emphasis coefficient α is employed in order to suppress the occurrence of moire in a dot image portion. Particularly, with respect to a dot image having the number of lines as high as 150 or more, a relatively large noise rejection threshold Thn is set to remove a dot structure and realize an improvement in graininess.

The sharpness control for character areas and pattern areas (mainly dot image area) for obtaining excellent image qualities of these becomes possible by setting the parameter in the parameter setting section 6729 as described above.

Figure 65:
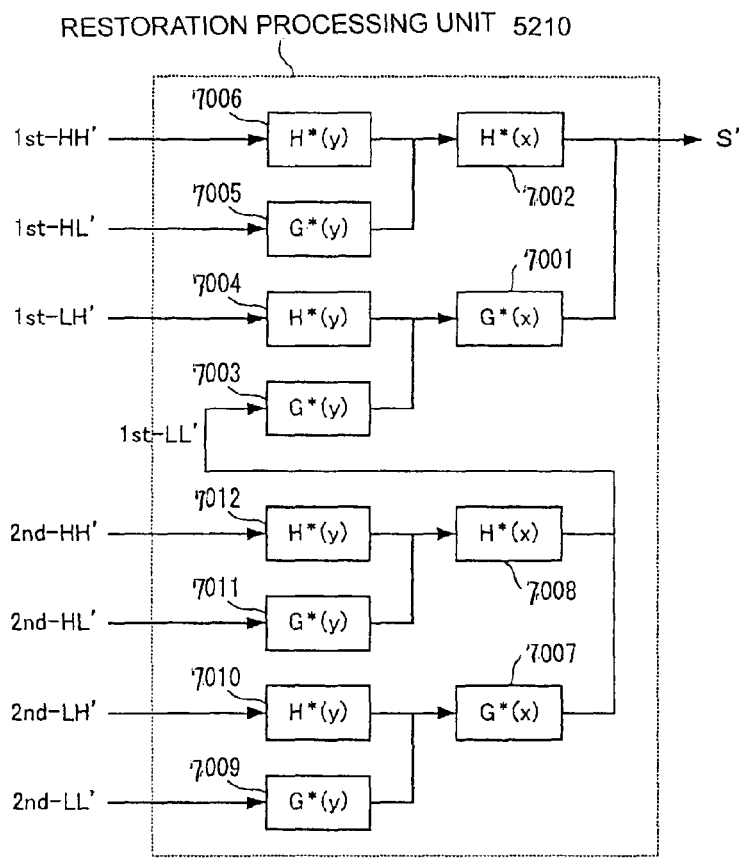
FIG. 65 is a block diagram of a restoration processing unit provided in the filtering processing unit according to the ninth embodiment.

As shown in FIG. 57, the output F of the sharpness control unit 5209 is input to the restoration processing unit 5210, and inversely transformed into a real space image. FIG. 65 is a block diagram of the restoration processing unit 5210. The restoration processing unit 5210 performs processing from a higher hierarchy wavelet coefficient signal. The second hierarchy coefficient signals (2nd-LL', 2nd-HL', 2nd-LH', 2nd-HH') corrected by the sharpness control unit 5209 are inversely transformed in the y direction by inversion filters H*(y) 7010 and 7012, and inversion filters G*(y) 7009 and 7011, and further inversely transformed in the x direction by an inversion filter H*(x) 7008 and an inversion filter G*(y) 7007.

The obtained image signal is a corrected first hierarchy LL signal (1st-LL'), and the restoration processing is performed by similar inversion filter groups 7001 to 7006, together with other corrected first hierarchy coefficient signals (1st-HL', 1st-LH', 1st-HH'). In this manner, a real space image signal S' after the filtering processing can be obtained.

The wavelet transform performed in the ninth embodiment has such a configuration that subsampling (decimation of pixels) normally performed in the compression processing or the like is not performed.

Figure 66:
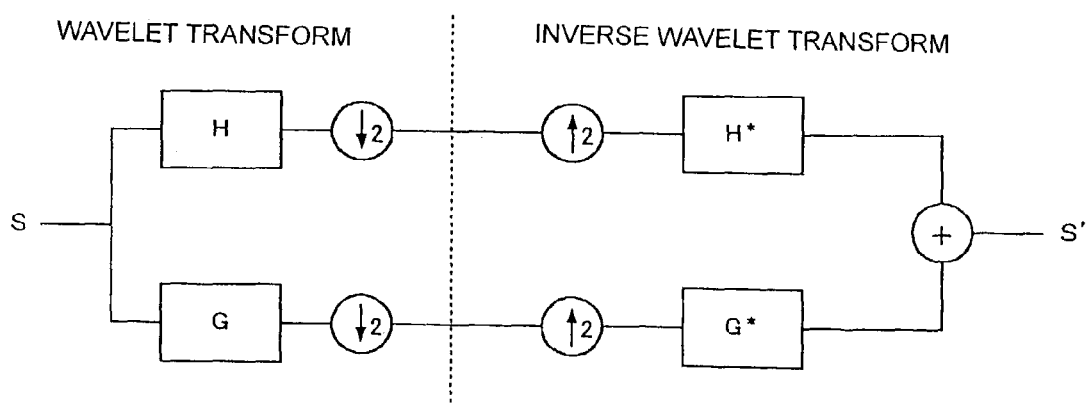
FIG. 66 is a block diagram of wavelet transform in which subsampling is performed.

FIG. 66 is a block diagram of wavelet transform in which subsampling is performed. As shown in this figure, after the processing by the high-pass filter and the low-pass filter, processing for decimation one pixel in two pixels is performed, to obtain a coefficient signal. In the inverse transform, upsampling is performed, and then inverse transform is performed by the inversion filters.

Figure 67:
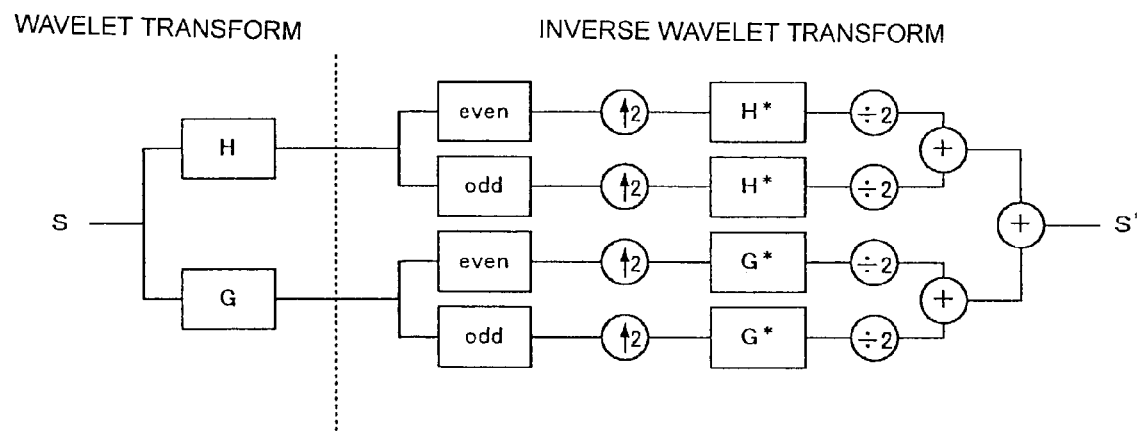
FIG. 67 is a block diagram of wavelet transform according to the ninth embodiment.
Figure 68:
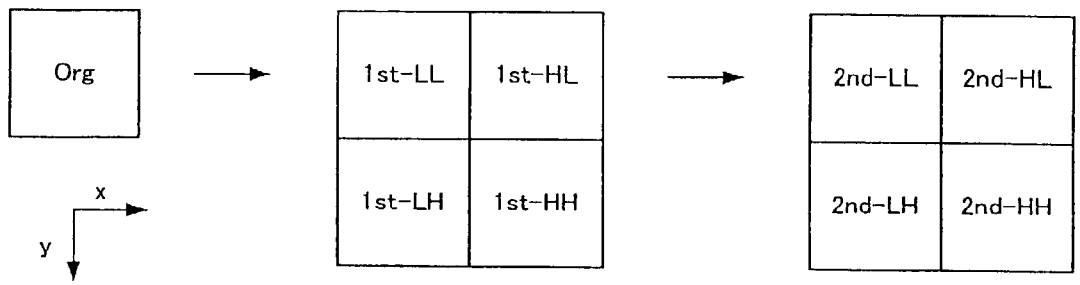
FIG. 68 shows an image size before and after the wavelet transform according to the ninth embodiment.

FIG. 67 is a block diagram of wavelet transform to be performed in the ninth embodiment. As shown in this figure, downsampling is not performed at the time of normal transform. FIG. 68 shows an image size before and after the wavelet transform. As shown in this figure, the image size of the coefficient signal in each hierarchy and each direction has the same size as that of the input image Org. At the time of inverse transform, as shown in FIG. 67, upsampling is performed respectively for an even pixel group and an odd pixel group and then inverse transform is performed. Since the inversion result from the even image group and the inversion result from the odd image group can be obtained with respect to one original image pixel, these are averaged to obtain inversely transformed image data.

Figure 69:
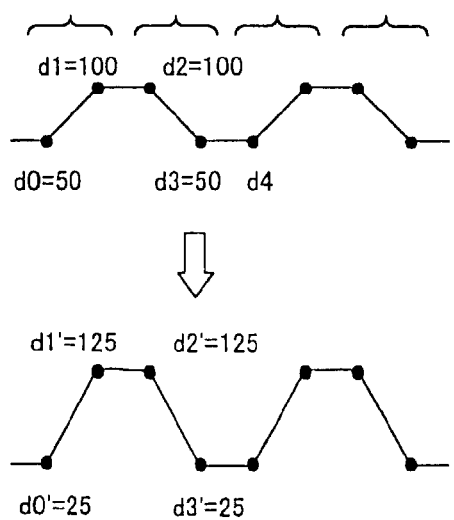
FIG. 69 explains calculation of a feature of an image, when subsampling is performed.

By the processing in which subsampling is not performed, highly accurate calculation of the image feature can be performed, and high quality filtering processing without having nonuniformity in emphasis and smoothing can be performed. FIGS. 69 to 71 show calculation of the image feature. The original images shown in these figures are the same, and are respectively a signal in which shading is repeated in a cycle of four pixels. FIGS. 69 and 70 show an example in which subsampling is performed, and FIG. 71 shows an example in which subsampling is not performed (a method in the ninth embodiment). FIGS. 69 and 70 show an example where a pixel to be subjected to subsampling is shifted by one pixel.

In the case of processing shown in FIG. 69, an example is shown in which a wavelet coefficient signal for a pixel pair of d1 and d2 and a pixel pair of d3 and d4 is thinned, and as a result, coefficient signals for the pixel pair of d0 and d1, and the pixel pair of d2 and d3 are left. For example, when inverse transform is performed by multiplying the high frequency component by a double emphasis coefficient, for emphasized filtering processing, the high frequency components of d0 and d1 are amplified to become two-fold, thereby the data difference between d0' and d1' after the inversion becomes twofold, and hence it is seen that desired emphasis processing has been performed.

On the other hand, as shown in FIG. 70, when subsampling is shifted by one pixel, the high frequency component obtained by the pixel pair of d1 and d2 becomes 0, and even if the emphasis coefficient is multiplied, the high frequency component is not amplified. Therefore as shown in the figure, the result is not at all different from the original signal, and it is seen that desired emphasis processing has not been performed. In this manner, in the transform system for performing subsampling, correction of the frequency characteristic may not be performed correctly due to the sampling position.

According to the wavelet transform in which subsampling is not performed, as explained in the ninth embodiment, the above problem can be solved. That is, according to the wavelet transform in which subsampling is not performed, as shown in FIG. 71, the result is the one obtained by averaging the result of FIG. 69 and FIG. 70, and hence frequency characteristic can be corrected without fail. Further, when not only the emphasis processing but also calculation of the image feature are performed, feature can be extracted highly accurately, because subsampling is not performed.

In the ninth embodiment, Haar type wavelet is explained as an example of the wavelet basis function, but similar results can be obtained by other basis functions. Further, the same thing is applied to sub-band transform for dividing an image into a plurality of frequency bands, Fourier transform, Hadamard transform, and Laplacian pyramid, other than the wavelet transform.

Figure 72:
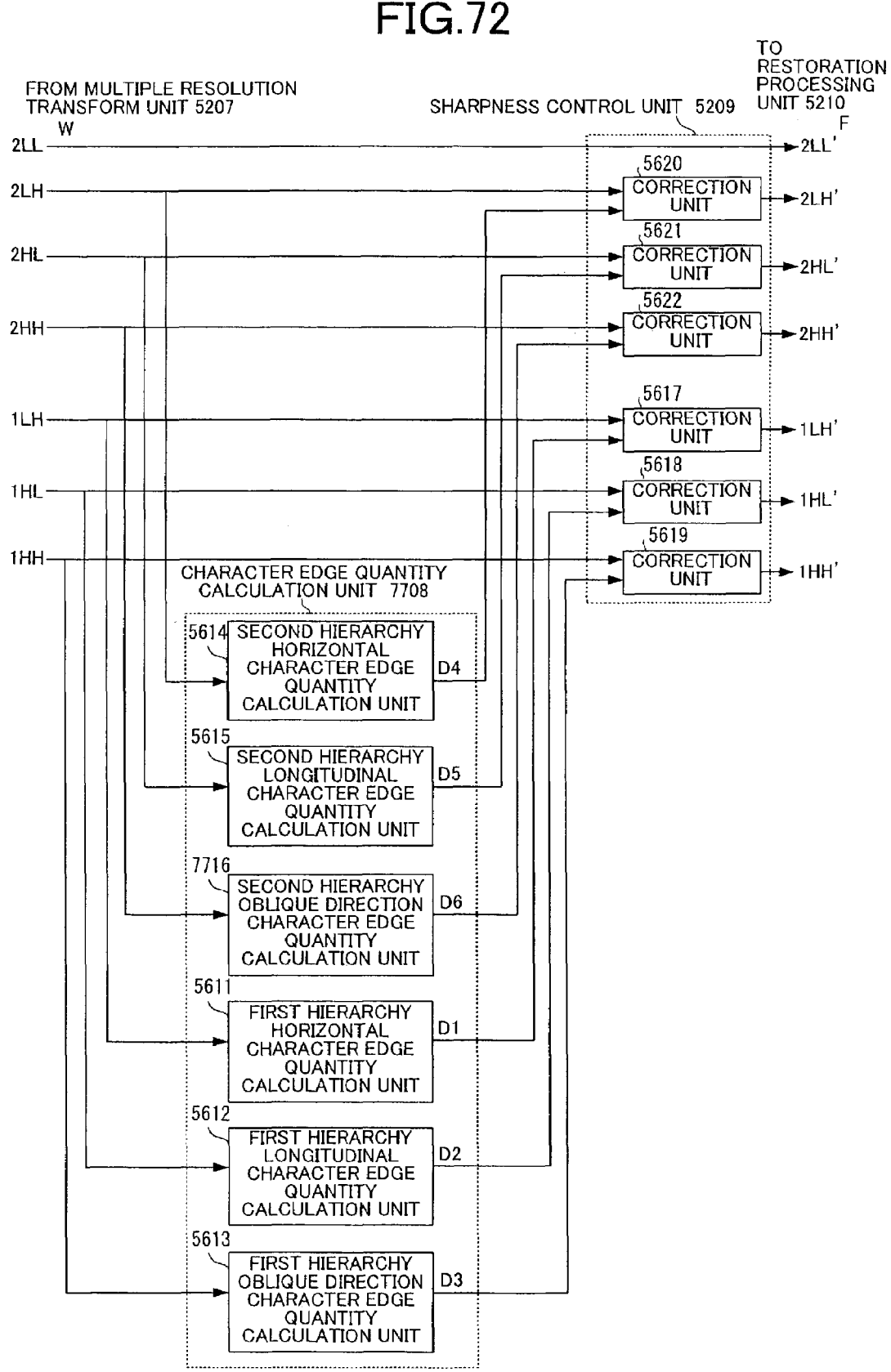
FIG. 72 is a block diagram of a character edge quantity calculation unit provided in a tenth embodiment of the present invention.

FIG. 72 is a block diagram of a character edge quantity calculation unit 7708 in an image processor according to a tenth embodiment of the present invention. The overall configuration of the image processor in the tenth embodiment is similar to that of the ninth embodiment (see FIG. 26 and FIG. 47). The character edge quantity calculation unit 7708 in the tenth embodiment is different from the configuration in the ninth embodiment in that only the second hierarchy diagonal direction character edge quantity calculation unit 7716, which calculates the character edge quantity in the second hierarchy and diagonal direction, calculates the 1LL coefficient signal as an input, not the 2HH coefficient signal.

Figure 73:
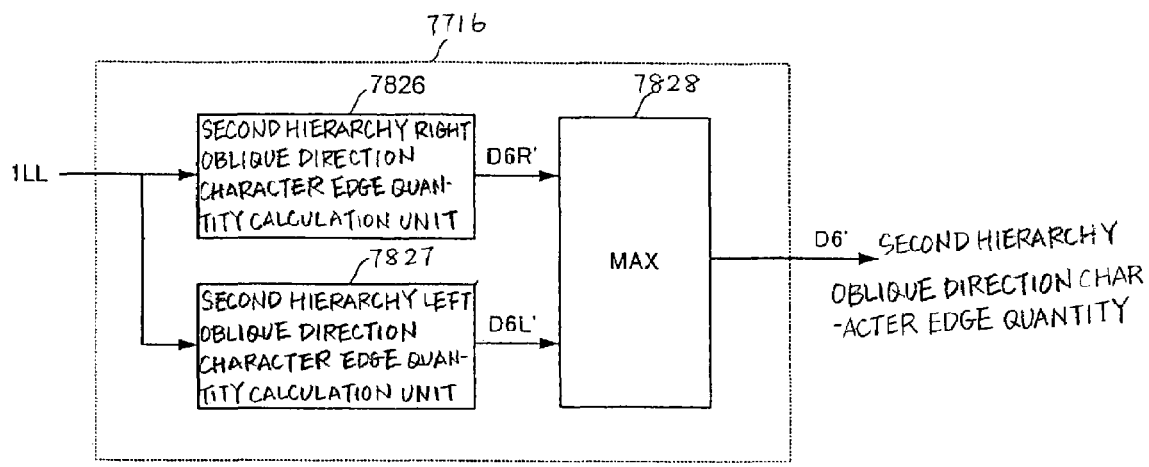
FIG. 73 is a block diagram of a second hierarchy diagonal direction character edge quantity calculation unit provided in the filtering processing unit according to the tenth embodiment.

FIG. 73 is a block diagram of the second hierarchy diagonal direction character edge quantity calculation unit 7716. The second hierarchy diagonal direction character edge quantity calculation unit 7716 comprises a second hierarchy right diagonal direction character edge quantity calculation unit 7826, a second hierarchy left diagonal direction character edge quantity calculation unit 7827, and a maximum value calculation unit 7828.

The second hierarchy right diagonal direction character edge quantity calculation unit 7826 receives a 1LL coefficient signal as an input and calculates a character edge quantity $D6R'$ in the second hierarchy and right diagonal direction. The second hierarchy left diagonal direction character edge quantity calculation unit 7827 calculates a character edge quantity $D6L'$ in the second hierarchy and left diagonal direction. The maximum value calculation unit 7828 outputs a maximum value thereof as a character edge quantity $D6'$ in the second hierarchy and diagonal direction.

In the tenth embodiment, the edge in the diagonal direction cannot be detected directly from the input 1LL coefficient signal. Therefore, at first two 1LL coefficients are subtracted, to calculate a corrected LL that can express the size of the edge quantity in the diagonal direction (see FIG. 74). The corrected LL includes two kinds, that is, "corrected LL right" that expresses the edge quantity in the right diagonal direction, and "corrected LL left" that expresses the edge quantity in the left diagonal direction. When there is continuity in a character edge quantity calculation direction larger than a reference value, in the "corrected LL" in the both directions, the corrected LL value corresponding to the target pixel position is designated as a character edge quantity in the calculation direction. Here, the continuity is substituted by the size of the total (of the absolute value) of a difference of six adjacent corrected LLs.

At first, the calculation method of the character edge quantity $D6R'$ in the second hierarchy and right diagonal direction is explained. FIG. 74 shows a character edge quantity calculation process in the second hierarchy and right diagonal direction by the second hierarchy right diagonal direction character edge quantity calculation unit 7826. In the case of calculating a character edge quantity in the right diagonal direction, the difference total of the adjacent correction LLs in the right diagonal direction is calculated with respect to the "corrected LL right" in FIG. 74A, and the "corrected LL left" in FIG. 74B, and when the both values are smaller than a predetermined threshold (th1, th2), $D6R'$ corresponding to the target pixel position is calculated according to the following conditional expression.

if ((difference total of adjacent "corrected LL right"$\leq$thr1) && (difference total of adjacent "corrected LL left"$\leq$thr2)),
   then ($D6R'$=value of "corrected LL right" corresponding to
     target pixel position)
   else
   ($D6R'$=0).

As shown in FIGS. 74A and 74B, when the difference total of the adjacent corrected LL right in (FIG. 75A) is not larger than the threshold thr1, and the difference total of the adjacent corrected LL left in (FIG. 75B) is not larger than the threshold thr2, the corrected LL right corresponding to the target pixel position (corrected LL right-3) is designated as the character edge quantity in the right diagonal direction.

The calculation method of the character edge quantity $D6L'$ in the second hierarchy and left diagonal direction is explained next. FIGS. 75A and 75B explain a character edge quantity calculation process in the second hierarchy and left diagonal direction by the second hierarchy left diagonal direction character edge quantity calculation unit 7827. In the case of calculating a character edge quantity in the left diagonal direction, the difference total of the adjacent correction LL in the left diagonal direction is calculated with respect to the "corrected LL left" in FIG. 75A, and the "corrected LL right" in FIG. 75B, and when the both values are smaller than a predetermined threshold (th1, th2), $D6L'$ corresponding to the target pixel position is calculated according to the following conditional expression.

if ((difference total of adjacent "corrected LL left"$\leq$thr1) && (difference total of adjacent "corrected LL right"$\leq$thr2)),
   then ($D6L'$=value of "corrected LL left" corresponding to
     target pixel position)
   else
   ($D6L'$=0).

As shown in FIGS. 75A and 75B, when the difference total of the adjacent corrected LL left in (FIG. 75A) is not larger than the threshold thr1, and the difference total of the adjacent corrected LL right in (FIG. 75B) is not larger than the threshold thr2, the corrected LL left corresponding to the target pixel position (corrected LL left-3) is designated as the character edge quantity in the left diagonal direction.

The calculation results of the character edge quantity $D6R'$ in the second hierarchy and right diagonal direction and the character edge quantity $D6L'$ in the second hierarchy and left diagonal direction are input to the maximum value calculation unit 7828. The maximum value calculation unit 7828 outputs the maximum value of these as the character edge quantity $D6'$ in the second hierarchy and diagonal direction.

As explained in the tenth embodiment, at the time of calculating the character edge quantity in the diagonal direction, if the configuration is such that instead of the HH coefficient, the corrected LL coefficient capable of extracting the character edge more accurately is used, it becomes possible to divide the character areas and the non-character areas in the input image, and particularly, to reduce misjudgment of the dot portion. As a result, high quality output image can be obtained, in which a harmonic distortion due to the emphasis on excessive high frequency components in dots and characters can be suppressed, while ensuring sharpness necessary for the reproduced image.

Figure 76:
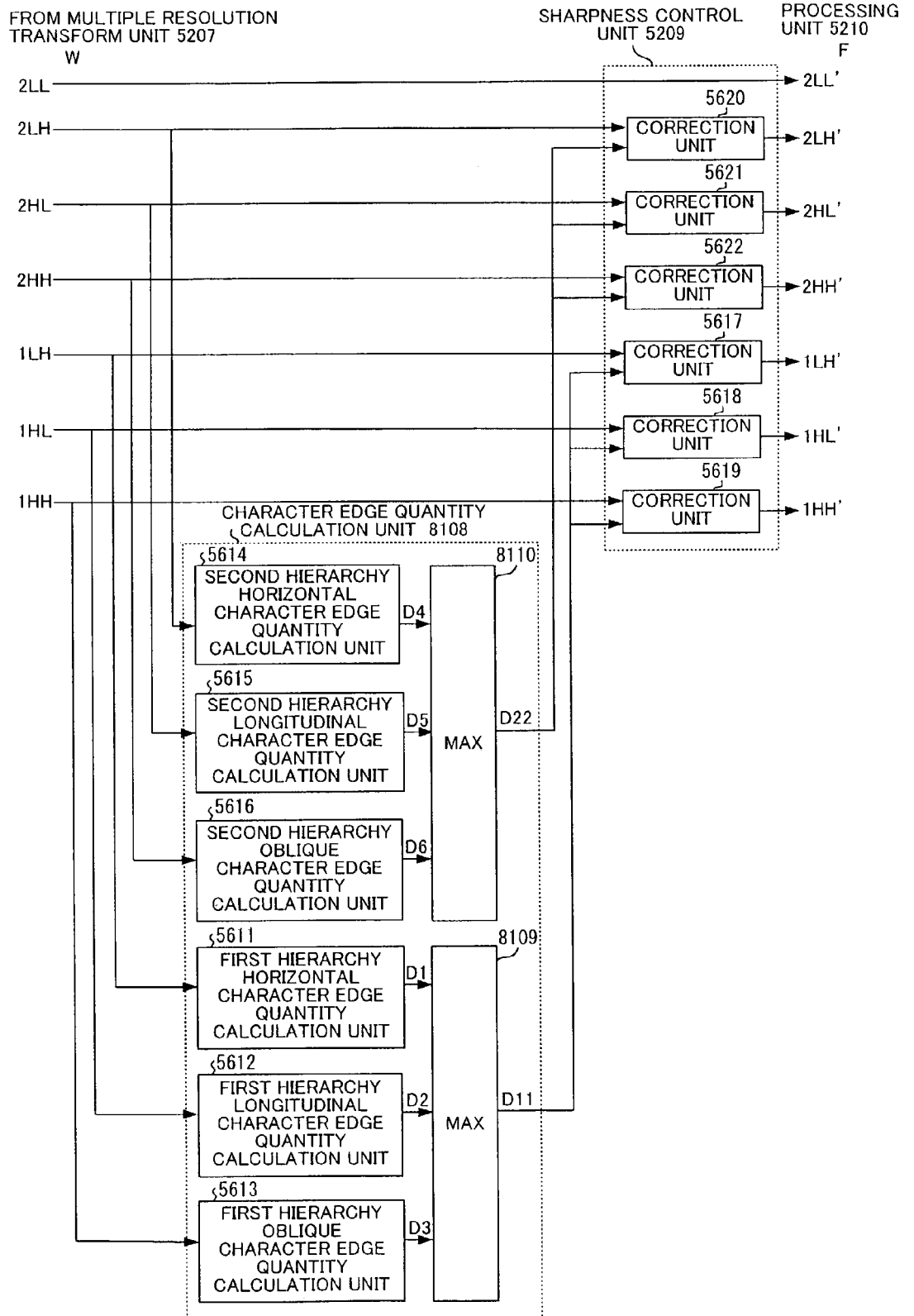
FIG. 76 is a block diagram of a character edge quantity calculation unit provided in the filtering processing unit according to an eleventh embodiment of the present invention.

FIG. 76 is a block diagram of a character edge quantity calculation unit 8108 in an image processor according to an eleventh embodiment of the present invention. The overall configuration of the image processor according to the eleventh embodiment is similar to that of the ninth embodiment. As shown in FIG. 76, the character edge quantity calculation unit 8108 according to the eleventh embodiment has a configuration such that a character edge quantity for each frequency band is calculated respectively in the first hierarchy and the second hierarchy, and the sharpness control unit 5209 performs sharpness control separately, based on the respective results.

With respect to the first hierarchy, the first hierarchy horizontal character edge quantity calculation unit 5611 calculates the character edge quantity calculation result D1 in the first hierarchy and horizontal direction, the second hierarchy vertical character edge quantity calculation unit 5612 calculates the character edge quantity calculation result D2 in the first hierarchy and vertical direction, and the first hierarchy diagonal direction character edge quantity calculation unit 5613 calculates the character edge quantity calculation result D3 in the first hierarchy and diagonal direction. These character edge quantity calculation results D1, D2, and D3 in the first hierarchy and in the respective directions are input to a maximum value calculation unit 8109.

The maximum value calculation unit 8109 calculates the maximum value of the calculation results D1, D2, and D3 of the character edge quantities, and outputs the maximum value as the first hierarchy character edge quantity D11. Based on the result, the sharpness control unit 5209 performs sharpness control of the first hierarchy coefficient signal.

Also in the second hierarchy, the second hierarchy horizontal character edge quantity calculation unit 5614 calculates the character edge quantity calculation result D4 in the second hierarchy and horizontal direction, the second hierarchy vertical character edge quantity calculation unit 5615 calculates the character edge quantity calculation result D5 in the second hierarchy and vertical direction, and the second hierarchy diagonal direction character edge quantity calculation unit 5615 calculates the character edge quantity calculation result D6 in the second hierarchy and diagonal direction. These character edge quantity calculation results D4, D5, and D6 in the second hierarchy and in the respective directions are input to a maximum value calculation unit 8110.

The maximum value calculation unit 8110 calculates the maximum value of the calculation results D4, D5, and D6 of the character edge quantities, and outputs the maximum value as the second hierarchy character edge quantity D22. Based on the result, the sharpness control unit 5209 performs sharpness control of the second hierarchy coefficient signal.

The sharpness control unit 5209 sets the parameter for either the character areas or the pattern areas based on the size of the input character edge quantity for each frequency band, performs the similar calculation with respect to the high frequency component coefficient signal for each frequency band and for each direction component, and outputs the corrected high frequency component coefficient signal F to the restoration processing unit 5210.

Figure 77:
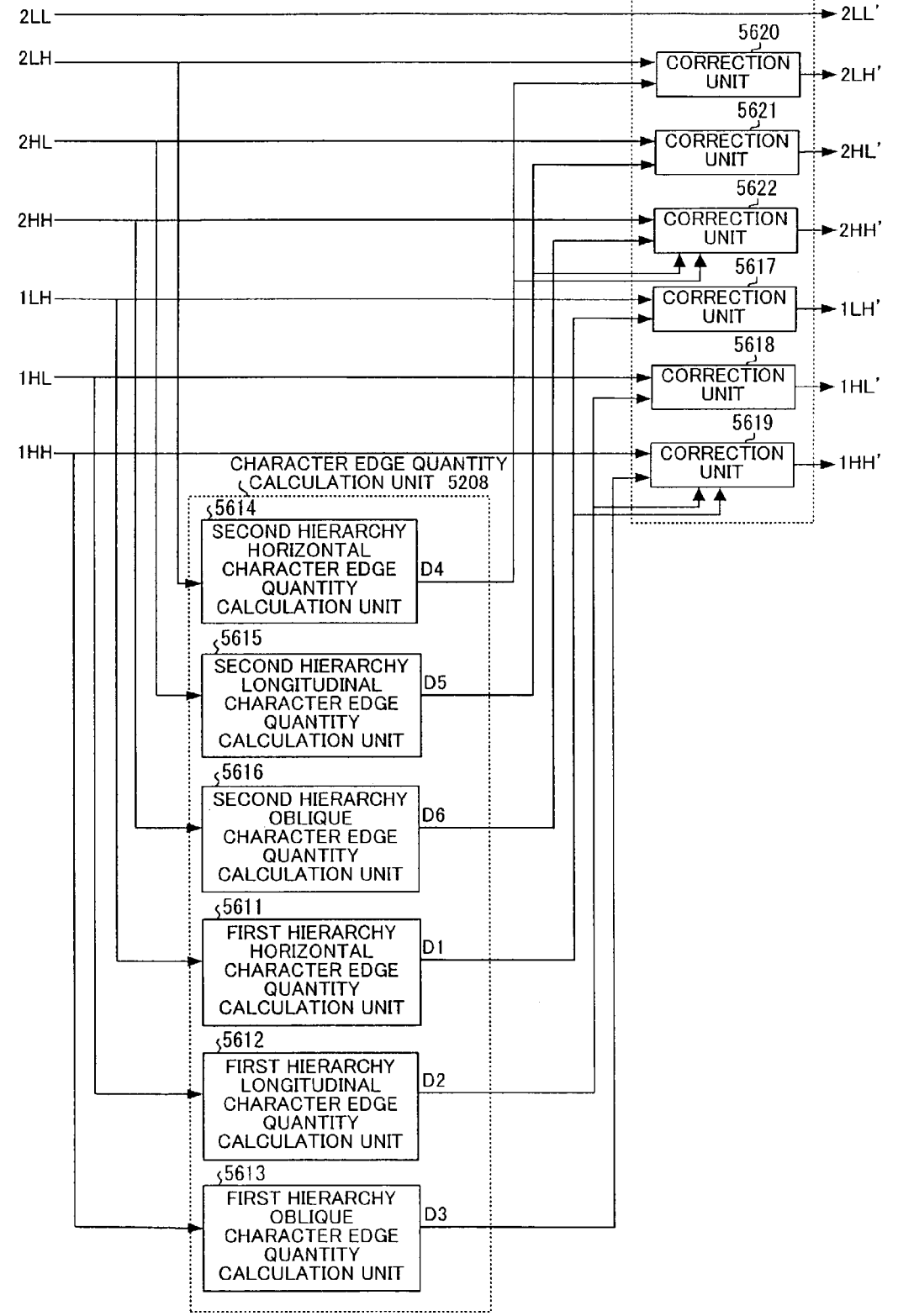
FIG. 77 is a block diagram of a character edge quantity calculation unit and a sharpness control unit provided in the filtering processing unit according to a twelfth embodiment of the present invention.

As shown in FIG. 77, a twelfth embodiment of the present invention has a configuration such that character edges in the diagonal direction are emphasized more reliably. The overall configuration is similar to that of the ninth embodiment (see FIG. 26 and FIG. 47), but the configuration of the character edge quantity calculation unit 5208 and the sharpness control unit 5209 are different from those in the ninth embodiment.

In the ninth embodiment, the configuration is such that only the character edge quantity calculated for each frequency band and each direction component by the character edge quantity calculation unit 5208 is reflected for the sharpness control of the corresponding coefficient signal by the sharpness control unit 5209. However, in this twelfth embodiment, as shown in FIG. 77, the parameters for the character areas and the pattern areas are determined, taking into consideration the size of the character edge quantity of the vertical and horizontal components in the same frequency band, for the sharpness control in the diagonal direction.

The character edge quantity D6 in the diagonal direction calculated by the second hierarchy diagonal direction character edge quantity calculation unit 5616 is input to a corresponding to correction unit 8222, by the sharpness control unit 5209. The character edge quantity D4 in the horizontal direction calculated by the second hierarchy horizontal character edge quantity calculation unit 5614, and the character edge quantity D5 in the vertical direction calculated by the second hierarchy vertical character edge quantity calculation unit 5615 are input to this correction unit 8222.

As a result, judgment as the character area can be easily performed also for the character edge in the diagonal direction, for example, other than 45 degrees or 135 degrees, and emphasis for character areas can be appropriately performed.

Figure 78:
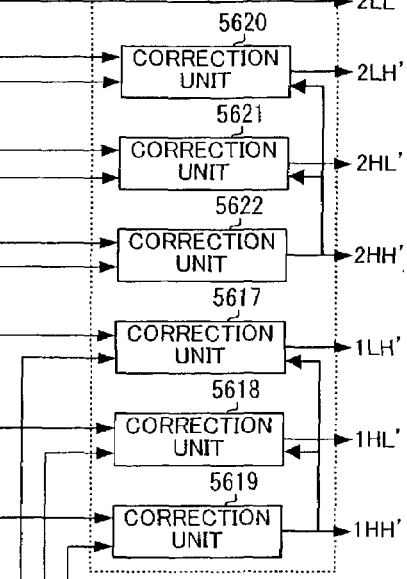
FIG. 78 is a block diagram of a character edge quantity calculation unit and a sharpness control unit provided in the filtering processing unit according to a thirteenth embodiment of the present invention.

An image processor according to a thirteenth embodiment of the present invention has a configuration to ensure emphasis on the character edge in the diagonal direction more reliably, when character edge in the diagonal direction is detected. The overall configuration is similar to that of the ninth embodiment (see FIG. 26 and FIG. 47). FIG. 78 is a block diagram of the character edge quantity calculation unit 5208 and the sharpness control unit 5209 provided in the thirteenth embodiment.

In the ninth embodiment, when a character edge in the diagonal direction is detected by the character edge quantity calculation unit 5208, only the HH coefficient signal is subjected to sharpness control as a parameter for character areas. In this thirteenth embodiment, as shown in FIG. 78, parameters are set such that not only the HH coefficient signal is emphasized as the character area, but also the LH and HL coefficient signals in the same frequency band are emphasized stronger than the normal pattern processing.

Therefore, the connection structure in the sharpness control unit 5209 is partly changed with respect to the configuration shown in FIG.

51. The corrected output 1HH' in the diagonal direction in the first hierarchy is input to the correction unit 5617 in the horizontal direction and the correction unit 5618 in the vertical direction. Also in the second hierarchy, the corrected output 2HH' in the diagonal direction is input to the correction unit 5620 in the horizontal direction and the correction unit 5621 in the vertical direction.

As a result, the edge component in the diagonal direction naturally holding a signal level of a certain size even in the LH and HL coefficient signals can be appropriately emphasized.

Such a configuration is also possible that if the character edge quantity calculation unit 5208 calculates a character edge quantity larger than a predetermined value in the diagonal direction, the sharpness control unit 5209 does not perform processing for replacing the coefficient by 0 (see FIG. 63), which is performed when the absolute value of the coefficient signal of the vertical and horizontal direction components in the same frequency band is smaller than the predetermined value. As a result, the edge component in the diagonal direction holding coefficient signals also in the vertical and horizontal directions can be emphasized, thereby enabling improvement in sharpness of the character and reproducibility of the image.

The image processor according to the above-mentioned embodiments of the present invention can be applied to a system comprising a plurality of equipment, and to an apparatus consisting of one equipment. The method according to the image processing explained in the respective embodiments can be realized by executing a program prepared in advance by a computer such as a personal computer or a workstation. This program is recorded on a computer readable recording medium such as a hard disk, a floppy (R) disk, CD-ROM (Compact Disk Read Only Memory), MO (Magneto Optic Disk), and DVD (Digital Versatile Disk), read from the recording medium and executed by the computer. Further, this program can be distributed via the recording medium, or via a network such as Internet.

As explained above, according to the invention of a first aspect, the image processor comprises a plurality of edge quantity extraction units that has an edge extraction filter for extracting edge quantities in a plurality of frequency band components and direction components from an input image signal, a plurality of edge quantity correction units that performs predetermined transform with respect to respective edge quantities extracted by the edge quantity extraction units, and an addition unit that adds outputs from the edge quantity correction units to the input image signal, wherein the mask center position of the edge extraction filter in at least one of the edge quantity extraction units is alienated from a target pixel. That is, the mask center position of the filter at the time of extracting the edge quantity is intentionally alienated from the target pixel. Therefore, the filtering processing can be realized by performing correction using the segmentation results at the respective positions with respect to the mask center position of the filter that extracts the edge quantity. As a result, even if the feature of a character is partially strong, if the feature of non-characters in the periphery is strong, a filter property suitable for non-characters can be obtained, thereby high performance filtering processing can be performed without dramatically changing the filter property in a unit of pixel.

According to the invention of a second aspect, in the invention of the first aspect, the edge quantity extraction units output the image attribute information based on the mask center position with respect to the position of the target pixel to the edge quantity correction units, and the edge quantity correction units control the correction content corresponding to the input image attribute information based on the mask center position of the edge detection filter. Therefore, the final filter property can be comprehensively determined by a plurality of corrections including the image attribute information at a plurality of positions. For example, even if binary image attribute information is used, the filter property can be changed in multiple steps in the image, and a segmentation error and a defect at a segmentation boundary can be reduced, at the time of processing using the image attribute information.

According to the inventions of third and fourth aspects, the respective edge quantity correction units change an emphasis coefficient for the correction, corresponding to the size of the edge quantity extracted by the respective edge quantity extraction units. Therefore, adaptive filtering processing can be performed corresponding to the edge quantity for each edge quantity component. As a result, high performance filtering processing is realized, in which sharpness of the characters in the image and the graininess with respect to the pattern can coexist.

According to the inventions of fifth, sixth, seventh, and eighth aspects, the image processor further comprises a smoothing unit that performs smoothing processing with respect to the input image signal, and the addition unit adds outputs of the edge quantity correction units to the image signal smoothed by the smoothing unit. As a result, there is the effect that wide range of correction from smoothing to emphasizing can be easily performed with respect to the image.

According to the inventions of ninth, tenth, eleventh and twelfth aspects, at the time of processing for adding the extracted edge quantity directly to the signal after smoothing, without performing correction by the edge quantity correction units, the smoothing unit sets the obtained frequency transfer characteristics to become substantially 1 in the whole frequency band. As a result, the edge quantity correction can be easily adjusted, and when the edge quantity is not corrected, a filter through property can be easily obtained, and hence the filter property can be easily changed.

According to the inventions of thirteenth, fourteenth, fifteenth, and sixteenth aspects, when the input image signal corresponds to a pattern portion, the smoothing unit sets the frequency transfer characteristics to a filter property suitable for a dot image, and the edge quantity correction units set the whole edge quantity to be corrected to 0. As a result, the edge quantity correction can be easily adjusted according to the image, and a property most suitable for the pattern portion in the image can be obtained.

According to the invention of a seventeenth aspect, the image processor comprises a multiple resolution transform unit that divides an input image signal into coefficient signals in a plurality of frequency bands and a plurality of direction components and outputs the signals, a sharpness control unit that inputs a plurality of image attribute signals obtained corresponding to respective positions of the plurality of coefficient signals obtained by the multiple resolution transform unit, and corrects the coefficient signal at a corresponding position, based on the image attribute signal, and a restoration processing unit that obtains a processed image signal by inversely transforming the output from the sharpness control unit, wherein the multiple resolution transform unit holds the obtained coefficient signal without decimation, at the time of dividing the input image signal into coefficient signals in a plurality of frequency bands and a plurality of direction components, and the restoration processing unit outputs a processed image signal based on a plurality of inversely transformed outputs obtained with respect to one input pixel. As a result, calculation for dividing the band can be easily performed, and high-speed calculation and various filter properties can be realized. Further, even if the segmentation result of the image attribute information is binary, the filter property can be changed in multiple steps in the image, and hence coexistence of segmentation errors and defects at the segmentation boundary can be reduced.

According to the invention of an eighteenth aspect, the image processing method comprises a plurality of edge quantity extraction steps of extracting edge quantities in a plurality of frequency band components and direction components from an input image signal, using an edge extraction filter, and a plurality of edge quantity correction steps of performing predetermined transform to respective edge quantities extracted at the edge quantity extraction steps, and at least one of the edge quantity extraction steps is set so that the mask center position of the edge extraction filter is alienated from a target pixel. In other words, the mask center position of the filter at the time of extracting the edge quantity is intentionally alienated from the target pixel. Therefore, the filtering processing can be realized by performing correction using the segmentation results at the respective positions with respect to the mask center position of the filter that extracts the edge quantity. As a result, even if the feature of a character is partially strong, if the feature of non-characters in the periphery is strong, a filter property suitable for non-characters can be obtained, thereby high performance filtering processing can be performed at a simple step without dramatically changing the filter property in a unit of pixel.

According to the invention of a nineteenth aspect, the image processing method comprises a multiple resolution conversion step of dividing an input image signal into coefficient signals in a plurality of frequency bands and a plurality of direction components and outputting the signals, a sharpness control step of inputting a plurality of image attribute signals obtained corresponding to respective positions of the plurality of coefficient signals obtained by the multiple resolution conversion step, and correcting the coefficient signal at a corresponding position, based on the image attribute signal, and a restoration processing step of obtaining a processed image signal by inversely transforming the output from the sharpness control step, wherein at the multiple resolution conversion step, the obtained coefficient signal is held without decimation, at the time of dividing the input image signal into coefficient signals in a plurality of frequency bands and a plurality of direction components, the obtained coefficient signal is held without decimation, and at the restoration processing step, a processed image signal is output based on a plurality of inversely transformed outputs obtained with respect to one input pixel. As a result, calculation for dividing the band can be easily performed, and high-speed calculation and various filter properties can be realized by a simple step. Further, even if the segmentation result of the image attribute information is binary, the filter property can be changed in multiple steps in the image, and hence coexistence of segmentation errors and defects at the segmentation boundary can be reduced.

According to the invention of a twentieth aspect, the image processor comprises a character edge quantity calculation unit that calculates a character edge quantity for each of a plurality of frequency bands from the input image signal; and a sharpness control unit, being a unit that corrects a spatial frequency based on the character edge quantity calculated by the character edge quantity calculation unit, which performs independent correction and control in the frequency band of the corresponding coefficient signal, based on the character edge quantity for each of a plurality of frequency bands, calculated by the character edge quantity calculation unit. As a result, necessary sharpness can be ensured, and a harmonic distortion due to emphasis on the excessive frequency component in dots or in characters can be suppressed, thereby a favorable output image can be obtained with respect to any original document including characters and characters on dots.

According to the invention of a twenty-first aspect, the image processor comprises a band division unit that divides an input image signal into coefficient signals in a plurality of frequency bands and a plurality of direction components and outputs the signal, a character edge quantity calculation unit that calculates a character edge quantity for each of a plurality of frequency bands based on the coefficient signal divided by the band division unit, and a sharpness control unit, being a unit that corrects a spatial frequency based on the character edge quantity calculated by the character edge quantity calculation unit, which performs independent correction and control in the frequency band of the corresponding coefficient signal, based on the character edge quantity for each of a plurality of frequency bands, calculated by the character edge quantity calculation unit. As a result, necessary sharpness can be ensured, and a harmonic distortion due to emphasis on the excessive frequency component in dots or in characters can be suppressed, thereby a favorable output image can be obtained with respect to any original document including dots, characters, and characters on dots. Realization of the character edge detection can be facilitated, using a coefficient signal such as wavelet.

According to the invention of a twenty-second aspect, the image processor comprises a band division unit, being a unit that divides an input image signal into coefficient signals in a plurality of frequency bands and a plurality of direction components and outputs the signal, which performs division without decimation of the pixel of the input image in at least one frequency band, a character edge quantity calculation unit that calculates a character edge quantity for each of a plurality of frequency bands based on the coefficient signals divided by the band division unit, and a sharpness control unit, being a unit that corrects a spatial frequency based on the character edge quantity calculated by the character edge quantity calculation unit, which performs independent correction and control in the frequency band of the corresponding coefficient signal, based on the character edge quantity for each of a plurality of frequency bands, calculated by the character edge quantity calculation unit. As a result, necessary sharpness can be ensured, and a harmonic distortion due to emphasis on the excessive frequency component in dots or in characters can be suppressed, thereby a favorable output image can be obtained with respect to any original document including dots, characters, and characters on dots. Realization of the character edge detection can be facilitated, using a coefficient signal such as wavelet. Further, at the time of dividing the band, coefficient transform can be performed by wavelet transform or the like, without decimation of the image, and hence a character edge can be detected at a higher accuracy. At the time of inverse transform, a target image is affected by more peripheral coefficients. Therefore, there is the effect that an image can be stably reproduced with fewer defects against an abrupt change in the adjacent data value.

According to the inventions of twenty-third, twenty-fourth, and twenty-fifth aspects, the character edge quantity calculation unit calculates the character edge quantities for a plurality of direction components, in each of the frequency bands, and outputs the largest output value in the results as the character edge quantity in the frequency band at a target position. As a result, there is the effect that the direction to be emphasized is aimed based on the character edge quantity in the frequency bands and the direction components, to thereby emphasize the character.

According to the invention of twenty-sixth aspect, the image processor comprises a character edge quantity calculation unit that calculates character edge quantities for each of a plurality of frequency bands and direction components from the input image signal, and a sharpness control unit, being a unit that corrects a spatial frequency based on the character edge quantity calculated by the character edge quantity calculation unit, which performs independent correction and control in the frequency band and the direction component of the corresponding input image signal, based on the character edge quantities for each of a plurality of frequency bands and direction components, calculated by the character edge quantity calculation unit. As a result, emphasis only on a necessary frequency band and direction becomes possible, and by emphasizing only the direction along the character edge even in a character on dots, the character can be emphasized, while the emphasis on the adjacent dots can be suppressed, thereby enabling an improvement in sharpness and reproducibility of the character on dots.

According to the invention of twenty-seventh aspect, the image processor comprises a band and direction division unit that divides an input image signal into coefficient signals in a plurality of frequency bands and a plurality of direction components and outputs the signals, a character edge quantity calculation unit that calculates character edge quantities for each of a plurality of frequency bands and direction components based on the divided coefficient signals, and a sharpness control unit, being a unit that corrects a spatial frequency based on the character edge quantity calculated by the character edge quantity calculation unit, which performs independent correction and control in the frequency band and the direction component of the corresponding input image signal, based on a plurality of character edge quantities for each of a plurality of frequency bands and direction components, calculated by the character edge quantity calculation unit. Since detection of a character edge and control of sharpness are independently performed for each frequency band and direction, emphasis on only a necessary frequency band and direction becomes possible, and by emphasizing only the direction along the character edge, even in a character on dots, the character can be emphasized, while the emphasis on the adjacent dots can be suppressed, thereby enabling an improvement in sharpness and reproducibility of the character on dots. Further, realization of character edge detection can be facilitated by using a coefficient signal, such as wavelet.

According to the invention of a twenty-eighth aspect, the image processor comprises a band and direction division unit, being a unit that divides an input image signal into coefficient signals in a plurality of frequency bands and a plurality of direction components and outputs the signal, which performs division without decimation of the pixel of the input image in at least one frequency band, a character edge quantity calculation unit that calculates character edge quantities for each of a plurality of frequency bands and direction components based on the coefficient signal divided by the band direction division unit, and a sharpness control unit, being a unit that corrects a spatial frequency based on the character edge quantity calculated by the character edge quantity calculation unit, which performs independent correction and control in the frequency band and the direction component of the corresponding input image signal, based on the character edge quantities for each of a plurality of frequency bands and direction components, calculated by the character edge quantity calculation unit. As a result, emphasis only on a necessary frequency band and direction becomes possible, and by emphasizing only the direction along the character edge, even in a character on dots, the character can be emphasized, while the emphasis on the adjacent dots can be suppressed, thereby enabling an improvement in sharpness and reproducibility of the character on dots. Further, realization of character edge detection can be facilitated by using a coefficient signal, such as wavelet. At the time of dividing the band, coefficient transform can be performed by wavelet transform or the like, without decimation of the image, and hence a character edge can be detected at a higher accuracy. At the time of inverse transform, a target image is affected by more peripheral coefficients. Therefore, there is the effect that an image can be stably reproduced with fewer defects against an abrupt change in the adjacent data value.

According to the inventions of twenty-ninth or thirtieth aspect, when a character edge quantity calculated by the character edge quantity calculation unit is larger than a preset threshold for judgment, the sharpness control unit performs sharpness control for emphasizing the character edge, as compared with a case in which the character edge quantity is smaller than the threshold for judgment. As a result, emphasis only on a necessary frequency band and direction becomes possible, and by emphasizing only the direction along the character edge, even in a character on dots, fine noise rejection and emphasis on the character can be performed, thereby enabling an improvement in sharpness and reproducibility of the character on dots.

According to the inventions of thirty-first or thirty-second aspect, when the character edge quantity calculation unit has calculated a character edge quantity larger than a predetermined value in the vertical and horizontal directions in any of the frequency bands, the sharpness control unit has a function of correcting the threshold to a lower value, with respect to a component in a diagonal direction of the corresponding frequency band. As a result, judgment of a character edge in the diagonal direction can be easily performed based on the character edge quantity in the vertical and horizontal directions. Even a character edge having a diagonal component that does not accurately agree with the detection angle in the right obligue direction or in the left diagonal direction, for example, 45 degrees or 135 degrees, can be easily detected.

According to the invention of a thirty-third or thirty-fourth aspect, when an absolute value of the coefficient signal divided into coefficient signals in a plurality of frequency bands and a plurality of direction components is larger than the predetermined value, the sharpness control unit multiplies the coefficient by a predetermined constant, and when the absolute value is smaller than the predetermined value, the sharpness control unit replaces the coefficient by 0 and outputs it. As a result, fine setting becomes possible by smoothing by noise rejection in the image and a predetermined value that determines the degree of emphasis on characters, thereby enabling an improvement in sharpness and reproducibility of the character on dots.

According to the invention of a thirty-fifth or thirty-sixth aspect, when the character edge quantity calculation unit has calculated a character edge quantity larger than the predetermined value in the diagonal direction, the sharpness control unit increases the constant to be multiplied to the coefficient unconditionally, with respect to the vertical and horizontal components in the same frequency band, as compared with a case in which a character edge quantity smaller than the predetermined value has been calculated, to thereby emphasize the character edge further. As a result, when a character edge in the diagonal direction is detected, the sharpness correction for not only the coefficient signal in the diagonal direction but also the coefficient signal in the vertical and horizontal directions is performed so as to emphasize the sharpness, thereby an edge component in the diagonal direction, which holds coefficient signals also in the vertical and horizontal directions, can be sufficiently emphasized.

According to the invention of a thirty-seventh or thirty-eighth aspect, when the character edge quantity calculation unit has calculated a character edge quantity larger than the predetermined value in the diagonal direction, the sharpness control unit does not execute the processing for replacing the coefficient by 0 when the absolute value of the coefficient signal is smaller than the predetermined value, for the vertical and horizontal components in the same frequency band. As a result, when an edge component in the diagonal direction holds coefficient signals also in the vertical and horizontal directions, the vertical and horizontal directions are also emphasized, thereby enabling improvement in sharpness and reproducibility of the character on dots.

The present document incorporates by reference the entire contents of Japanese priority documents, 2002-078495 filed in Japan on Mar. 20, 2002 and 2002-078494 filed in Japan on Mar. 20, 2002.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image processor comprising:
a band division unit configured to divide an input image signal into coefficient signals in a plurality of frequency bands and a plurality of direction components and output the signal;
a character edge quantity calculation unit configured to calculate a character edge quantity for each of the plurality of frequency bands based on the coefficient signals divided by the band division unit; and
a sharpness control unit configured to correct a spatial frequency based on the character edge quantity calculated by the character edge quantity calculation unit, and perform independent correction and control in the frequency band of the corresponding coefficient signal based on the character edge quantity for each of the plurality of frequency bands.

2. The image processor according to claim 1, wherein the character edge quantity calculation unit is further configured to calculate character edge quantities for the plurality of direction components, in each of the frequency bands, and output the largest character edge cluantity from the character edge quantities for the plurality of direction components as the character edge quantity in the frequency band at a target position.

3. An image processor comprising:
a band division unit configured to divide an input image signal into coefficient signals in a plurality of frequency bands and a plurality of direction components, output the signal, and perform division without decimation of the pixel of the input image in at least one frequency band;
a character edge quantity calculation unit configured to calculate a character edge quantity for each of the plurality of frequency bands based on the coefficient signals divided by the band division unit; and
a sharpness control unit configured to correct a spatial frequency based on the character edge quantity calculated by the character edge quantity calculation unit and perform independent correction and control in the frequency band of the corresponding coefficient signal based on the character edge quantity for each of the plurality of frequency bands.

4. The image processor according to claim 3, wherein the character edge quantity calculation unit is further configured to calculate character edge quantities for the plurality of direction components, in each of the frequency bands, and output the largest character edge quantity from the character edge quantities for the plurality of direction components as the character edge quantity in the frequency band at a target position.

5. An image processor comprising:
a character edge quantity calculation unit configured to calculate character edge quantities for each of a plurality of frequency bands and direction components from an input image signal; and
a sharpness control unit configured to correct a spatial frequency based on the character edge quantity calculated by the character edge quantity calculation unit and perform independent correction and control in the frequency band and the direction component of the corresponding input image signal based on the character edge quantities for each of the plurality of frequency bands and direction components.

6. An image processor comprising:
a band and direction division unit configured to divide an input image signal into coefficient signals in a plurality of frequency bands and a plurality of direction components and output the signals;
a character edge quantity calculation unit configured to calculate a plurality of character edge quantities for each of the plurality of frequency bands and direction components based on the divided coefficient signals; and
a sharpness control unit, configured to correct a spatial frequency based on a character edge quantity from the plurality of character edge cluantities calculated by the character edge quantity calculation unit and perform independent correction and control in the frequency band and the direction component of the corresponding input image signal based on the plurality of character edge quantities for each of the plurality of frequency bands and direction components.

7. The image processor according to claim 6, wherein when the character edge quantity from the plurality of character edge quantities calculated by the character edge quantity calculation unit is larger than a preset threshold for judgment, the sharpness control unit is configured to perform sharpness control for emphasizing the character edge.

8. The image processor according to claim 7, wherein when an absolute value of the coefficient signal divided into coefficient signals in the plurality of frequency bands and the plurality of direction components is larger than a predetermined value, the sharpness control unit is configured to multiply the coefficient by a predetermined constant, and when the absolute value is smaller than the predetermined value, the sharpness control unit is configured to replace the coefficient by zero and output the coefficient.

9. The image processor according to claim 7, wherein when an absolute value of the coefficient signal divided into coefficient signals in the plurality of frequency bands and the plurality of direction components is larger than a predetermined value, the sharpness control unit is configured to multiply the coefficient by a predetermined constant, and when the absolute value is smaller than the predetermined value, the sharpness control unit is configured to replace the coefficient by zero and output the coefficient.

10. The image processor according to claim 9, wherein when the character edge quantity from the plurality of character edge quantities calculated by the character edge quantity calculation unit is larger than another predetermined value in the diagonal direction, the sharpness control unit is configured to increase the constant to be multiplied to the coefficient unconditionally, with respect to the vertical and horizontal components in the same frequency band to further emphasize the character edge.

11. The image processor according to claim 9, wherein when the character edge quantity from the plurality of character edge quantities calculated by the character edge quantity calculation unit is larger than another predetermined value in the diagonal direction, the sharpness control unit is configured to not execute the process for replacing the coefficient by zero when the absolute value of the coefficient signal is smaller than the another predetermined value for the vertical and horizontal components in the same frequency band.

12. An image processor comprising:
a band and direction division unit configured to divide an input image signal into coefficient signals in a plurality of frequency bands and a plurality of direction components, output the signal, and perform division without decimation of the pixel of the input image in at least one frequency band;
a character edge quantity calculation unit configured to calculate a plurality of character edge quantities for each of the plurality of frequency bands and direction components based on the coefficient signal divided by the band direction division unit; and
a sharpness control unit configured to correct a spatial frequency based on a character edge quantity from the plurality of character edge quantities calculated by the character edge quantity calculation unit and perform independent correction and control in the frequency band and the direction component of the corresponding input image signal based on the character edge quantities for each of the plurality of frequency bands and direction components.

13. The image processor according to claim 12, wherein when the character edge quantity from the plurality of character edge quantities calculated by the character edge quantity calculation unit is larger than a predetermined threshold, the sharpness control unit is configured to perform sharpness control for emphasizing the character edge.

14. The image processor according to claim 13, wherein when the calculated character edge quantity from the plurality of character edge quantities is larger than a predetermined value in the vertical and horizontal directions in any of the frequency bands, the sharpness control unit configured to correct the threshold to a lower value, with respect to a component in a diagonal direction in the corresponding frequency band.

15. The image processor according to claim 13, wherein when an absolute value of the coefficient signal divided into coefficient signals in a plurality of frequency bands and a plurality of direction components is larger than a predetermined value, the sharpness control unit is configured to multiply the coefficient by a predetermined constant, and when the absolute value is smaller than the predetermined value, the sharpness control unit is configured to replace the coefficient by zero and output the coefficient.

16. The image processor according to claim 15, wherein when the character edge quantity from the plurality of character edge quantities calculated by the character edge quantity calculation unit is larger than another predetermined value in the diagonal direction, the sharpness control unit is configured to increase the constant to equal the coefficient, with respect to the vertical and horizontal components in the same frequency band, to emphasize the character edge further.

17. The image processor according to claim 15, wherein when the character edge quantity from the plurality of character edge quantities calculated by the character edge quantity calculation unit is larger than another predetermined value in the diagonal direction, the sharpness control unit is configured to not execute the processing for replacing the coefficient by zero when the absolute value of the coefficient signal is smaller than the another predetermined value for the vertical and horizontal components in the same frequency band.

\* \* \* \* \*